(12) United States Patent
Sutliff, II

(10) Patent No.: US 12,017,574 B1
(45) Date of Patent: Jun. 25, 2024

(54) HOOKING AND TARP ANCHORING SYSTEM AND METHODS

(71) Applicant: Charles Weiss Sutliff, II, Kila, MT (US)

(72) Inventor: Charles Weiss Sutliff, II, Kila, MT (US)

(*) Notice: Subject to any disclaimer, the term of this patent is extended or adjusted under 35 U.S.C. 154(b) by 660 days.

(21) Appl. No.: 17/189,020

(22) Filed: Mar. 1, 2021

Related U.S. Application Data

(63) Continuation-in-part of application No. 29/647,379, filed on May 11, 2018, now Pat. No. Des. 925,344, and a continuation-in-part of application No. 29/647,377, filed on May 11, 2018, now Pat. No. Des. 911,831, and a continuation-in-part of application No. 29/647,382, filed on May 11, 2018, now Pat. No. Des. 941,127.

(51) Int. Cl.
*B60P 7/04* (2006.01)
*B60P 7/08* (2006.01)

(52) U.S. Cl.
CPC .............. *B60P 7/0876* (2013.01); *B60P 7/04* (2013.01); *B60P 7/0823* (2013.01)

(58) Field of Classification Search
CPC .......... B60P 7/0876; B60P 7/04; B60P 7/0823
USPC .......................................................... 410/96
See application file for complete search history.

(56) References Cited

U.S. PATENT DOCUMENTS

| | | |
|---|---|---|
| 1,141,145 A | 6/1915 | Rickerd |
| 1,389,833 A | 9/1921 | Kent |
| 2,709,287 A | 5/1955 | Shelton et al. |
| 2,939,195 A | 6/1960 | Carlson |
| 3,055,332 A | 9/1962 | Linsdeau |
| 3,780,400 A | 12/1973 | Hinsperger |
| 3,936,912 A | 2/1976 | Flanagan, Jr. |
| 4,063,706 A | 12/1977 | Osborne, Sr. |
| 4,214,350 A | 7/1980 | Copelan |
| 4,414,711 A | 11/1983 | Hubbard |
| 4,688,304 A | 8/1987 | Marcott |
| 4,991,640 A * | 2/1991 | Verkindt ............ B60P 7/04 296/100.18 |

(Continued)

OTHER PUBLICATIONS

"Anchor Point," <http://usaprogrip.com/products/ratchets-3-2/bar-handle-2-2/>, 1 page, retrieved on Apr. 27, 2018, (attached).

(Continued)

*Primary Examiner* — Hilary L Gutman
(74) *Attorney, Agent, or Firm* — Sarah J. Rhoades

(57) ABSTRACT

A system of devices is provided to cooperate to tie-down a load and to cover the load with a tarp or cover. A knob with an optional locking base provides an anchor point to wrap and tie a tarp in the tarp anchoring system. The knob has numerous variations to accommodate attaching points and accessory characteristics. A compressing device secures the tarp over the knob. Two pieces move and lock within one another with sufficient clearance to receive the knob and the tarp. The knob having sufficient curvature to retain the compressing device when locked. Various mid-spanning hooking members cooperate with cords, straps, or ropes for a myriad of cargo lashing functionality and to receive the anchoring point. When used in combination, a user can employ the system to generate a web of load supports with a network of hubs and modes of attachment.

15 Claims, 63 Drawing Sheets

(56) References Cited

U.S. PATENT DOCUMENTS

| | | | | |
|---|---|---|---|---|
| 5,033,170 | A | * | 7/1991 | Ewert .................. A41F 1/00 24/462 |
| 5,046,222 | A | | 9/1991 | Byers et al. |
| 5,117,537 | A | * | 6/1992 | Hunter ................. E04H 15/64 24/72.5 |
| 5,168,605 | A | | 12/1992 | Bartlett |
| 5,193,252 | A | | 3/1993 | Svehaug |
| 5,210,912 | A | | 5/1993 | Hoefkes |
| D339,521 | S | * | 9/1993 | Bartlett .................. D8/382 |
| 5,325,568 | A | | 7/1994 | Bruhm |
| 5,353,441 | A | * | 10/1994 | Lazorchak ............. A41F 11/04 2/303 |
| 6,081,975 | A | | 7/2000 | Norrby |
| 6,199,247 | B1 | | 3/2001 | Tsai |
| 6,283,348 | B1 | * | 9/2001 | Wang ................. H04B 1/3888 24/3.12 |
| 6,292,987 | B1 | | 9/2001 | Combes |
| 6,338,185 | B1 | | 1/2002 | Solterbeck |
| 6,409,203 | B1 | | 6/2002 | Entenmann |
| D493,092 | S | | 7/2004 | Kalat |
| 6,978,522 | B2 | | 12/2005 | Liao |
| 7,243,402 | B2 | | 7/2007 | Andersen et al. |
| 7,308,739 | B2 | | 12/2007 | Andersen et al. |
| D561,007 | S | | 2/2008 | Kaesler |
| D571,278 | S | * | 6/2008 | Carnevali .................. D12/223 |
| 7,406,753 | B1 | | 8/2008 | LaScala |
| 7,739,775 | B2 | | 6/2010 | Shimanski |
| 8,387,217 | B1 | | 3/2013 | Hinds et al. |
| 8,621,726 | B2 | | 1/2014 | Sublette |
| D700,042 | S | | 2/2014 | Cobianco |
| 8,650,725 | B1 | | 2/2014 | Cooper |
| D703,516 | S | | 4/2014 | Wood |
| 8,763,213 | B2 | | 7/2014 | Burdett et al. |
| 8,857,379 | B2 | | 10/2014 | Glover et al. |
| 9,132,356 | B2 | | 9/2015 | Giordano |
| 9,174,564 | B2 | | 11/2015 | Neumann et al. |
| 9,249,814 | B2 | * | 2/2016 | Tsai ..................... A45F 5/02 |
| D752,958 | S | | 4/2016 | Giordano |
| D755,612 | S | | 5/2016 | Cooper |
| 9,737,102 | B1 | | 8/2017 | Sinclair |
| D798,139 | S | | 9/2017 | Giannatti |
| 9,874,039 | B2 | | 1/2018 | Haas |
| 10,371,183 | B2 | * | 8/2019 | Moreau ................. G09F 3/16 |
| D870,547 | S | * | 12/2019 | Liao .................... D8/394 |
| 10,687,608 | B2 | * | 6/2020 | Moreau ................. A45F 5/00 |
| 10,883,568 | B1 | | 1/2021 | Despain |
| 11,555,530 | B1 | * | 1/2023 | Karakash ............ F16G 11/14 |
| 2004/0159208 | A1 | * | 8/2004 | Yasunori .......... A44B 11/2584 84/329 |
| 2005/0198791 | A1 | | 9/2005 | Liao |
| 2007/0099469 | A1 | * | 5/2007 | Sorensen .............. A45F 5/02 439/289 |
| 2007/0209165 | A1 | * | 9/2007 | Sorensen ............. F16G 11/14 24/130 |
| 2008/0104805 | A1 | * | 5/2008 | Cameron ............. F16B 21/088 24/593.1 |
| 2010/0137112 | A1 | | 6/2010 | Harker |
| 2014/0007389 | A1 | | 1/2014 | Leung |
| 2014/0083579 | A1 | * | 3/2014 | White .................. A44B 99/00 24/343 |
| 2014/0306082 | A1 | | 10/2014 | Harvala |
| 2016/0220429 | A1 | | 8/2016 | Vincent et al. |
| 2016/0333906 | A1 | | 11/2016 | Varga |
| 2017/0119108 | A1 | | 5/2017 | Schlick |
| 2021/0362642 | A1 | * | 11/2021 | Delangis ............. B60P 7/0823 |
| 2023/0020558 | A1 | * | 1/2023 | Chen ................... A45C 13/002 |

OTHER PUBLICATIONS

"Heavy Duty Tarp Clip / Tarp Clamp—Python Grip Tarp clips pack of 6", offered on Amazon by Hook and Cord, LLC, <https://www.amazon.com/Heavy-Duty-Clamp-Python-clips/dp/B00RKND822>, 7 pages, retrieved on Apr. 27, 2018, (attached).

"Ram-Pro 12pc Tarp Clips Heavy-Duty with Carabiner—Sliding-Lock Grip," offered on Amazon by RAMPRO, <https://www.amazon.com/RAM-PRO-12pc-Clips-Heavy-Duty-Carabiner/dp/B018J0OAM6/ref=sr_1_2_sspa?ie=UTF8&qid=1521069471&sr=8-2-spons&keywords=lock+grip+tarp&psc=1>, 7 pages, retrieved on Apr. 27, 2018, (attached).

"Tarp Grabbers TG-12 Tarp Grabbers," offered on Amazon by Tarp Grabbers, <https://www.amazon.com/Tarp-Grabbers-TG-12-12-Pack/dp/B0000AXFCR/ref=sr_1_1?ie=UTF8&qid=1521069515&sr=8-1&keywords=tarp+grabber>, 8 pages, retrieved on Apr. 27, 2018, (attached).

"Tekton 6268 Tarp Clips," offered on Amazon by TEKTON <https://www.amazon.com/TEKTON-6268-Tarp-Clips-4-Piece/dp/B00A50NB24/ref=sr_1_1?ie=UTF8&qid=1521069557&sr=8-1&keywords=tekton+tarp+clip>, 9 pages, retrieved on Apr. 27, 2018, (attached).

"Multi-Position Anchor Point," <http://usaprogrip.com/products/ratchets-3-2/bar-handle-2-2-4-2-2-2-2-2-2-2-2-2-2-2-2-2-2-2-2-2-2-2-2-2-2-2-2-2-2/>, 1 page, retrieved Aug. 14, 2017, (attached).

"Tarp Shark," <http://usaprogrip.com/productsratchets-3-3-4-3/>, 1 page, retrieved Aug. 14, 2017, (attached).

"Heavy Duty 3" Metal Tarp Clip Clamp Rubber Head Awning High Wind Hold Down," <https://www.amazon.com/Rubber-Awning-Attaches-Provide-Options/dp/B01IPU6UNW/ref=sr_1_1?ie=UTF8&qid=1524852527&sr=8-1&keywords=heavy+duty+3%22+Metal+Tarp+Clip+Clamp+Rubber+Head>, 1 page, retrieved on Aug. 14, 2017, (attached).

"Ratchet tie down strap," offered on Alibaba by Aulift International Trade Co., Ltd., <https://m.alibaba.com/product/1408985643/Ratchet-tie-down-strap-100-CE.html#/module-big-image>, 1 page, retrieved on Apr. 16, 2015, (attached).

"Rubber Rope Hooks," <http://www.uscargocontrol.com/Flatbed-Trailer-Products/Rubber-Rope/Rubber-Rope-Hooks-100ct-Bag?gclid=CN_AwbX178QCFZJffgodEagA_g>, 2 pages, retrieved on Apr. 16, 2015, (attached).

"Accessories Cargo Lashing," offered on Alibaba by Qingdao Yumetal Hardware Rigging Co., Ltd., <https://m.alibaba.com/product/596937365/Accessories-Cargo-Lashing.html#/module-big-image>, 1 page, retrieved on Apr. 16, 2015, (attached).

"Best Quality Metal and Steel Wire Form Spring Clips and Hooks," offered on Alibaba by Shijiazhuang Suncel Trade Co., Ltd., <https://m.alibaba.com/product/60205817390/Best-Quality-Metal-and-Steel-Wire.html#/module-big-image>, 1 page, retrieved on Apr. 16, 2015, (attached).

"Hanging hook for powder coating," offered on Alibaba by Ningbo Beilun Chuang Hui Metal Product Co., Ltd., <https://m.alibaba.com/product/201378209/Hanging-hook-for-powder-coating.html#module-big-image>, 1 page retrieved on Apr. 16, 2015, (attached).

"Steel wire hook," offered on Alibaba by Shenzhen Zhengqi Hardware Product Co., Ltd., <https://m.alibaba.com/product/1258192878/steel-wire-hook.html#module-big-image>, 1 page, retrieved on Apr. 16, 2015, (attached).

"Steel wire hook S-hook metal hook for packaging accessories," offered on Alibaba by Shenzhen Zhengqi Hardware Product Co., Ltd., <https://m.alibaba.com/product/1290545482/Steel-wire-hook-S-hook-metal.html#module-big-image>, 1 page, retrieved on Apr. 16, 2015, (attached).

"Wire S Hook," offered on Alibaba by Ningbo Jiangbei Hengyi Auto Hardware Fitting Factory, <https://m.alibaba.com/product/1377934462/wire-s-hook.html#module-big-image>, 1 page, retrieved on Apr. 16, 2015, (attached).

"Byers' Super Snaps," offered by Creative Sales Company, http://www.creativesalescompany.com/outdoor.html#!/Byers-Super-Snaps-4-Pc/p/36383182/category=9330625, 2 pages, retrieved on Feb. 22, 2021.

"Clip On Tarp Pull Outs" offered by Dutchware, https://dutchwaregear.com/product/clip-on-tarp-pull-outs/, 4 pages, retrieved on Nov. 12, 2017.

"Grip Clip Pro" offered by Shelter Systems, https://shelter-systems.com/product-category/gripclips/, 6 pages, retrieved on Nov. 12, 2017.

(56) References Cited

OTHER PUBLICATIONS

"HD Plastic Shock Cord Hooks" offered by Harriscos LLC, https://www.amazon.com/Plastic-Shock-Cord-Hooks-Pack/dp/B00BKAUXQ0, 7 pages, retrieved on Nov. 12, 2017.

"Holdon Mini Clips" offered by Holdon Systems, https://www.holdon.com/, 3 pages, retrieved on Nov. 12, 2017.

"Slide in Tarp Clip" offered by JT's Outdoor Fabrics Inc., https://www.jtsoutdoorfabrics.com/Slide-In-Tarp-Clip--Black_p_15430.html, 4 pages, retrieved on Nov. 12, 2017.

Jool Baby Products, Child Safety Sliding Cabinet Locks, printed Jul. 16, 2021, 12 pages, https://www.amazon.com/dp/B072N9NY33?pd_rd_i=B072N9NY33&pd_rd_w=zYuNo&pf_rd_p=3465d0d7-4e28-4692-b633-326c458deaa4&pd_rd_wg=Kej4J&pf_rd_r=VK2C7EMGYM643J57ES0C&pd_rd_r=baeb9430-45e9-4ea8-ad93-190b4a3a2186.

\* cited by examiner

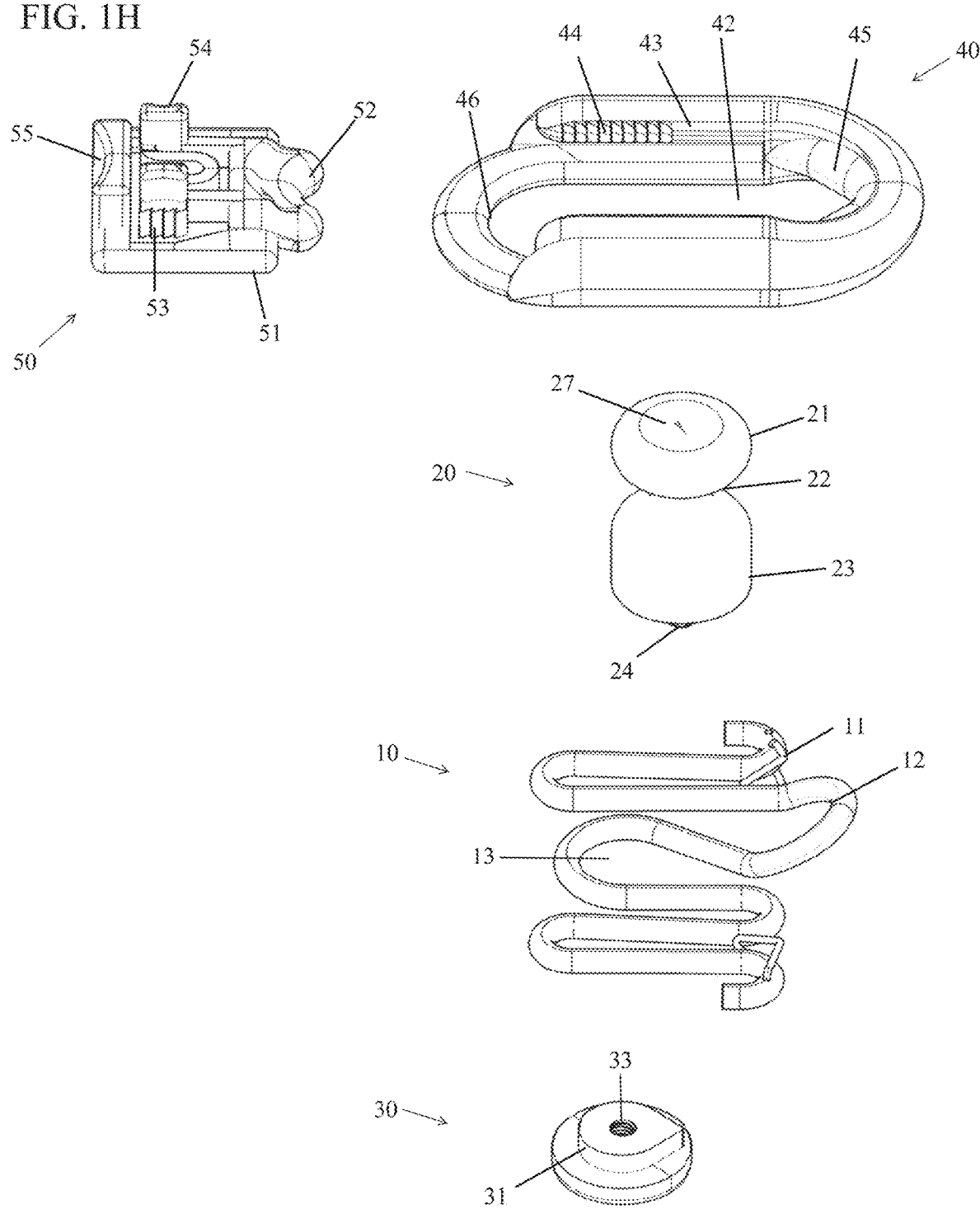

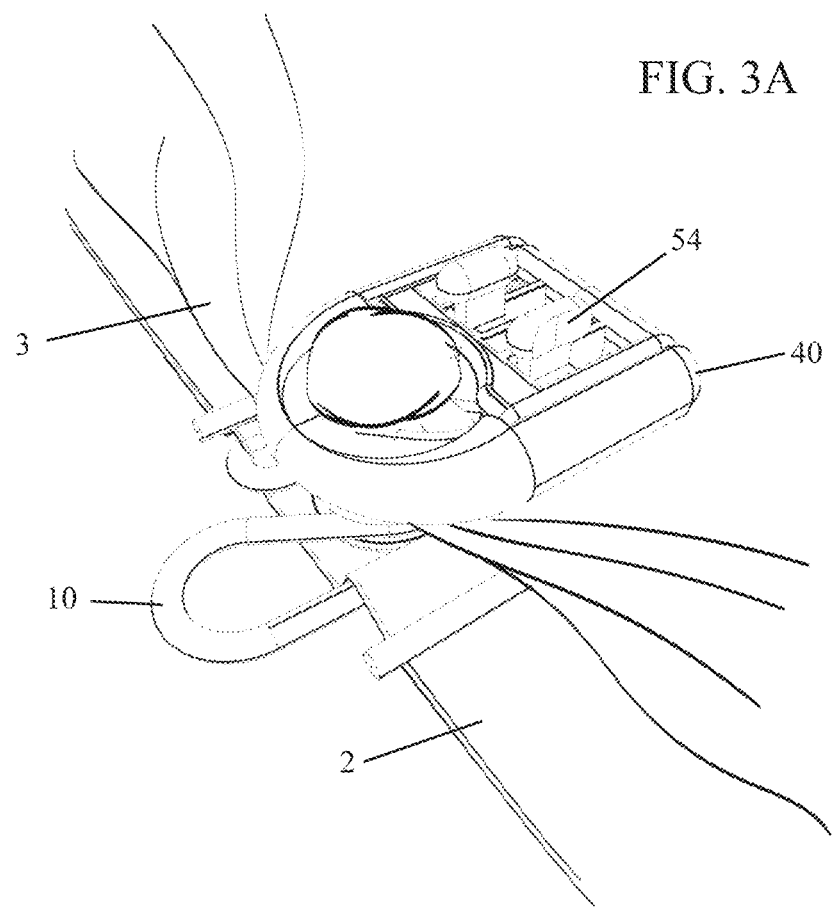

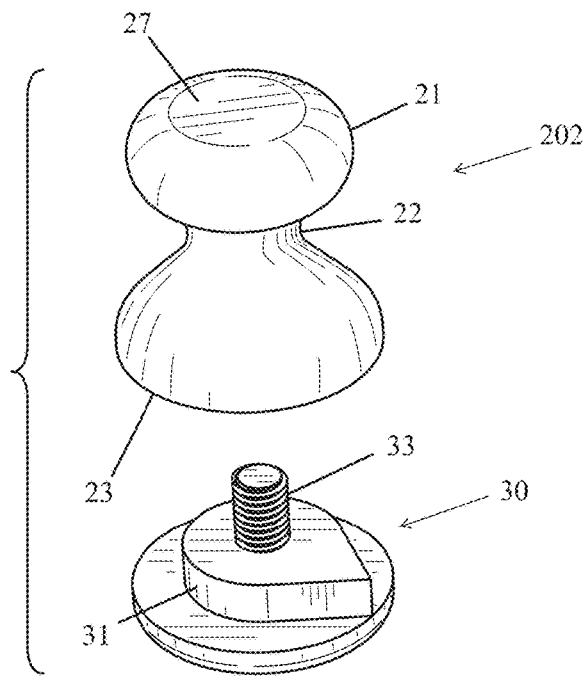
FIG. 5E
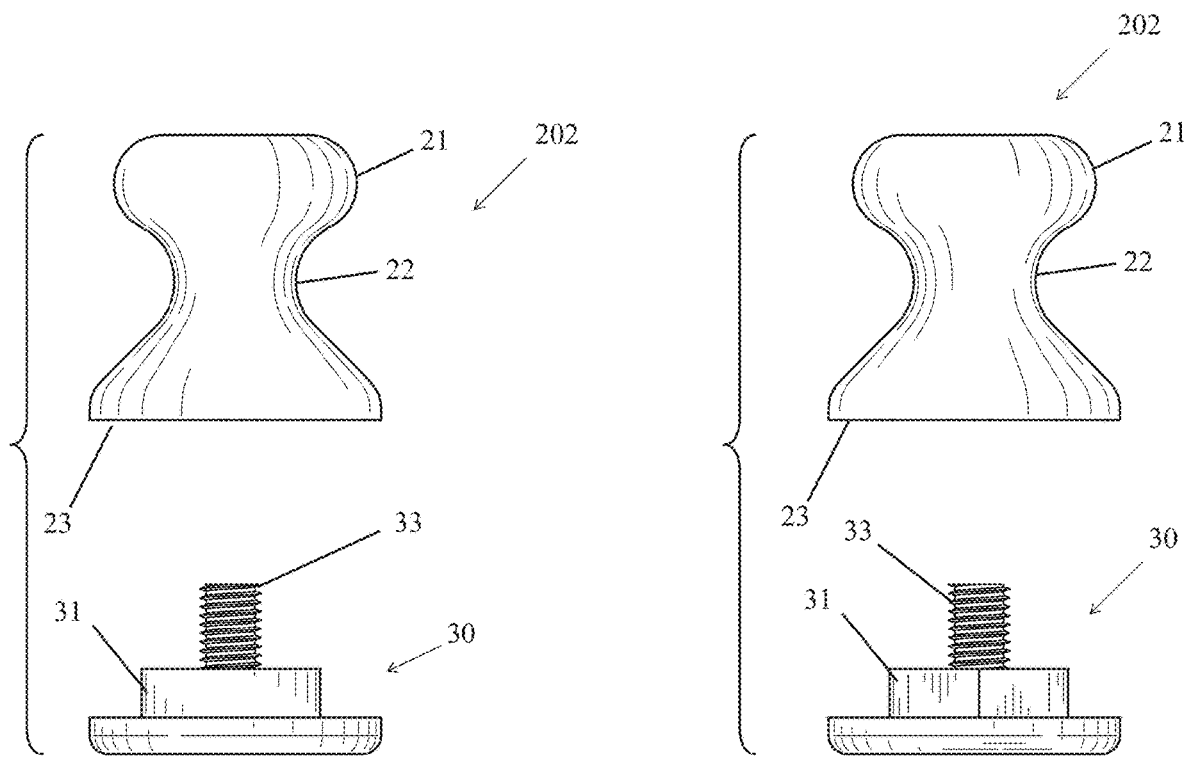
FIG. 5F
FIG. 5G

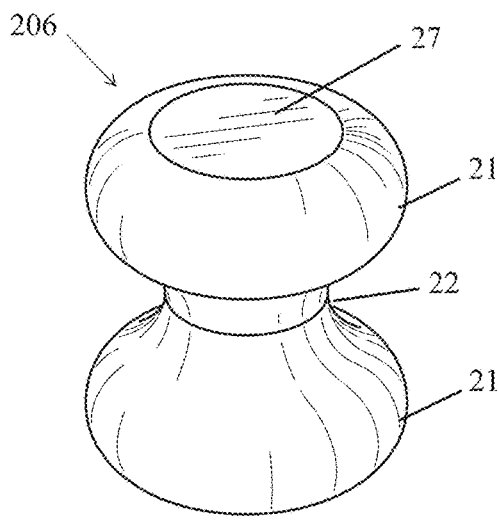
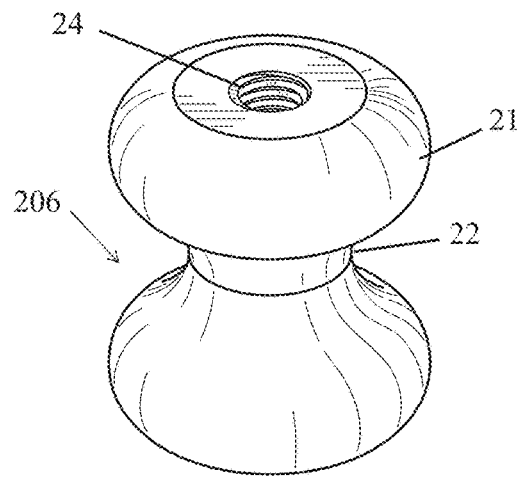
FIG. 8A
FIG. 8B
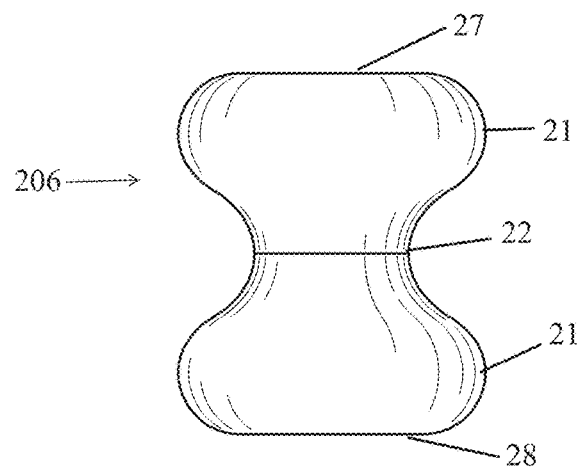
FIG. 8C
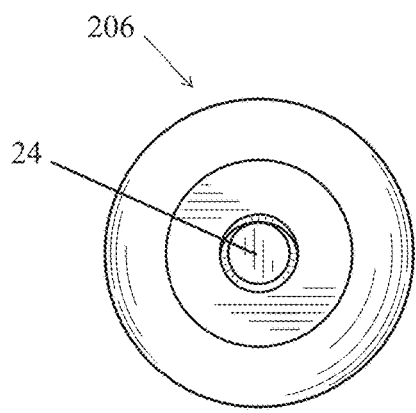
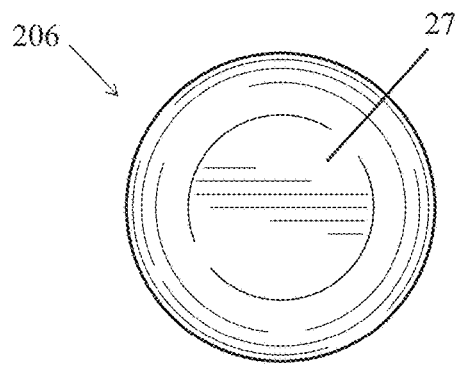
FIG. 8D
FIG. 8E

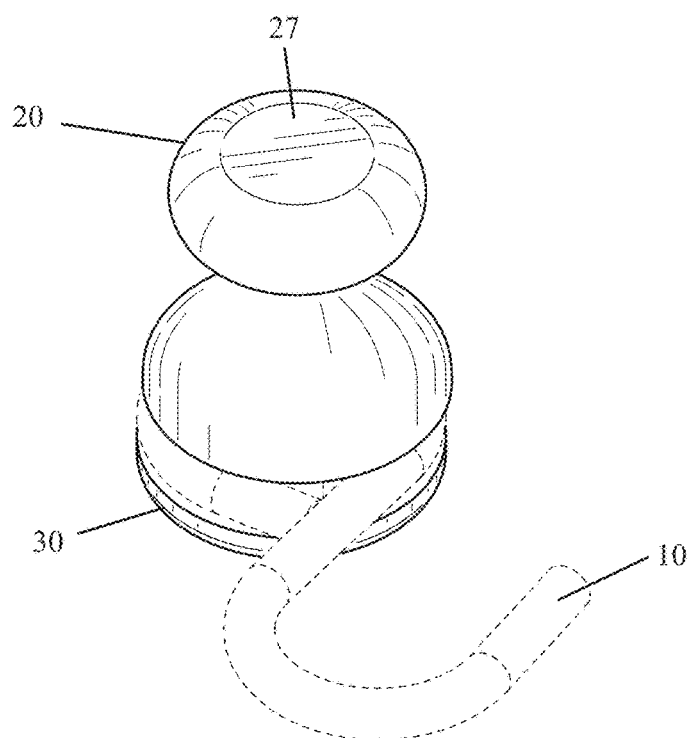
FIG. 9
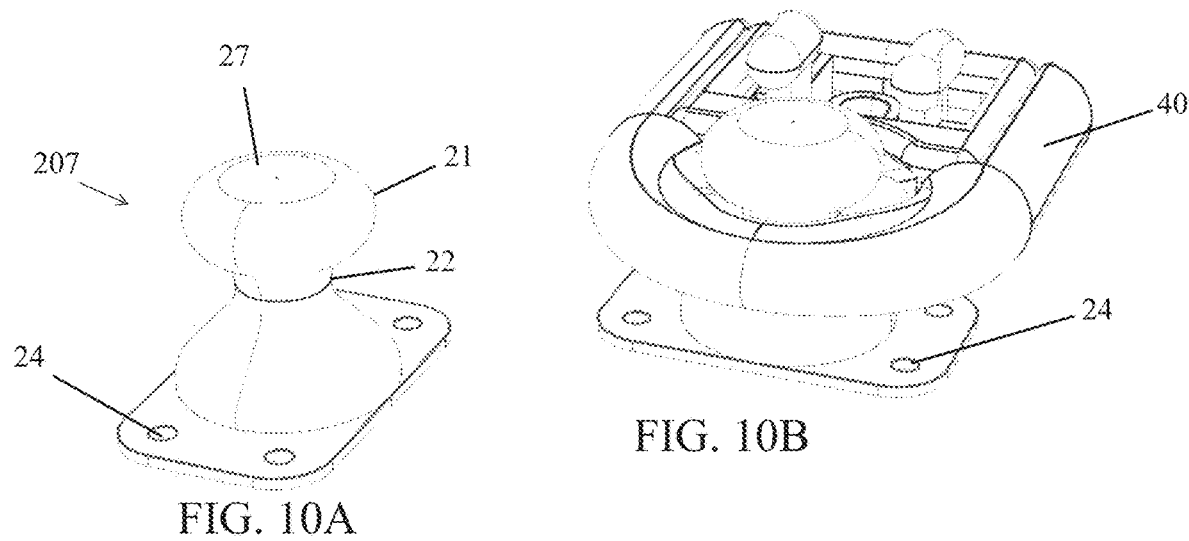
FIG. 10A
FIG. 10B

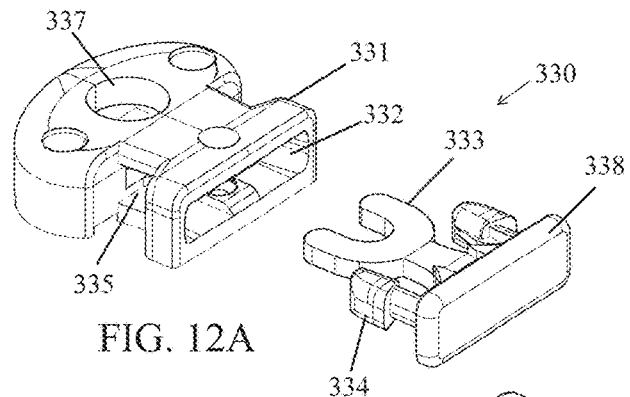
FIG. 12A
FIG. 12B
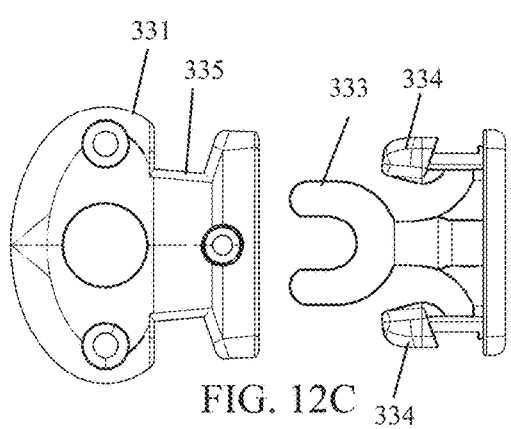
FIG. 12C
FIG. 12D
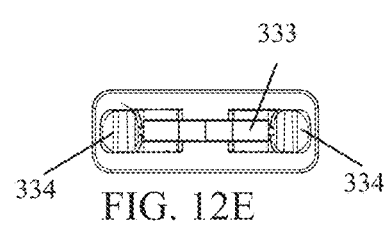
FIG. 12E
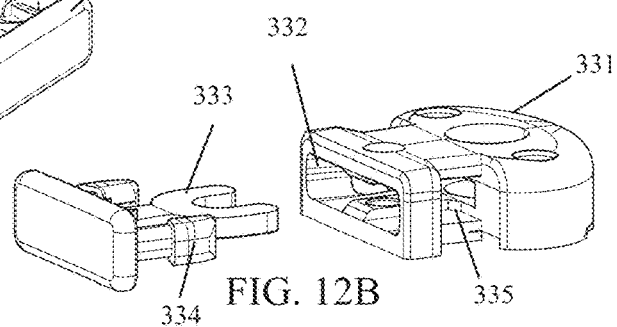
FIG. 12F
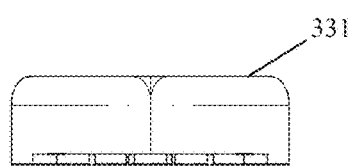
FIG. 12G
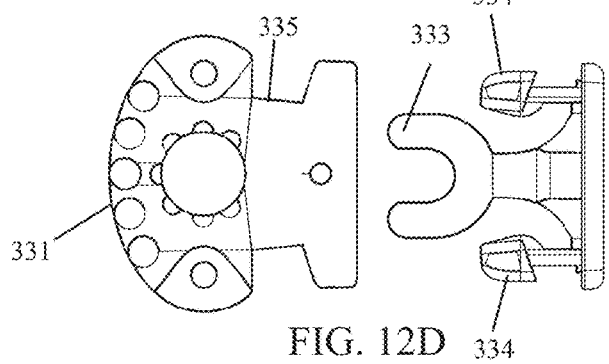
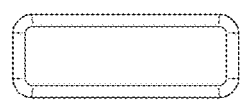
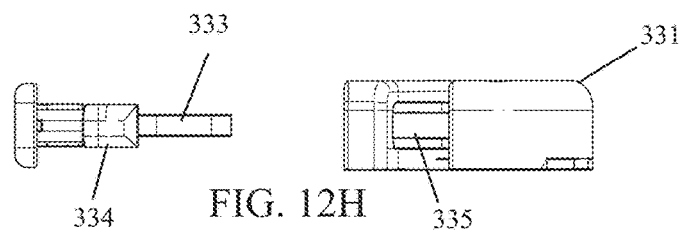
FIG. 12H
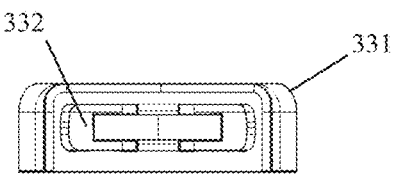
FIG. 12I

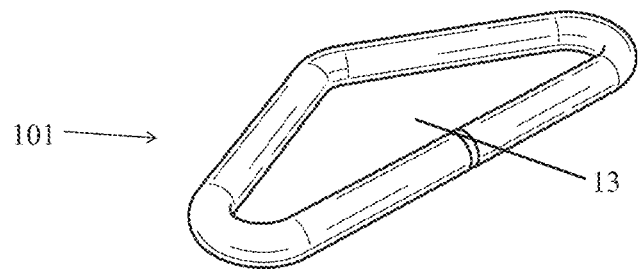
FIG. 15A
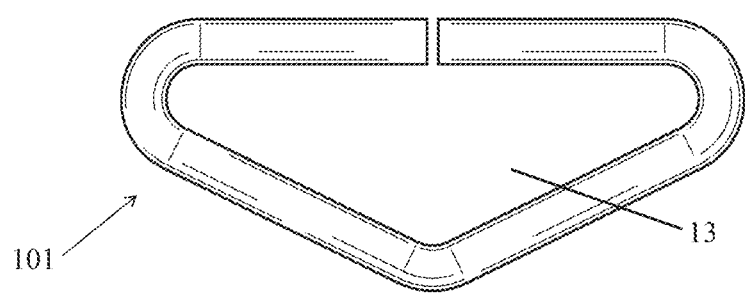
FIG. 15B
FIG. 15C
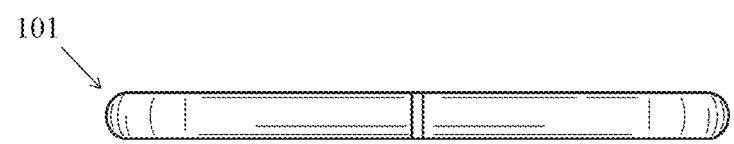
FIG. 15D
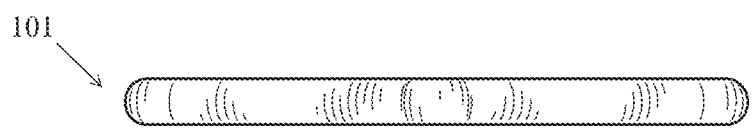
FIG. 15E
FIG. 15F
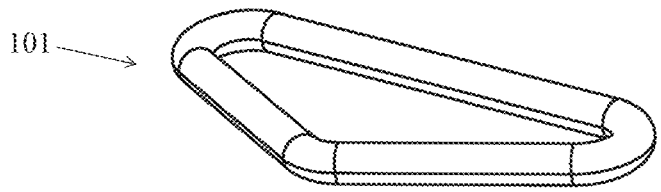

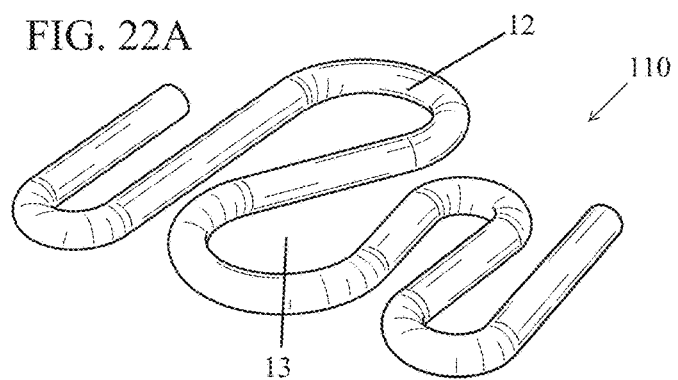
FIG. 22A
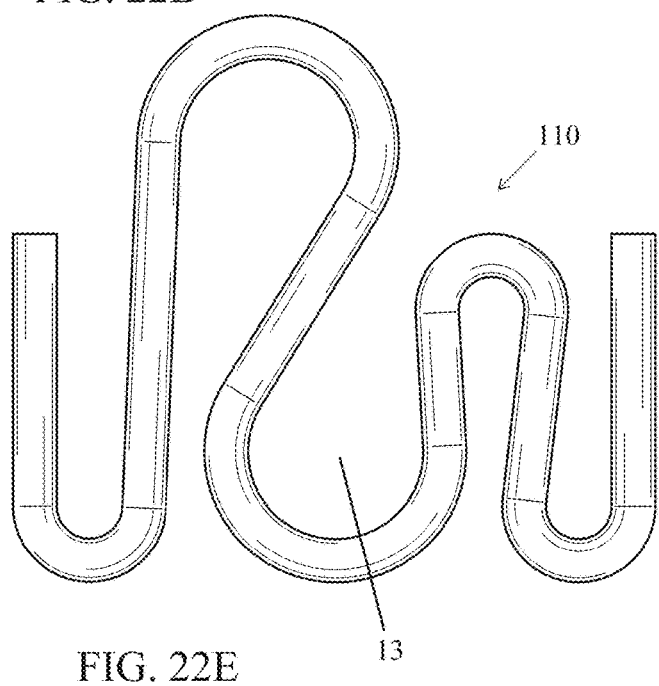
FIG. 22B
FIG. 22C  FIG. 22D
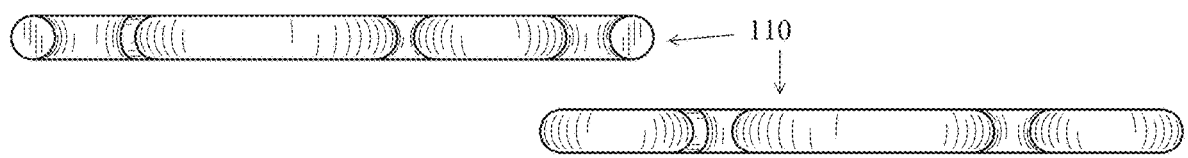
FIG. 22E
FIG. 22F
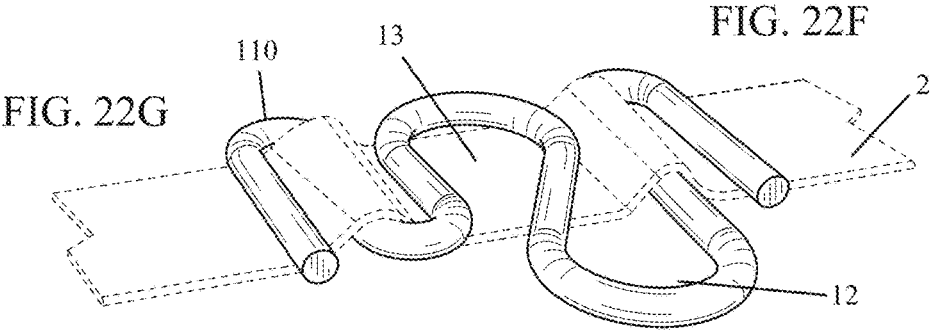
FIG. 22G FIG. 23A
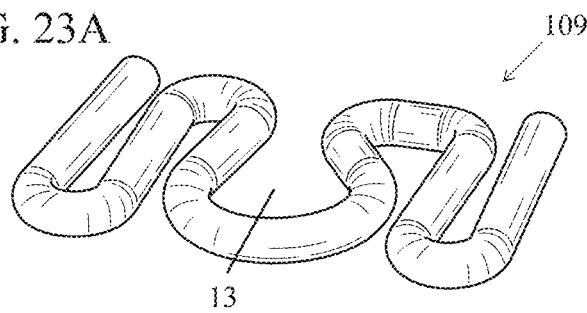
FIG. 23B
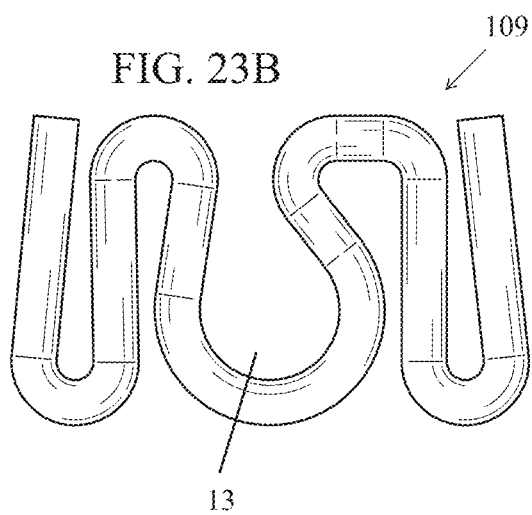
FIG. 23C
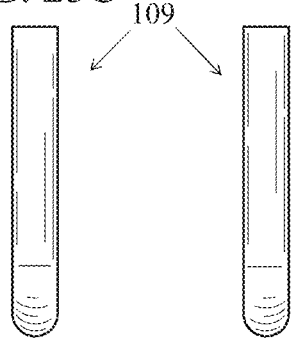
FIG. 23D
FIG. 23E
FIG. 23F
FIG. 23G
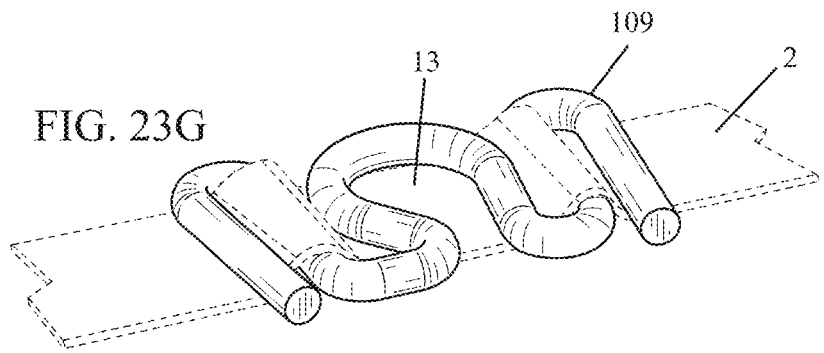

FIG. 24A
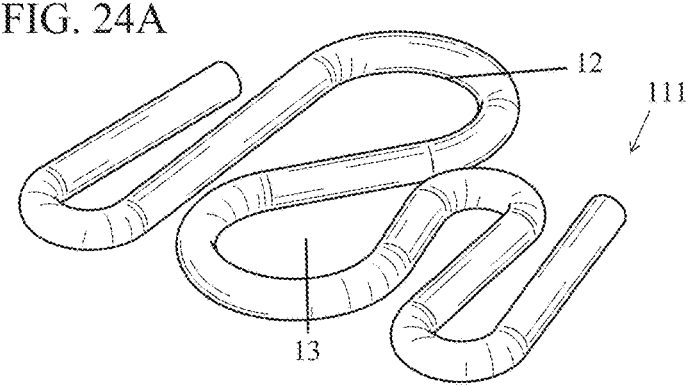
FIG. 24B
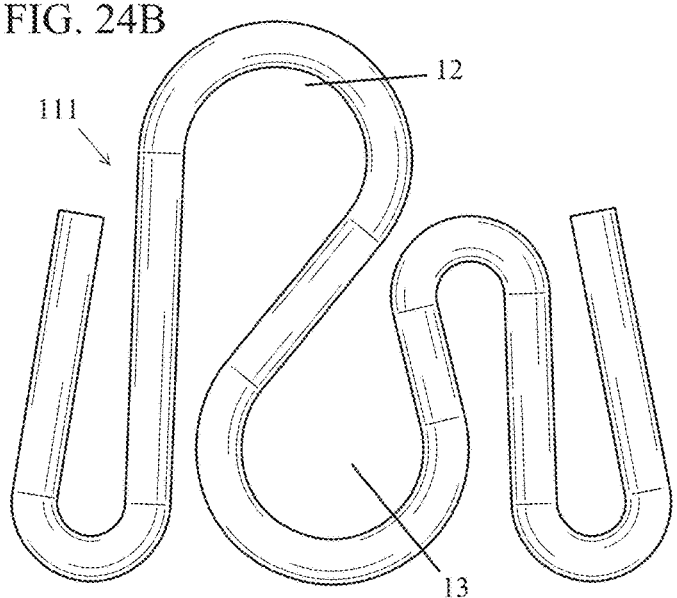
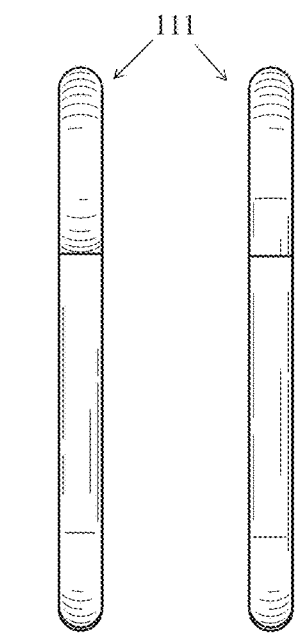
FIG. 24C   FIG. 24D
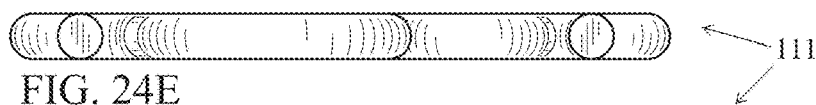
FIG. 24E
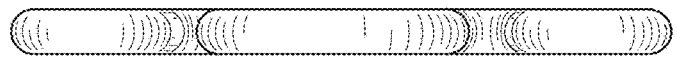
FIG. 24F
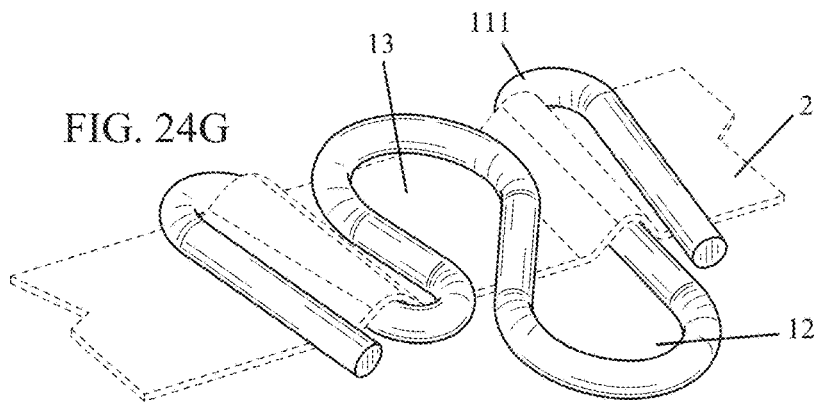
FIG. 24G

HOOKING AND TARP ANCHORING SYSTEM AND METHODS

CROSS-REFERENCE TO RELATED APPLICATIONS

This patent application claims priority under 35 U.S.C. § 120 to U.S. patent application Ser. No. 29/647,377, entitled "Tarp Anchor with Optional Locking Base", and filed on May 11, 2018, which application is now pending. This patent application also claims priority under 35 U.S.C. § 120 to U.S. patent application Ser. No. 29/647,379, entitled "Tarp Compressing Device", and filed on May 11, 2018, which application is now pending. This patent application further claims priority under 35 U.S.C. § 120 to U.S. patent application Ser. No. 29/647,382, entitled "Strap and Rope Hooking Devices", and filed on May 11, 2018, which application is now pending. The entire disclosure of each of these design patent applications is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

This invention relates to devices for securing a load, particularly to tie-downs and tarps used for covering and securing loads, and more particularly to such devices assisting with the interplay between ropes, straps, and tie-down accessories with tarping objectives to securely tie or protect contents.

2. Description of the Related Art

When cargo is hauled it must be secured to a vessel or vehicle during transport with tie-downs or lashings made of interwoven material. Tie-downs of interwoven material, such as straps and ropes are fastened to hooks at their opposing ends and at times even have hooks secured along the length of a strap. Hooks used in these applications generally include the following types: S-hooks, Double J-hooks, Ring Hooks and Snap Hooks. S-hooks are generally rubber coated steel hooks formed in the shape of the letter "S" and having a hook on one end and a loop on the other end. In this example implementation, the loop end is permanently affixed to the strap. J-hooks are generally rubber coated steel hooks formed in the shape of the letter "J" and have a triangular loop at one end with double hooks extending upward from the triangular loop end. Additional hooking members include simple and more complex hooks such as ring hooks which are generally circular shaped hooks. Snap-hooks generally include a pivotal hook keeper that retains another hook (e.g., stationary hook) by depressing the keeper inward to open the snap hook and allow the snap hook to engage another hook member. The keeper retracts to a closed position once released from depression to permit the disengagement of the other hook member.

A need exists for improved hook members that provide more versatility and can be secured to a tie-down strap before or after the strap has been attached to the load. There is also a need to reduce labor costs associated with the use of tie-down straps.

During transport the load may be exposed to the elements and other adverse conditions that may damage the cargo or its containers. Therefore, flexible panels of material such as durable plastic, waterproofed canvas, tarpaulin, or sheets of fabric are frequently used for cargo protection, especially for protecting exposed objects or areas. These materials used for coverings are commonly referred to as tarps.

It is often necessary or desirable to securely attach tarps in a particular location. Instances of use might be covering a woodpile or a load of furniture in the back of an open pickup truck. Inevitably a problem arises as to how the sheet or film is to be held in place without blowing off or being dislodged. A related problem is securing the tarp without spending an undue amount of time. While tarps may be provided with grommets near their edges, the limited instances of those points of securement severely restricts versatility of use. Adding extraneous attachment measures to the tarps themselves promotes waste and introduces points of weakness for functionality, for example, if too many eyelets are provided in a flexible panel, they will pose a potential threat of breakage, tearing or leakage. There is a need to secure these sheets of protective materials at locations and in areas other than their edges. There is also a need to reduce labor costs associated with the use of tarps to cover a load.

BRIEF SUMMARY OF THE INVENTION

The strap hooking and tarp anchoring system provides a method to secure a network or web of straps through the use of mid-span hooks which simultaneously catch straps while serving as the attachment point for a knob anchor which cooperates with a compressing device to sandwich and grab a tarp at various locations over a secured load. The components of the present invention cooperate with the interwoven materials, also called ropes or straps, securing the load and also the tarp covering the load. At least one mid-span hook member cooperates with the interwoven material to locate the anchoring apparatus along the interwoven material. Because the hooks can join with any part of the strap or rope, they provide maximum versatility in providing additional strap hooking points or anchor locations. The hooks of the present invention are constructed of semi-rigid, self-sustaining shaped, rod-like member. Variations may be provided with spring biased clasps, screw locks, or other locking mechanisms to improve safety. In the preferred embodiment, many iterations of the mid-span hook member will be applied to the straps of a single load.

In the preferred embodiment, the anchoring apparatuses, also called tarp anchors or knobs, are mounted to receiving portions of the hook. The knobs may be joined with the hook members before or after placement on the straps, depending on the embodiment employed or the demands of the load. A locking base secures the knobs to the mid-span hook member. The tarp is then laid over the load and the anchors with sufficient slack to wrap the anchors tightly as they are grabbed with the compressing device.

The anchoring apparatus of the preferred embodiment is comprised of a knob structure with a bulbous upper knob, a narrow neck portion, and a lower portion. In the preferred embodiment, the intermediate surfaces between the parts of the knob are spherically tapered. During use, the compressing device secures the wrapped sheet material via a moveable mechanism of the compressing device squeezing around a narrow neck portion of the anchoring apparatus. The compressing device cannot slide off the anchoring apparatus because it is held between the bulbous upper knob and the lower portion.

The anchoring apparatus is preferably provided with a base portion that interfaces with the lower portion of the anchor. The base may provide locking functionality through coupling measures such as threads, quick release snap fit structures, or other interference fit cooperation. The base of the preferred embodiment employs a raised portion shaped to prevent spinning when installed in the hook member. When implemented with a quick release option, the base has a housing with an anchor coupling hole, an insert opening and receiving structures. The insert opening receives a quick release insert to retain the anchor and the quick release insert has protrusions to cooperate with the receiving structures to retain the insert within the housing until released. In the preferred embodiment of the quick release base, through holes are provided with the objective in mind that the quick release housing may be mounted in a semi-permanent configuration to the cargo vehicle.

The compressing device of the present invention has many structures generally comprising an anchor receiver and a slidable locking latch. In the preferred embodiment, the anchor receiver is formed in a substantially oval formation with axially extending walls. In this embodiment, the interior of the walls is provided with grooves and teeth configured to engage grooves and teeth located on the slidable locking latch, which in this exemplary embodiment occur on a structure independent of the anchor receiver. In alternative embodiments, benefits will be observed by the anchor receiver and the locking latch occurring as a unitary device. The preferred anchor receiver is constructed of semi-rigid, durable material with sufficient rigidity in the outer body to withstand the violent conditions experienced on the exterior of a cargo load. Materials occurring on the inside of the axially extending, oval wall, and particularly the shoulder abutting the knob anchor is shaped and rounded such that it will not puncture or harm the flexible, thin sheet material of the tarp. The slidable latch comprises a locking portion engageable with the locking mechanisms of the receiver, a shoulder portion to abut the knob covered with the wrapped tarp, and a rear portion where lock release assemblies like thumb pinches, finger rises, or key releases are disposed. These release mechanisms are provided to allow the separation of the compressing device by the user and removal of the tarp from the device.

During use, when the slidable latch is engaged, the interaction of the bulbous upper knob, a narrow neck portion, and a lower portion with the compressing device traps the tarp. The anchoring apparatus wrapped in the sheeting material is compressed between the shoulder of the moveable mechanism of the locking latch and a cooperating shoulder of the anchor receiver. The locking mechanism may be provided with a lock-and-key accouterment to add security to cargo loads. Some embodiments of the compressing device offer additional attachment options accessible after the locking latch is seated.

Utilization of the present invention will provide flexibility with a wide variety of options for securing and also covering cargo loads of all types for transporting. Through the use of the system, accessories, and methods a user may simply and conveniently create reliable securement points for and with a tarp without any preconfigured securement feature. The present invention will fulfill the need for a reliable, dependable solution to hold a sheet material securely over a load. Additionally, the present device is capable of being quickly attached and detached but wind, vibration or the slick surface of the material will not cause it to work loose.

The present invention provides accessories to secure the load by creating non-slip, non-sliding attachment points for connecting cargo straps to other cargo straps, hooks, tie-down strap hooks, other types of hooks, straps, webbing strips, ropes and cords. The tarp knob cooperates with hooking devices to engage straps and the system intends the ability to connect to other attachment points. The hooking members attach to the different rope and strap anchored devices within this system and the tarp anchor can be attached to the hooks of an existing, cargo strap, tie-down strap, lashing strap or similar material. The present invention eliminates the need for tying knots in the straps, webbing strips, ropes or cords. The hooks of the present invention are removable from a tie-down location or strap and enhance versatility by allowing a variety of styles of hooks to be attached to a variety of interwoven materials in a variety of positions on the tie-down straps.

More specifically, and in a presently preferred embodiment, by way of example and not necessarily by way of limitation, the preferred embodiment of the present invention comprises a mid-span hook to receive a tarp anchoring knob to interact with the tarp compressing devices. The "tarp anchoring knob" provides an anchoring point to be attached at any location on a tie-down, mid-span, or anywhere along the length of the line with the mid-span hook, or through the existing hooks including in the line ends. More specifically, the tarp knob provides an anchor point at any intermediate parts of the tarp. The devices of the present invention are employed quickly and conveniently to establish locations for anchoring which may not otherwise be equipped with adequate attachment measures. The "Tarp Knob Compressing Device" provides the ability to cover loads, items, and materials with an easy on and off procedure.

Because the system and accessories are designed to cooperate in a multitude of situations manufacturing and labor costs are reduced. Similarly, the labor costs associate with protecting a load are reduced as a user employs the system and accessories for the tie-down straps.

With this system, tarps are anchored with the securing straps and rope, thus allowing the securing straps and rope to be strategically placed across the contents of the load, not limited to just a few anchoring points but rather unlimited anchoring points. With the tarp anchored over the securing straps or ropes by the secure connection of the tarp knob compressing device, the wind will not blow the tarp off the load, items or materials. The present invention establishes a securement point at those portions of the flexible panel without damage or modification of the flexible panel. The reduced risk of piercing or damage to the panel during use also improves protection for the load contents.

The present invention does not rely upon any eyelets, grommets, piercing, or other pre-configured fastening measures along certain edge or corner portions of the panel. The present invention accommodates the securement in a stand-alone manner. There is no need for any special provision in the sheet-like material itself. The versatility of the present system obviates the need for any fastening measures in the panel material itself, which measures are known to pose points of weaknesses in the panel.

The present invention will find particularly advantageous applications where large loads require use of more than one panel, or where large panels may need to be tied down themselves to prevent abrasive interaction between the contents and the tarp. The product system offers the ability to join separate tarps together at their edges or anywhere within the surface area of the tarp and be able to double or triple in layers depending on the thickness of said materials used as a tarp or tarps by using the compressing device and knob anchor combination. Standard points of securement will fail to adequately serve the demands of these situations and, thus, the present invention enhances the protective capacity of the panel. The present invention discloses attachment methods and accessories to maximize lashing options over the panel and in intermediate regions of the panel, increasing safety for the secure placement of the flexible panel for use.

This product system provides flexibility with a wide variety of options in the application of tarps for purposes other than securing cargo loads for transportation and those uses may include applications in construction zones, camping, rain covering, protection from bad weather, sun exposure or similar challenges.

As used herein, "tie-down" is used to refer to any elongated cord or filament used to traverse and secure. Herein, strap may be used to refer to any interwoven material, lines, cable, cord, filament, flexible wire, twine, and any other filamentary flexible article. Strap may also be used to refer to a rope except where context demands or is otherwise stated.

The system, accessories, and methods used for securing a tarp are generally directed to the securement of a sheet-like flexible panel member to the anchoring apparatus. Herein, "tarp" or "panel" may be used to refer to any flexible panel material meant for covering a load and could include not only tarpaulin but also canopies, fabric sheets, or other pieces of material including but not limited to durable plastic, thick panel covers, or waterproofed canvas.

The foregoing has outlined, in general, the physical aspects of the invention and is to serve as an aid to better understanding the more complete detailed description which is to follow. In reference to such, there is to be a clear understanding that the present invention is not limited to the method or detail of construction, fabrication, material, or application of use described and illustrated herein. Any other variation of fabrication, use, or application should be considered apparent as an alternative embodiment of the present invention.

BRIEF DESCRIPTION OF THE DRAWINGS

The following drawings further describe by illustration, the advantages and objects of the present invention. Each drawing is referenced by corresponding figure reference characters within the "DETAILED DESCRIPTION OF THE INVENTION" section to follow.

FIG. 1H is an exploded side perspective view of the example configuration shown in FIG. 1A with the components of the compressing device, tarp anchor, strap guiding hook member and locking base separated from one another to show detail and assembly orientation.

FIG. 3A is a front perspective view of another example configuration of the system of the present invention installed and having the edge of a tarp illustrated for context.

FIG. 5E is a top perspective view of another example of the components shown in FIG. 5A except in this version the coupling for the pair includes a central bore in the knob where the male threads are disposed at the top of the locking base.

FIG. 5F is a back view of FIG. 5E.

FIG. 5G is a front view of FIG. 5E.

FIG. 8A is a top perspective view of another example of a tarp anchor utilized within the system of the present invention where the lower portion of this example knob is also bulbous. A coupling may be applied at either or both of the top and bottom of the tarp anchor.

FIG. 8B is a bottom view of a tarp anchor similar to that shown in FIG. 8A except with a coupling at the knob top.

FIG. 8C is a first side view, second side view, front view, and rear view of FIG. 8A.

FIG. 8D is a bottom view of FIG. 8A or a top view of FIG. 8B.

FIG. 8E is a top view of FIG. 8A or a bottom view of FIG. 8B.

FIG. 9 illustrates a sample configuration for aspects of the system of the present invention where the tarp knob and locking base are shown in perspective view and sandwiched around a common hooking device.

FIG. 10A is a side perspective view of one example of a mountable-base knob which comprises an extended panel which will permit attachment to a solid surface, such as a cargo vehicle.

FIG. 10B is a front perspective of the example shown in FIG. 10A with an example compressing device joined with the tarp knob. Although no tarp is illustrated, FIG. 10A makes clear the method by which the present invention will attach a tarp to a cargo vehicle.

FIG. 12A is a top perspective view of a quick release locking base for a tarp knob. In this example, a quick release coupling such as through a pair of squeeze-actuated projections are shown in separation. Any quick release mechanism such as a thumb release would meet the objectives of this embodiment.

FIG. 12B is a side perspective view of FIG. 12A.

FIG. 12C is a top view of FIG. 12A.

FIG. 12D is a bottom view of FIG. 12A.

FIG. 12E is a clip-end view of the quick release inserting mechanism of FIG. 12A, shown in isolation.

FIG. 12F is a front view of the quick release housing shown in FIG. 12A.

FIG. 12G is a back end view of the quick release inserting mechanism of FIG. 12A, shown in isolation.

FIG. 12H is a side view of FIG. 12A.

FIG. 12I is a clip-receiving end view of the quick release housing shown in FIG. 12A but shown in isolation.

FIG. 15A is a top perspective view of a hooking member.

FIG. 15B is a top view of FIG. 15A where the bottom view is a mirror image.

FIG. 15C is a first side view of FIG. 15A where the second side is a mirror image.

FIG. 15D is a rear view of FIG. 15A.

FIG. 15E is a front view of FIG. 15A.

FIG. 15F is a top perspective view of an alternative version of FIG. 15A without a break within the hooking member.

FIG. 18H is a front perspective view of the hooking member of FIG. 18A in a later stage of assembly but without a tarp inserted in order to show detail. In this example configuration, the compressing device has been clamped over the tarp anchor attached to the locking base and thus the hooking member receiving a rope according to this example configuration.

FIG. 19A is a top view of an alternative hooking member having a clasp, where the bottom view is the mirror image.

FIG. 19B is a perspective view of FIG. 19A.

FIG. 20A is a perspective view of an alternative hooking member having an angling connection rod tier and optional twisting clasp.

FIG. 20B is a perspective view of FIG. 20A.

FIG. 21A is a perspective view of an alternative hooking member having a vertically-tiered rod with optional twisting clasp.

FIG. 21B is a perspective view of FIG. 21A.

FIG. 21C is a rear perspective view of the hooking member shown in FIG. 21A.

FIG. 21D is a rear perspective view of the hooking member of FIG. 21A but having no tarp anchor or compressing device but instead serving as a connection point for an additional hook.

FIG. 21E is a rear perspective view of FIG. 21D having yet another hook connected according to aspects of the strap hooking and tarp anchoring system.

FIG. 21F is a rear perspective view of FIG. 21D where a base lock is inserted into the interior space of the exemplary hooking member and an additional hook is connected to a portion of the hooking member.

FIG. 21G is a rear perspective view of the hooking member of FIG. 21A in another stage of assembly where an exemplary knob anchor is attached to the locking base joined with the hooking member and illustrating an alternative additional hook joined with a loop in the hooking member according to another example system configuration.

Figure 21A:
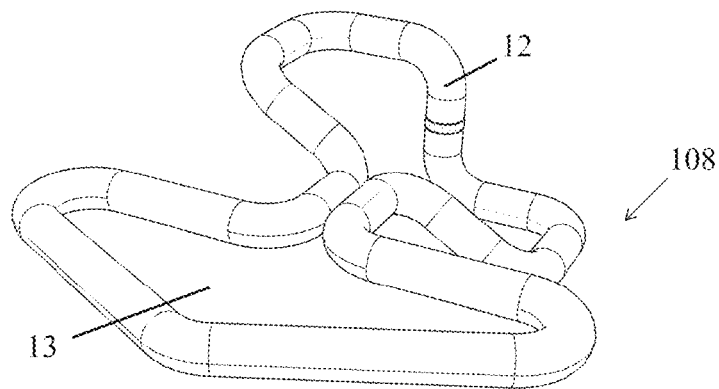
Figure 21B:
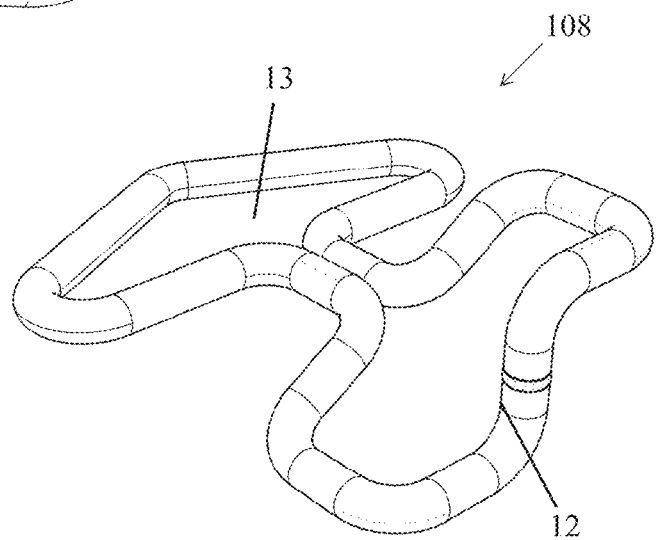
Figure 21C:
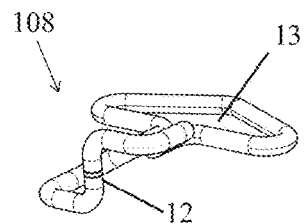
Figure 21D:
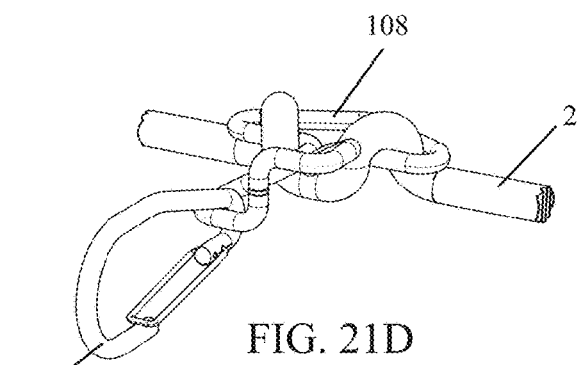
Figure 21E:
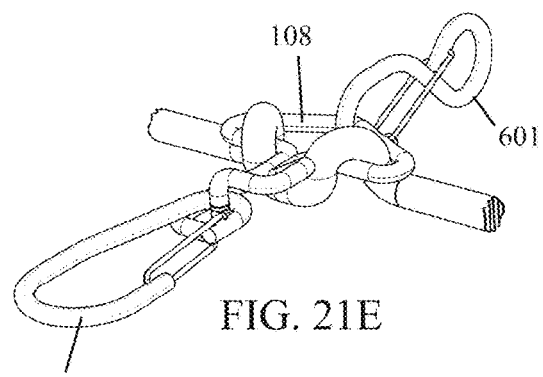
Figure 21F:
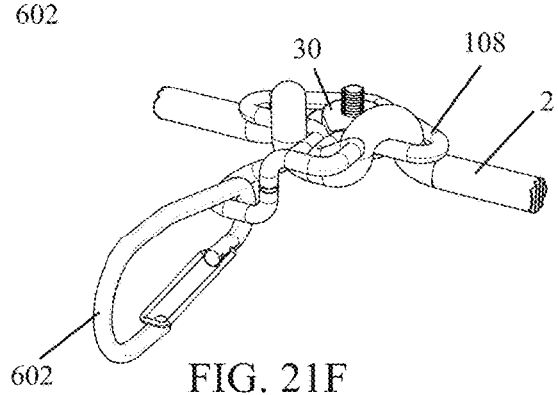
Figure 21G:
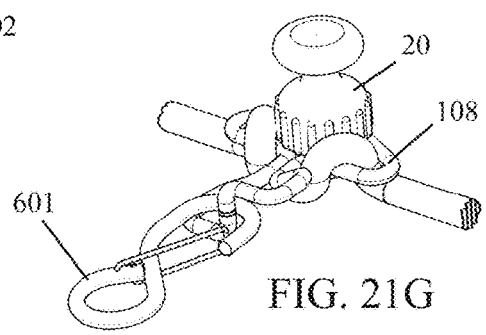
Figure 21I:
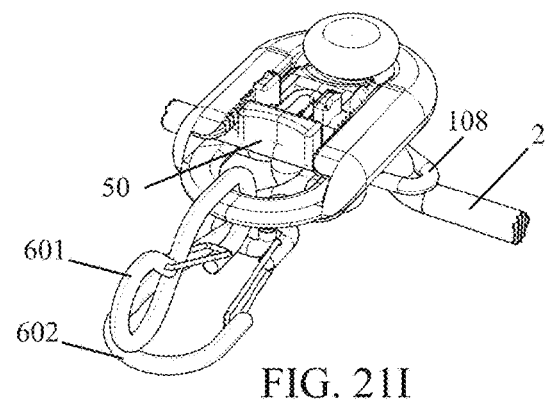
Figure 21H:
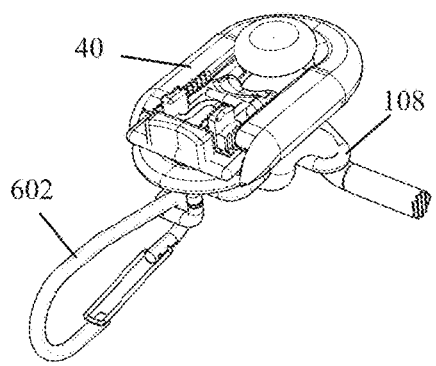

FIG. 21H is a rear perspective view of the hooking member of FIG. 21A in another stage of assembly but without a tarp inserted in order to show detail. In this example configuration, an additional hook is joined with a loop in the hooking member and the compressing device has not yet been completely clamped to the tarp anchor.

FIG. 21I is a rear perspective view of the hooking member of FIG. 21A in a later stage of assembly but without a tarp inserted in order to show detail. In this example configuration, two additional hooks are joined with the hooking member and the compressing device. The compressing device has been clamped over the tarp anchor attached to the locking base rope according to another example configuration.

FIG. 22A is a perspective view of yet another hooking member.

FIG. 22B is a top view of FIG. 22A where the bottom view is a mirror image.

FIG. 22C is a first end view of FIG. 22A.

FIG. 22D is a second end view of FIG. 22A.

FIG. 22E is a front view of FIG. 22A.

FIG. 22F is a back view of FIG. 22A.

FIG. 22G is another perspective view of the hooking member of FIG. 22A illustrated with a strap inserted in order to demonstrate binding functionality.

Figure 22H:
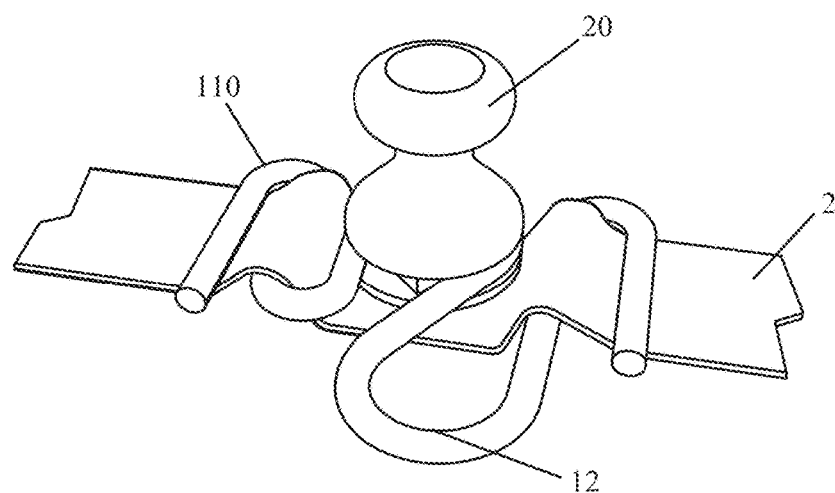

FIG. 22H is another perspective view of the hooking member of FIG. 22A illustrated with a strap and tarp knob and lock.

Figure 22I:
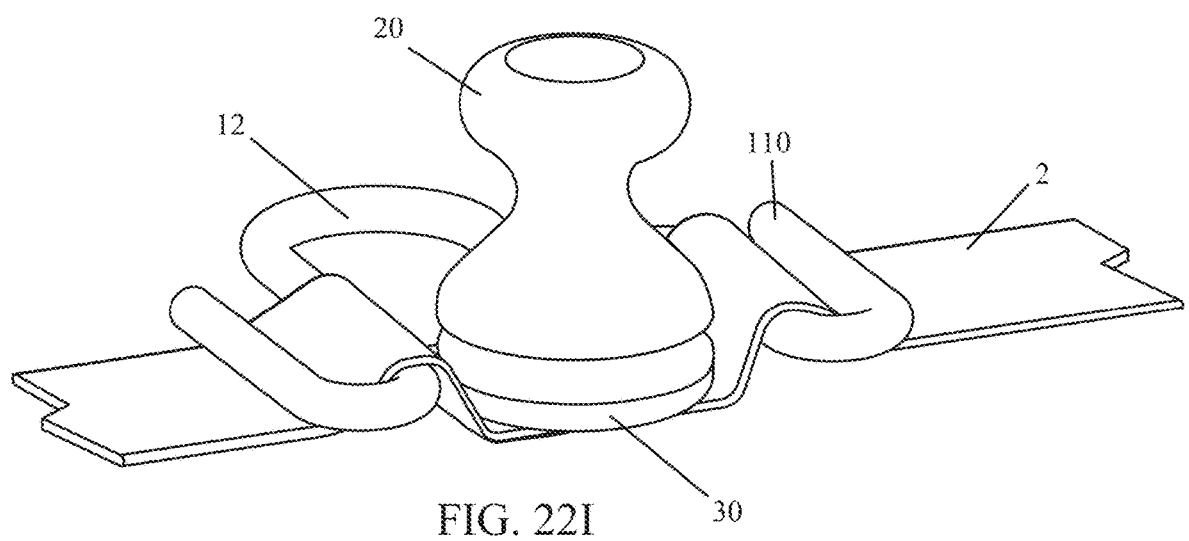

FIG. 22I is another perspective view of FIG. 22H.

FIG. 23A is a perspective view of yet another hooking member.

FIG. 23B is a top view of FIG. 23A where the bottom view is a mirror image.

FIG. 23C is a first end view of FIG. 23A.

FIG. 23D is a second end view of FIG. 23A.

FIG. 23E is a front view of FIG. 23A.

FIG. 23F is a rear view of FIG. 23A.

FIG. 23G is another perspective view of the hooking member of FIG. 23A illustrated with a strap inserted in order to demonstrate binding functionality.

FIG. 24A is a perspective view of yet another hooking member.

FIG. 24B is a top view of FIG. 24A where the bottom view is a mirror image.

FIG. 24C is a first end view of FIG. 24A.

FIG. 24D is a second end view of FIG. 24A.

FIG. 24E is a front view of FIG. 24A.

FIG. 24F is a rear view of FIG. 24A.

FIG. 24G is another perspective view of the hooking member of FIG. 24A illustrated with a strap inserted in order to demonstrate binding functionality.

Figure 25A:
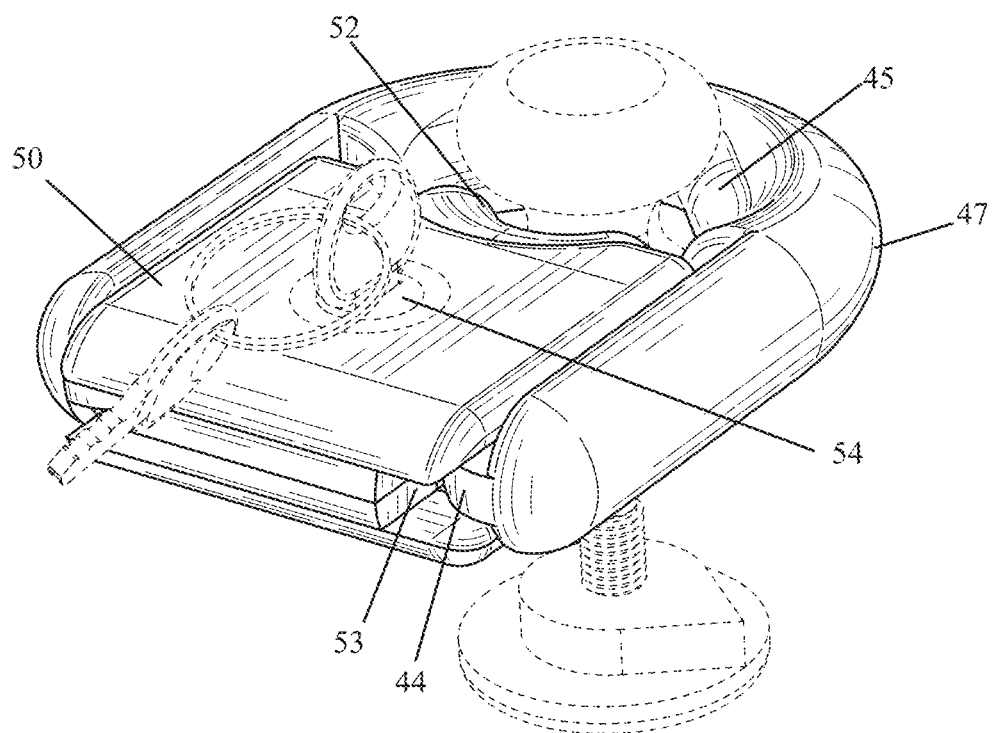

FIG. 25A is a top perspective view of a keyed embodiment of a tarp compressing device.

Figure 25B:
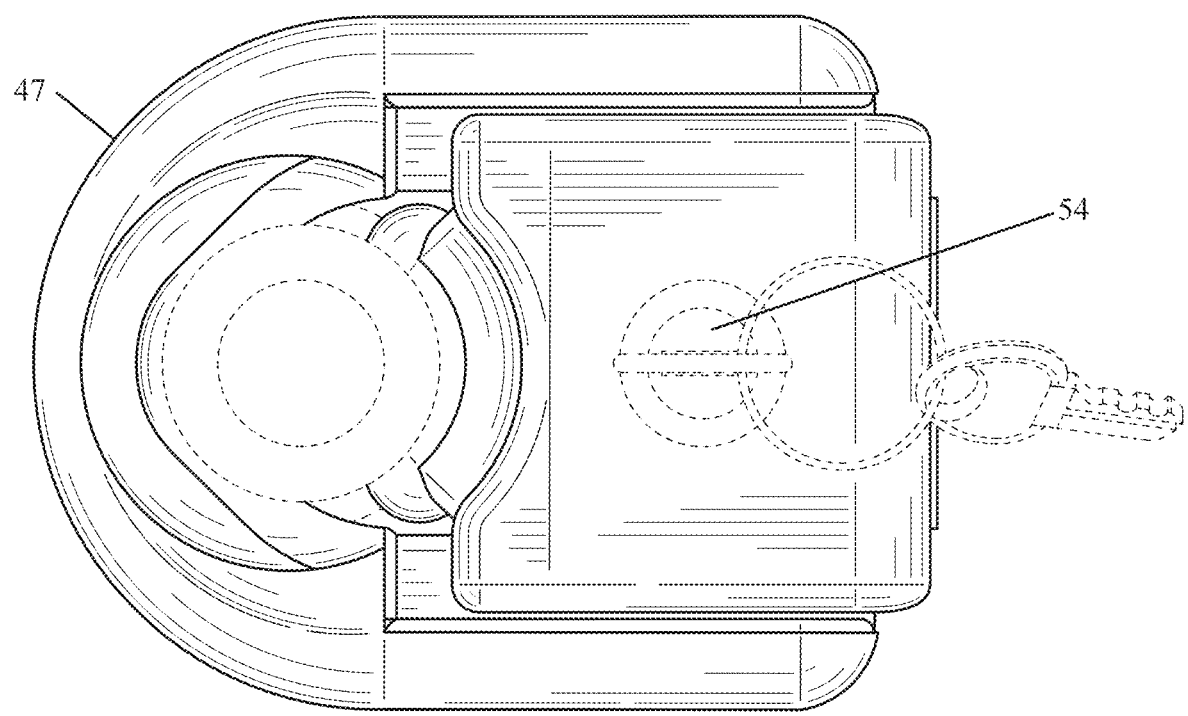

FIG. 25B is a top view of FIG. 25A.

Figure 25C:
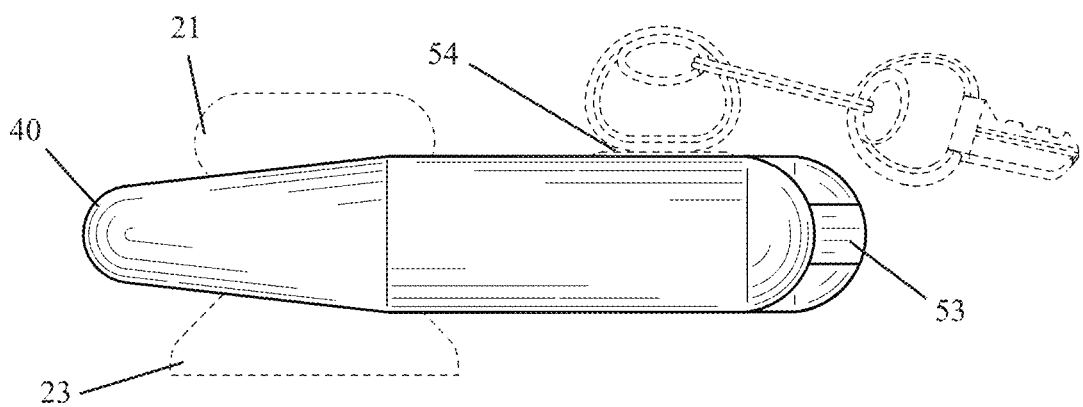
Figure 25C:
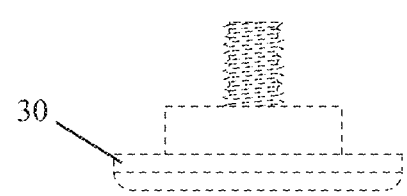

FIG. 25C is a side view of FIG. 25A.

Figure 25D:
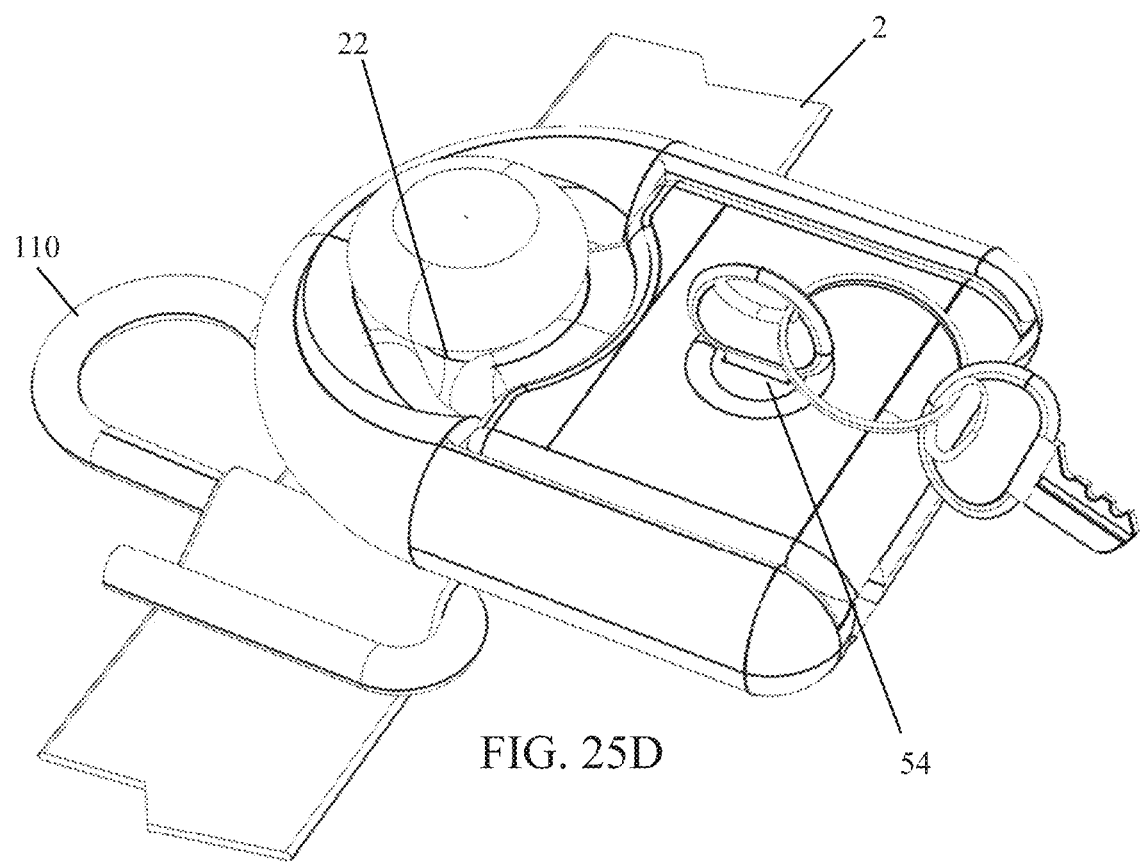

FIG. 25D is a top perspective view of the compressing device embodiment of FIG. 25A illustrating the attachment to a hooking device and strap (tarp omitted to show detail).

Figure 26A:
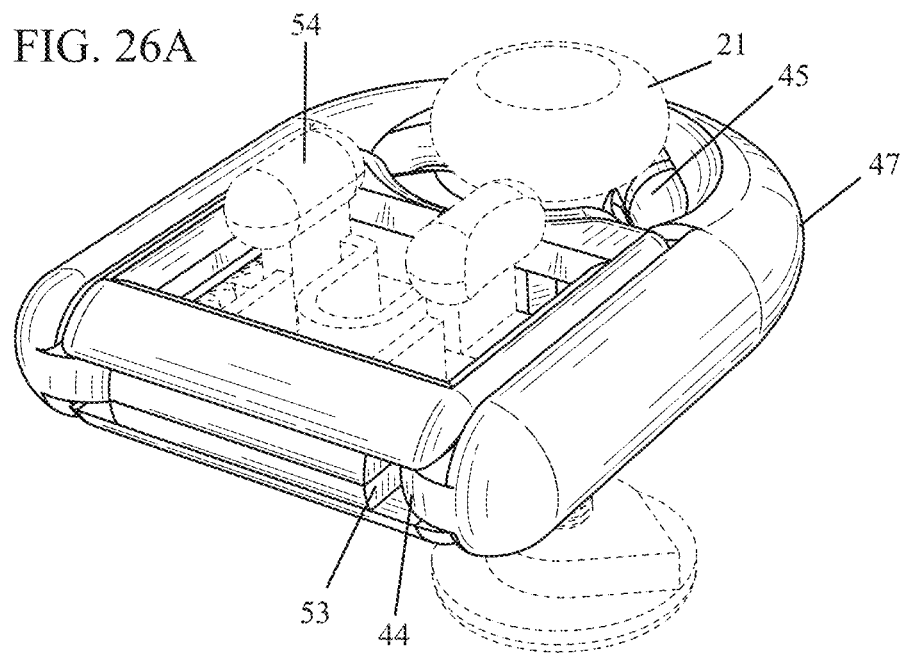

FIG. 26A is a top perspective view of one exemplary tarp compressing device.

Figure 26B:
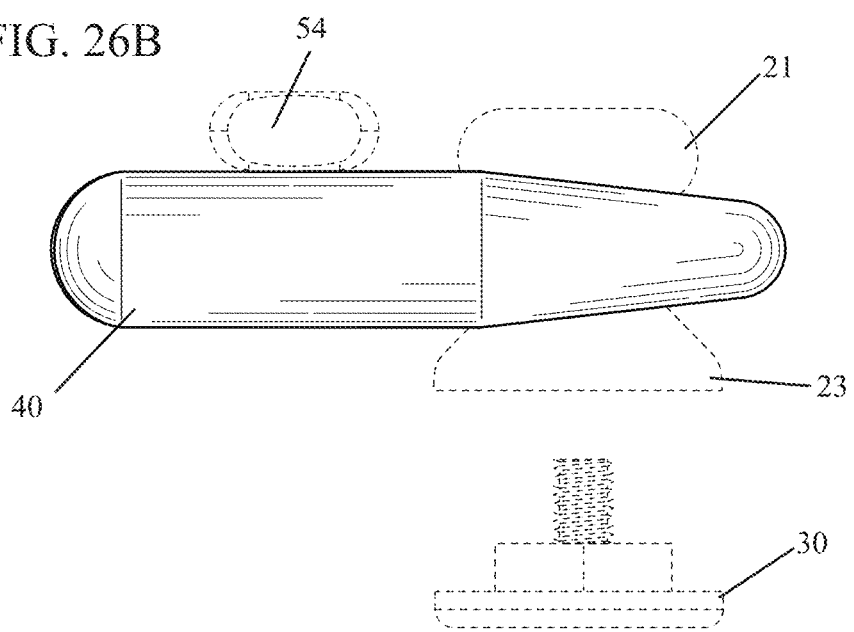

FIG. 26B is a first side view of FIG. 26A where the second side view of the compressing device is a mirror image.

Figure 26C:
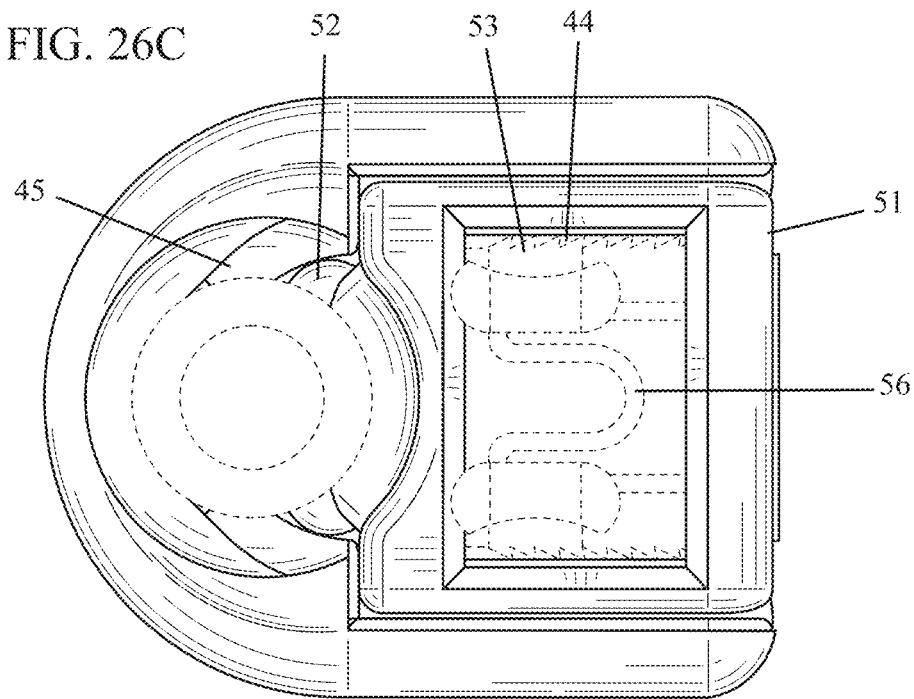

FIG. 26C is a top view of FIG. 26A.

Figure 26D:
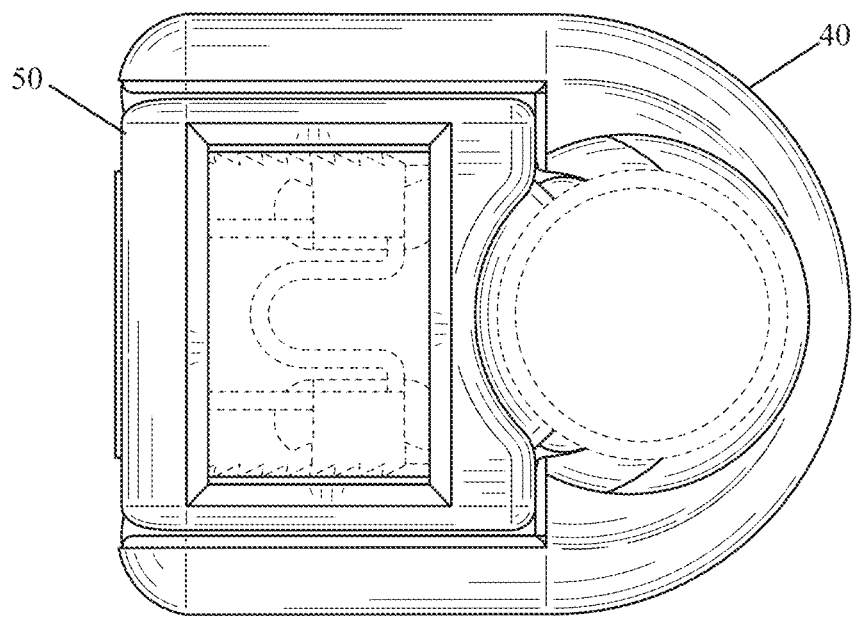

FIG. 26D is a bottom view of FIG. 26A.

Figure 26E:
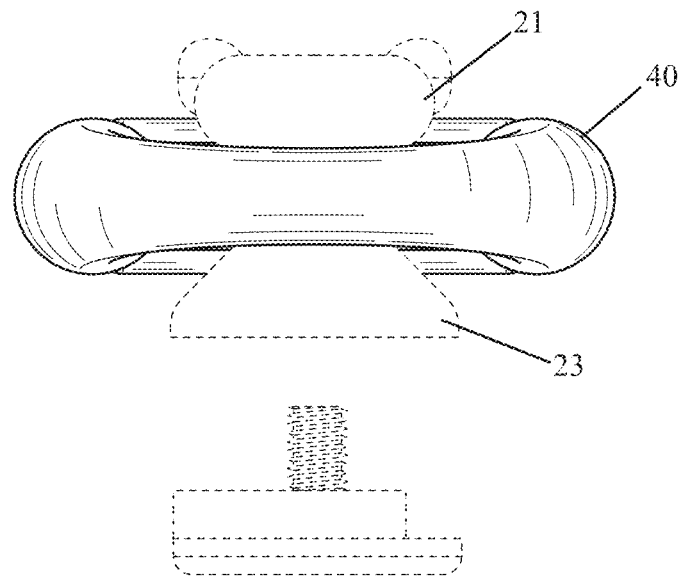

FIG. 26E is a front view of FIG. 26A.

Figure 26F:
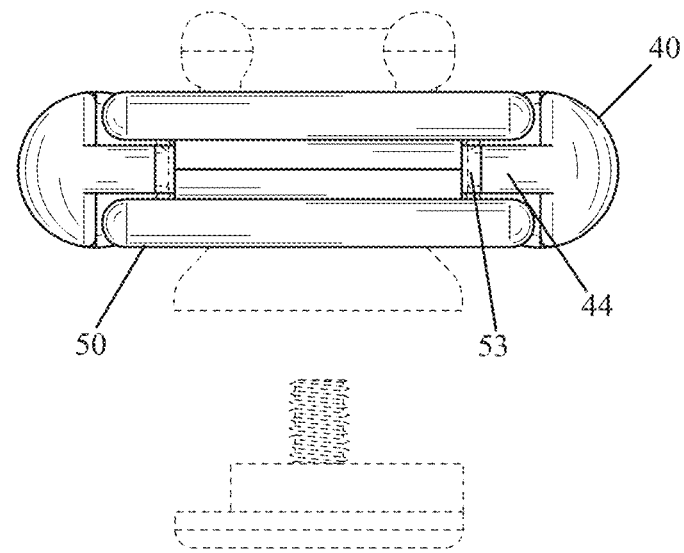

FIG. 26F is a rear view of FIG. 26A.

Figure 26G:
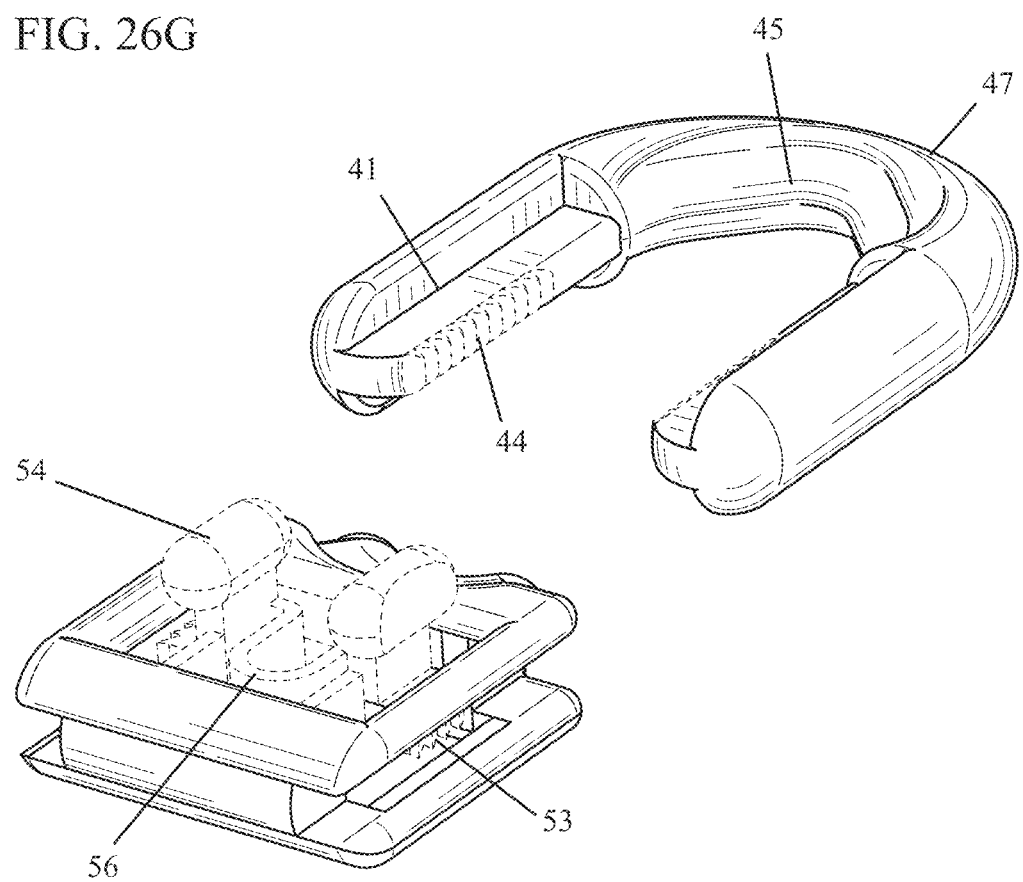

FIG. 26G is an exploded perspective view of FIG. 26A.

Figure 26H:
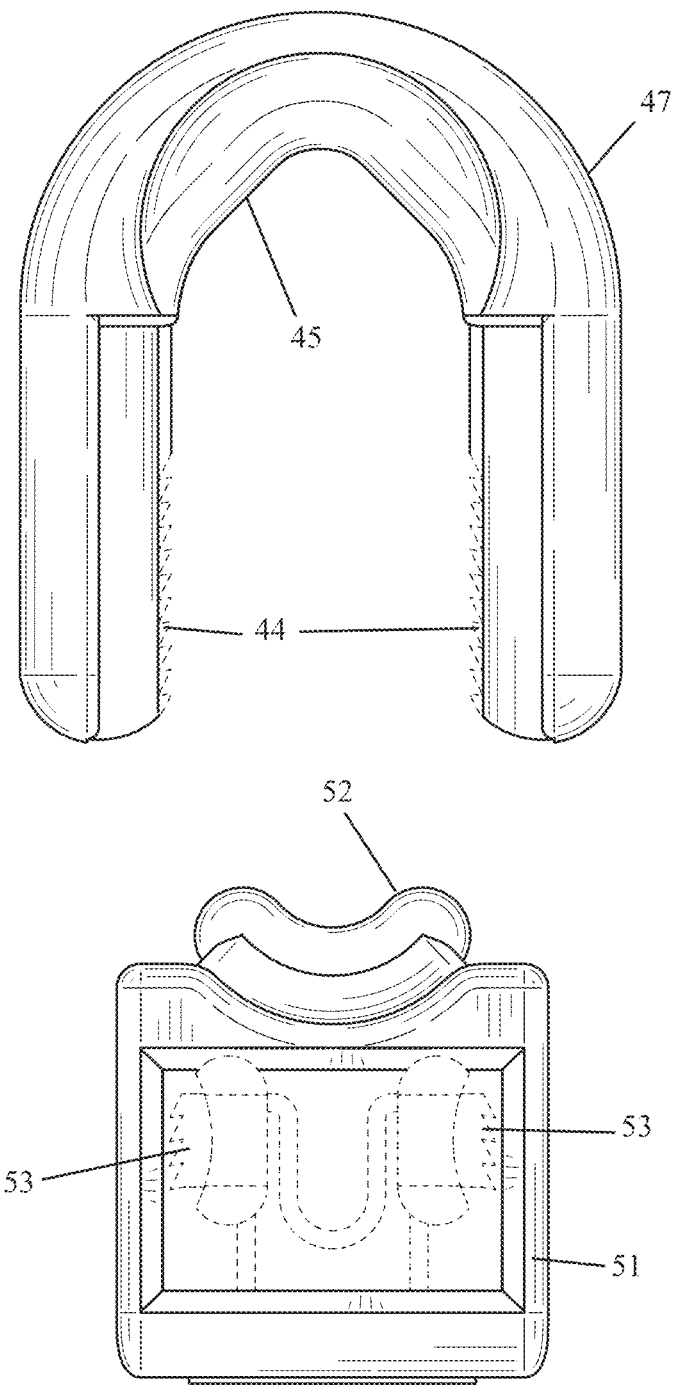

FIG. 26H is a top view of FIG. 26G.

Figure 26I:
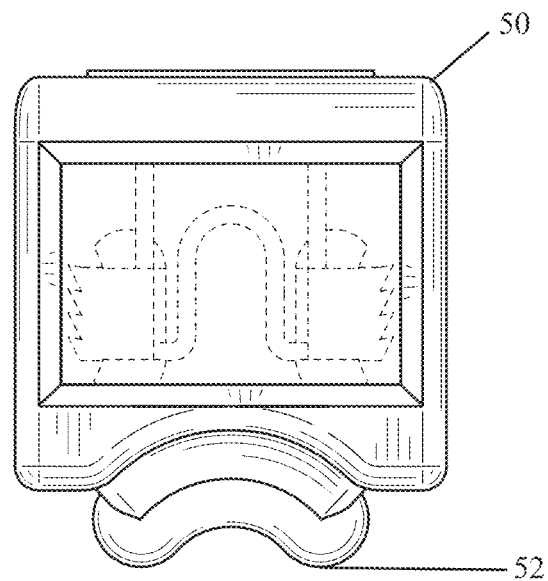
Figure 26I:
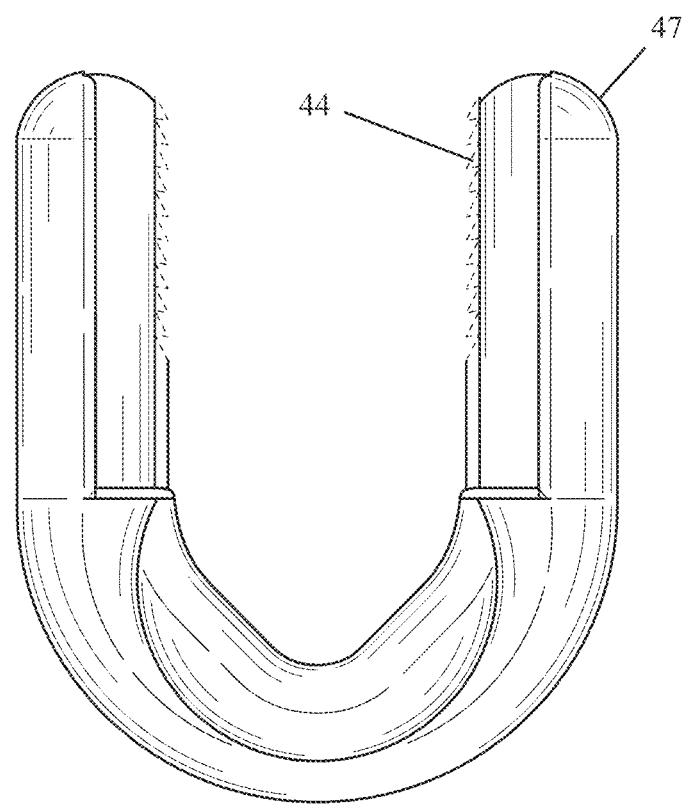

FIG. 26I is a bottom view of FIG. 26G.

Figure 26J:
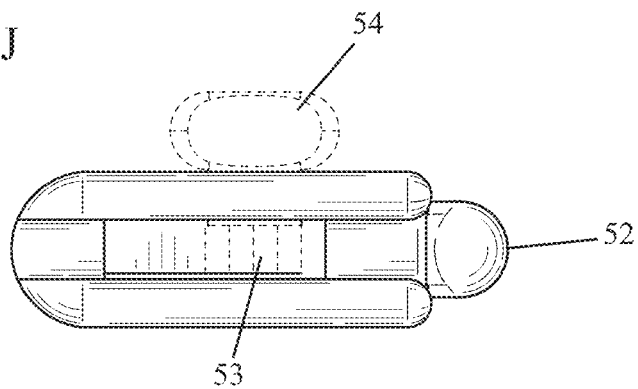

FIG. 26J is a side view of the sliding latch of the exemplary compressing device shown in isolation from FIG. 26G.

Figure 26K:
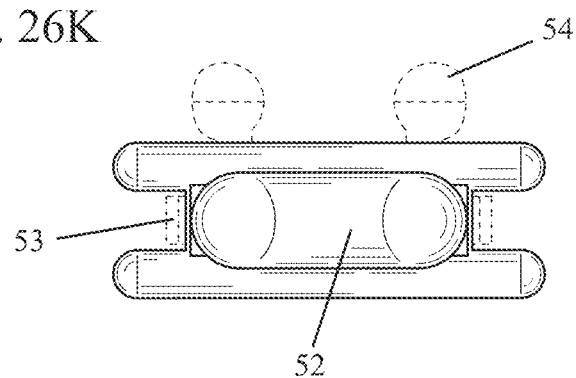

FIG. 26K is a front view of FIG. 26J.

Figure 26L:
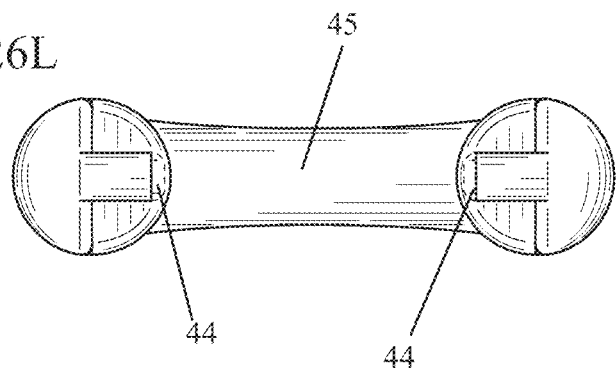

FIG. 26L is a rear view of the tarp knob receiver of the exemplary compressing device shown in isolation from FIG. 26G.

Figure 27A:
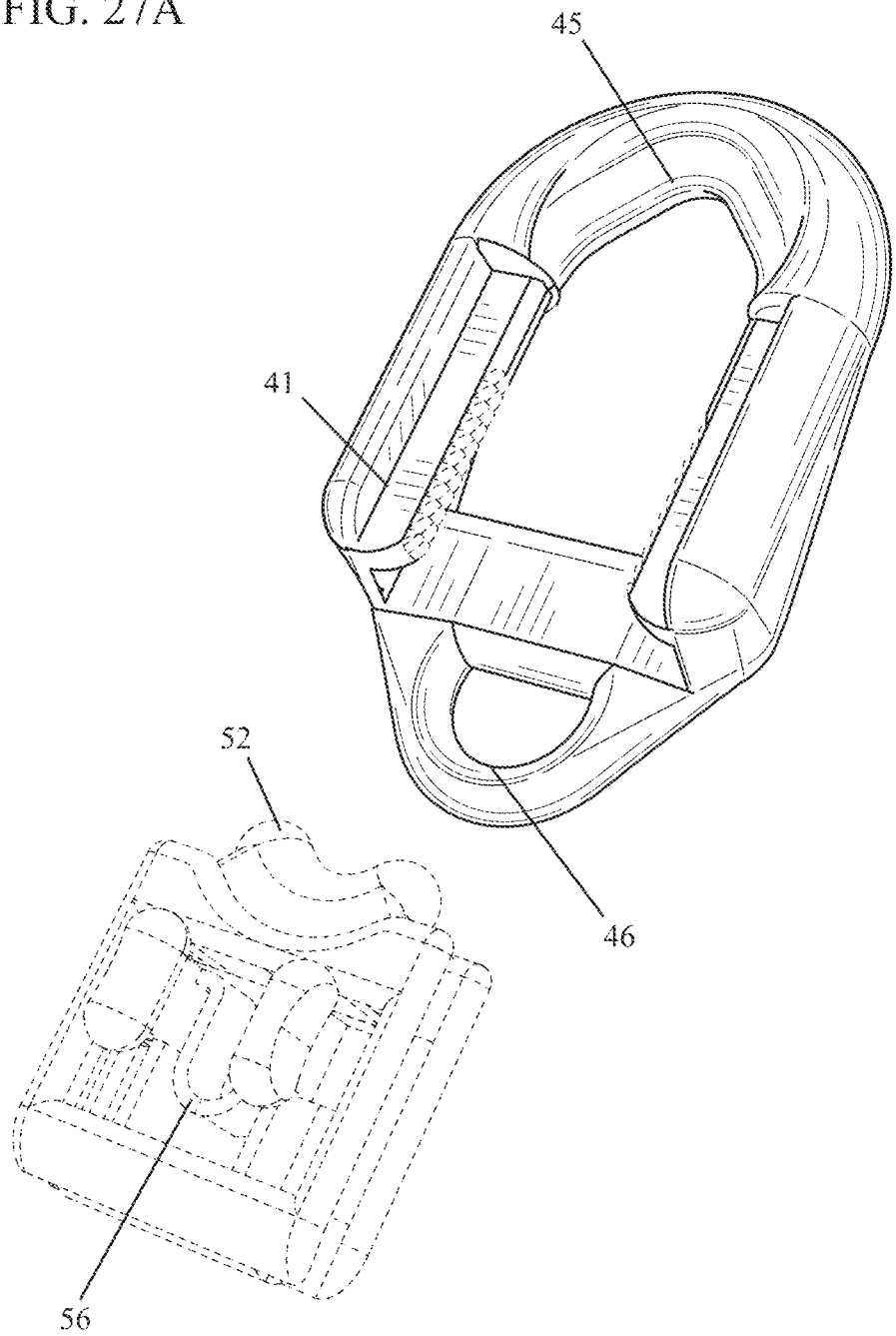

FIG. 27A is a top perspective view of another exemplary tarp compressing device having a tarp knob receiver with a dedicated hooking loop and shown disengaged from the sliding latch mechanism.

Figure 27B:
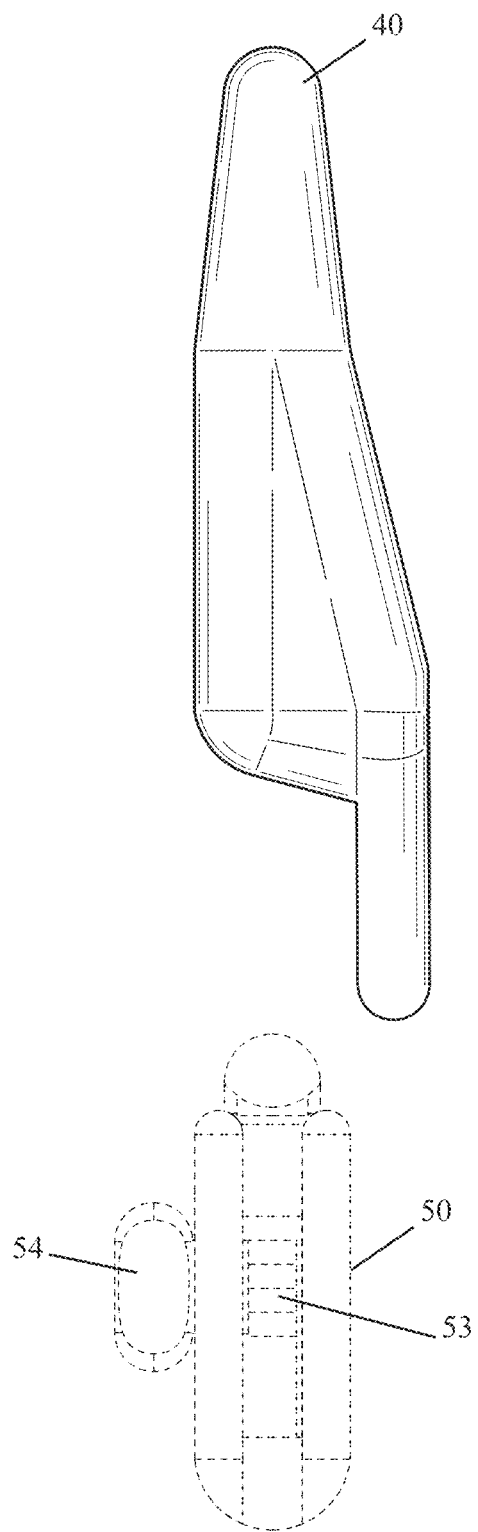

FIG. 27B is a first side view of FIG. 27A where the second side view is a mirror image.

Figure 27C:
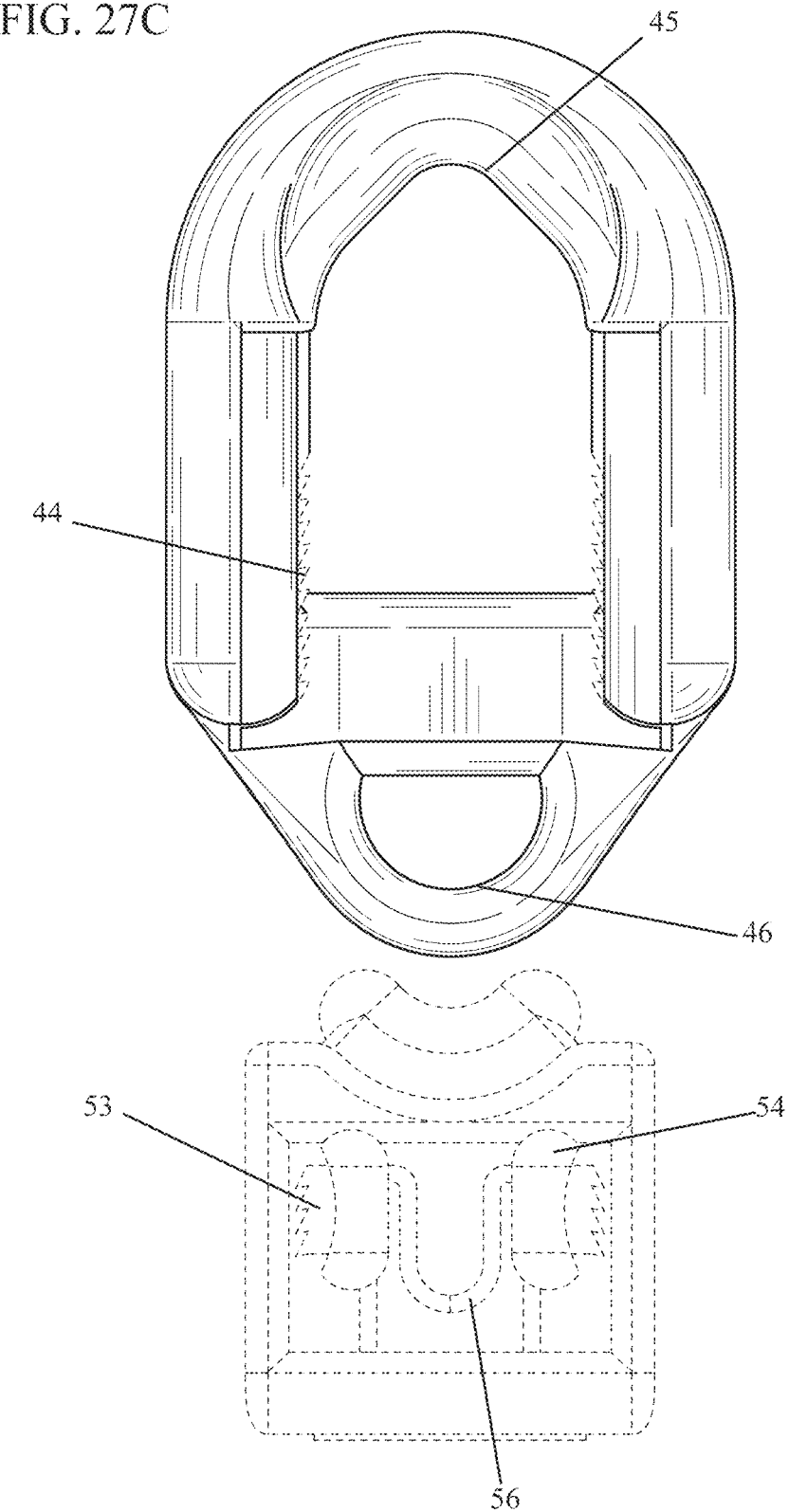

FIG. 27C is a top view of FIG. 27A.

Figure 27D:
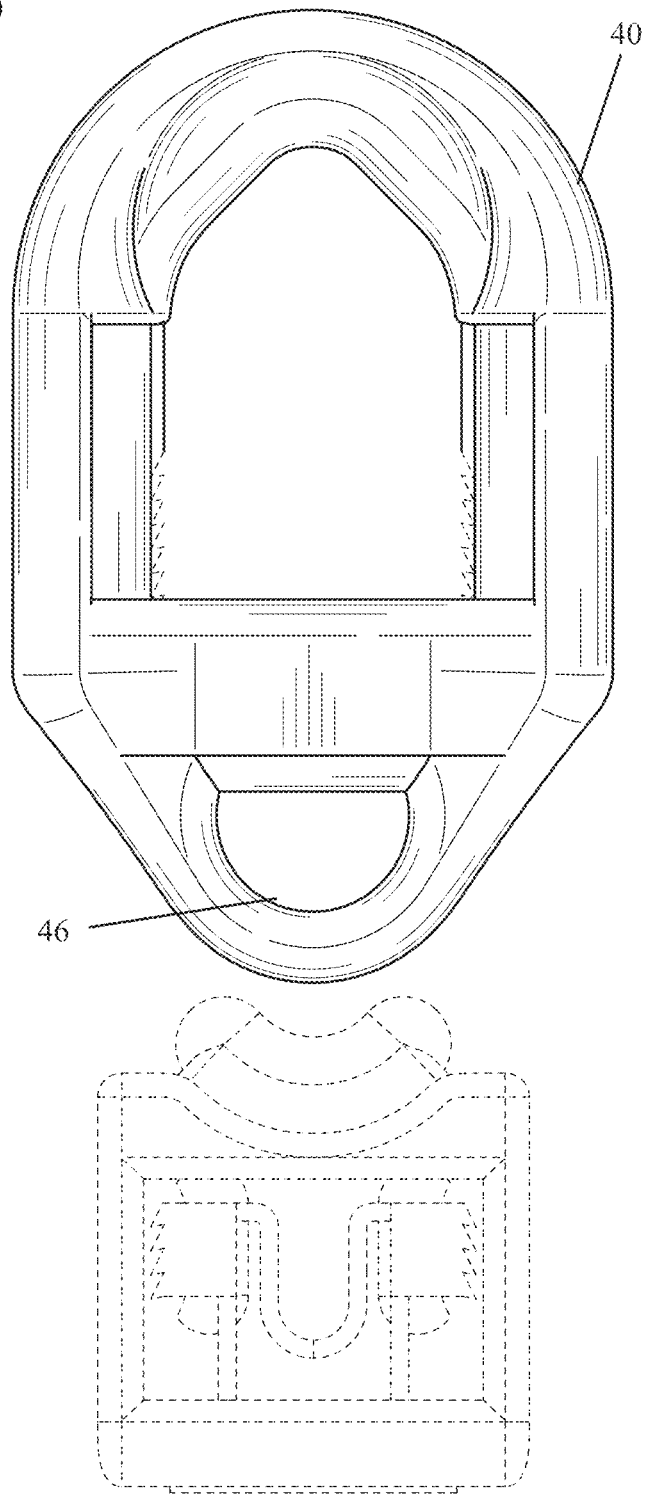

FIG. 27D is a bottom view of FIG. 27A.

Figure 27E:
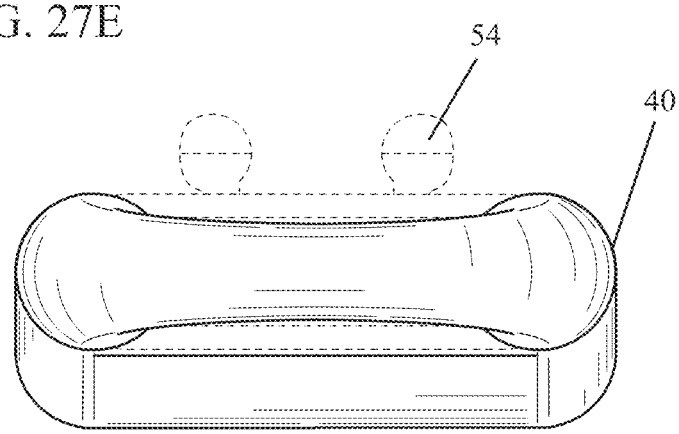

FIG. 27E is a front view of FIG. 27A.

Figure 27F:
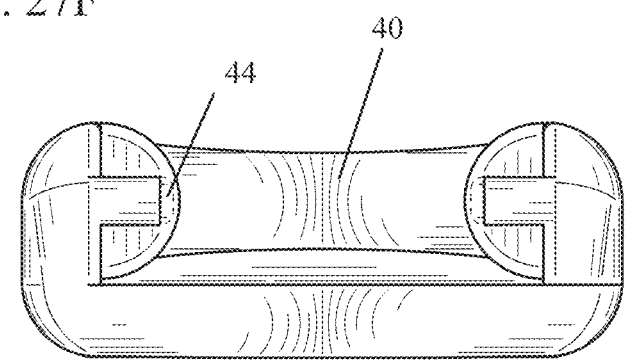

FIG. 27F is a rear view of FIG. 27A with this exemplary tarp knob receiver shown in isolation.

Figure 27G:
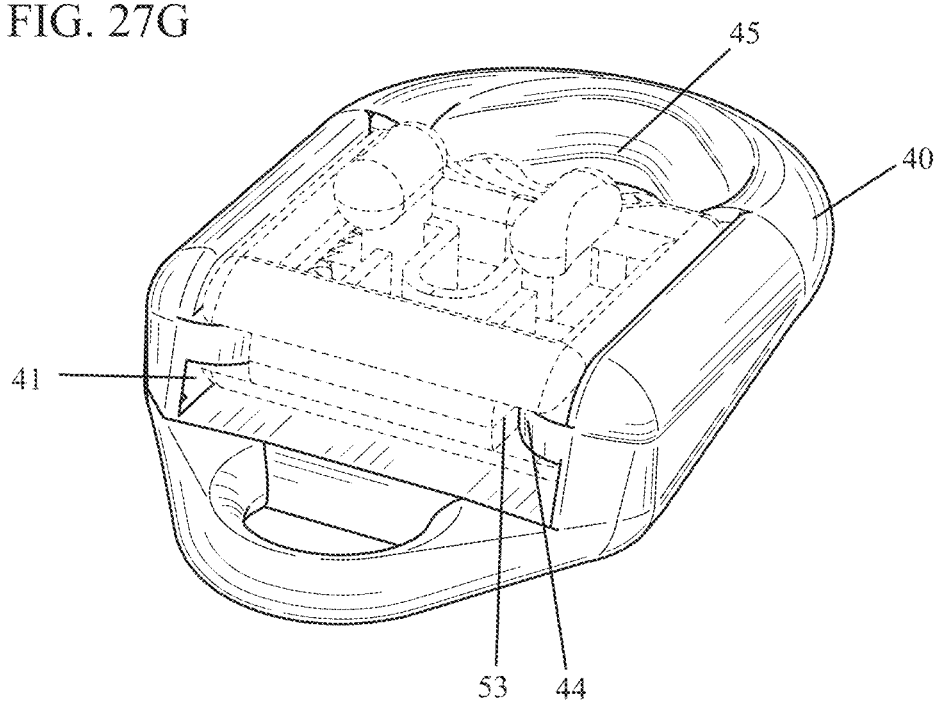

FIG. 27G is a top perspective view of the exemplary tarp compressing device of FIG. 27A illustrating the sliding latch mechanism fully engaged showing two hooking points.

Figure 27H:
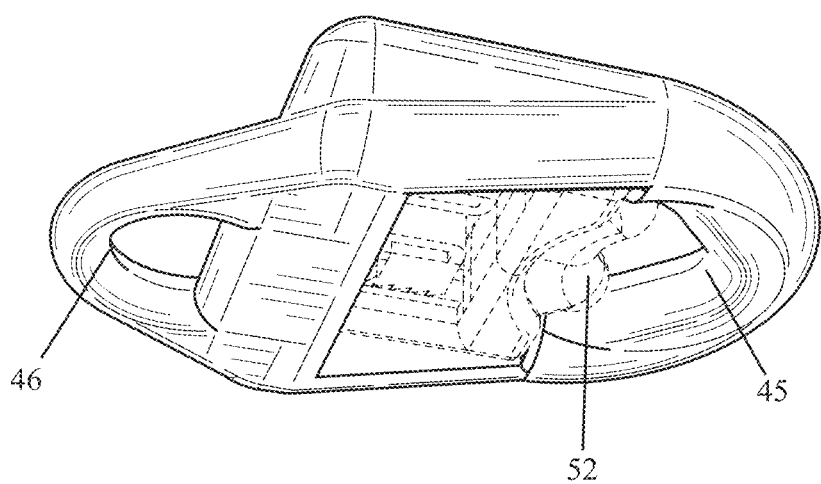

FIG. 27H is a bottom perspective view of FIG. 27G.

Figure 28A:
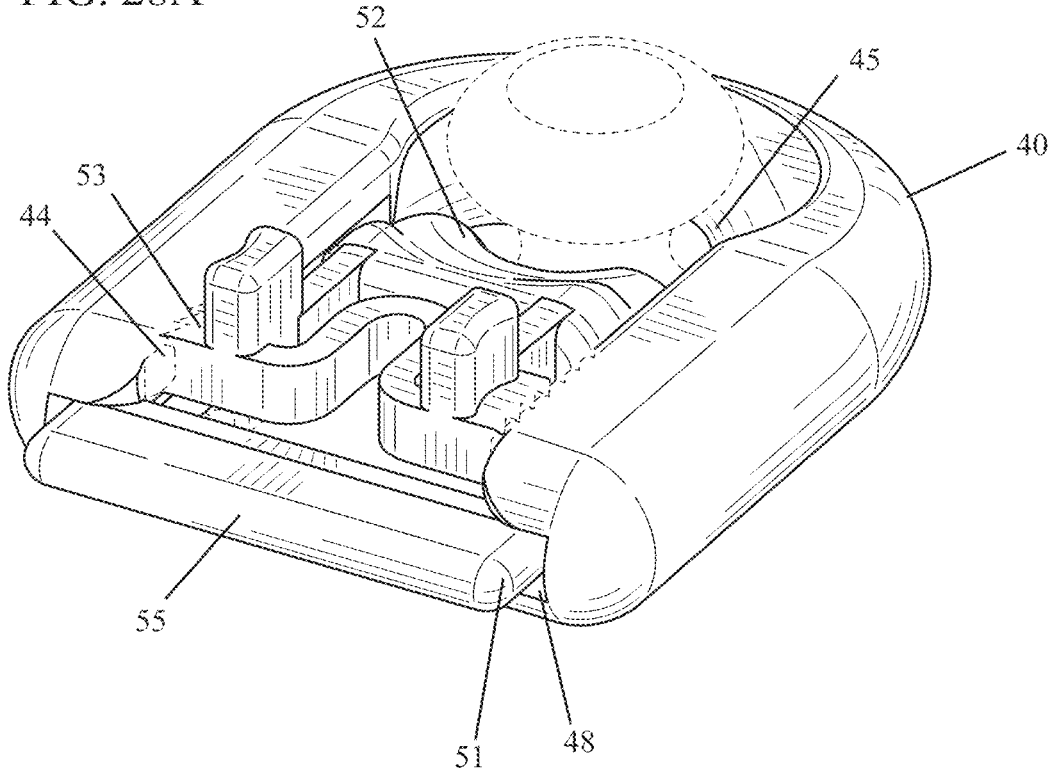

FIG. 28A is a top perspective view of yet another exemplary tarp compressing device having a lock-less tarp knob illustrated (tarp omitted to show detail).

Figure 28B:
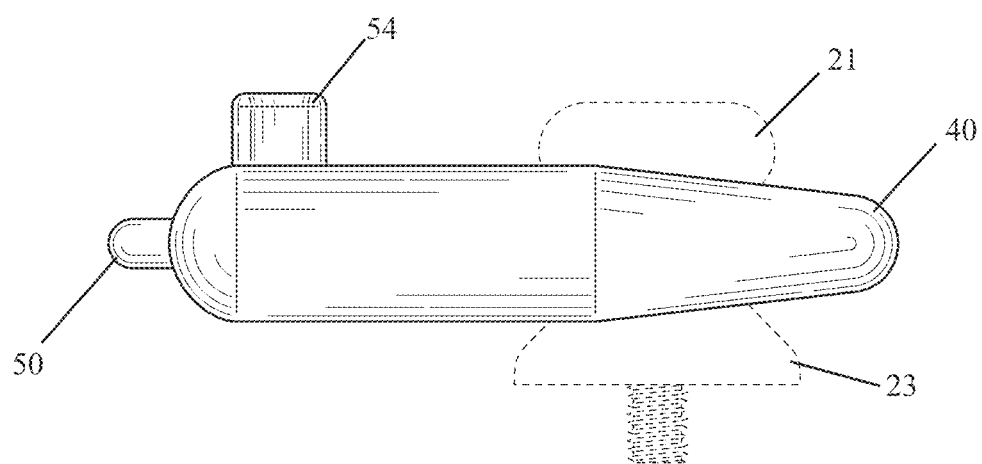

FIG. 28B is a side view of FIG. 28A.

Figure 28C:
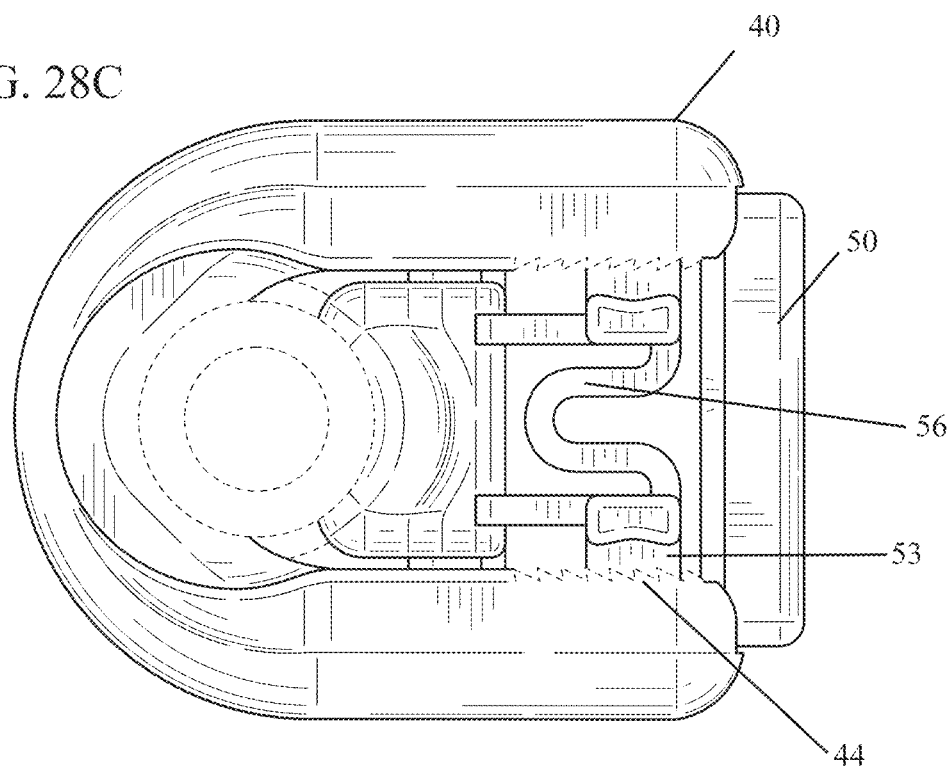

FIG. 28C is a top view of FIG. 28A.

Figure 28D:
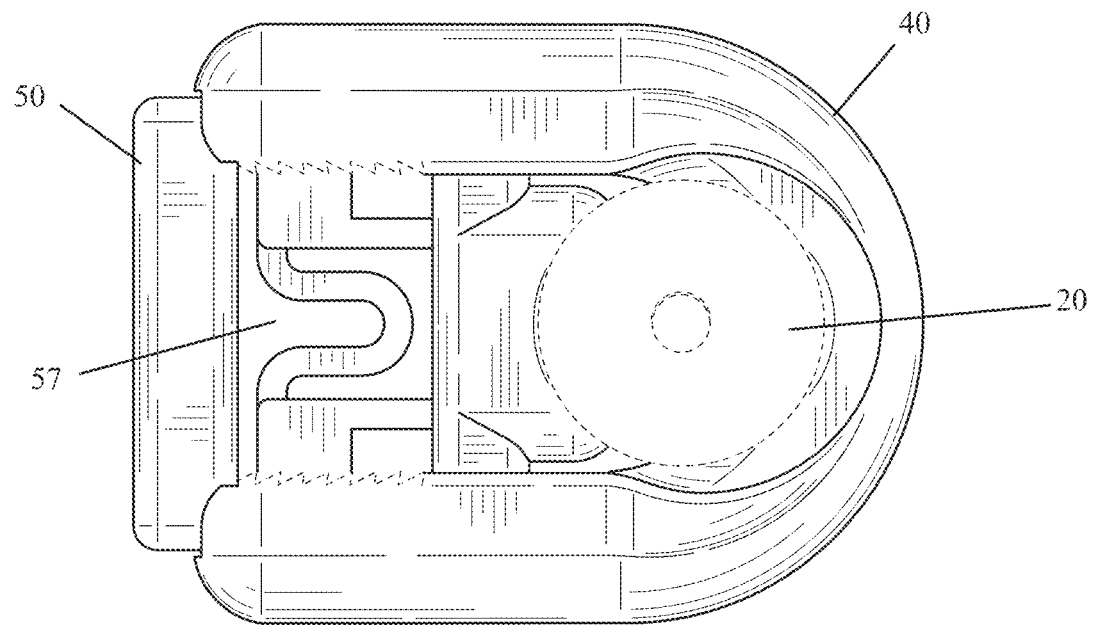

FIG. 28D is a bottom view of FIG. 28A.

Figure 28E:
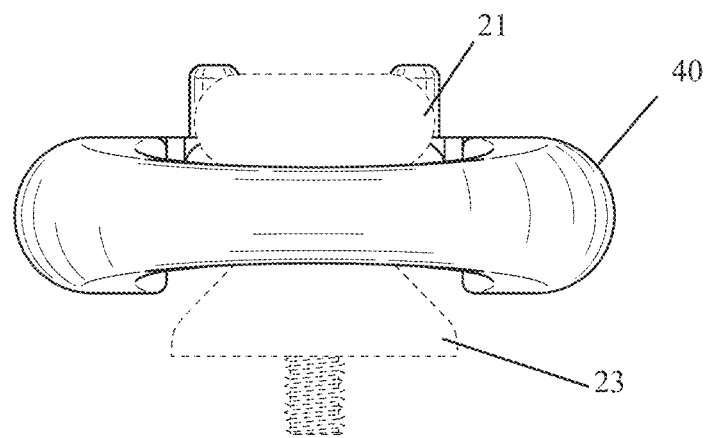

FIG. 28E is a front view of FIG. 28A.

Figure 28F:
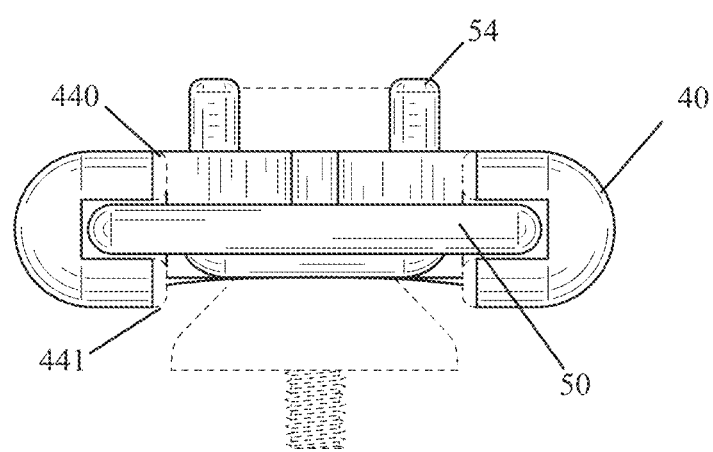

FIG. 28F is a rear view of FIG. 28A.

Figure 28G:
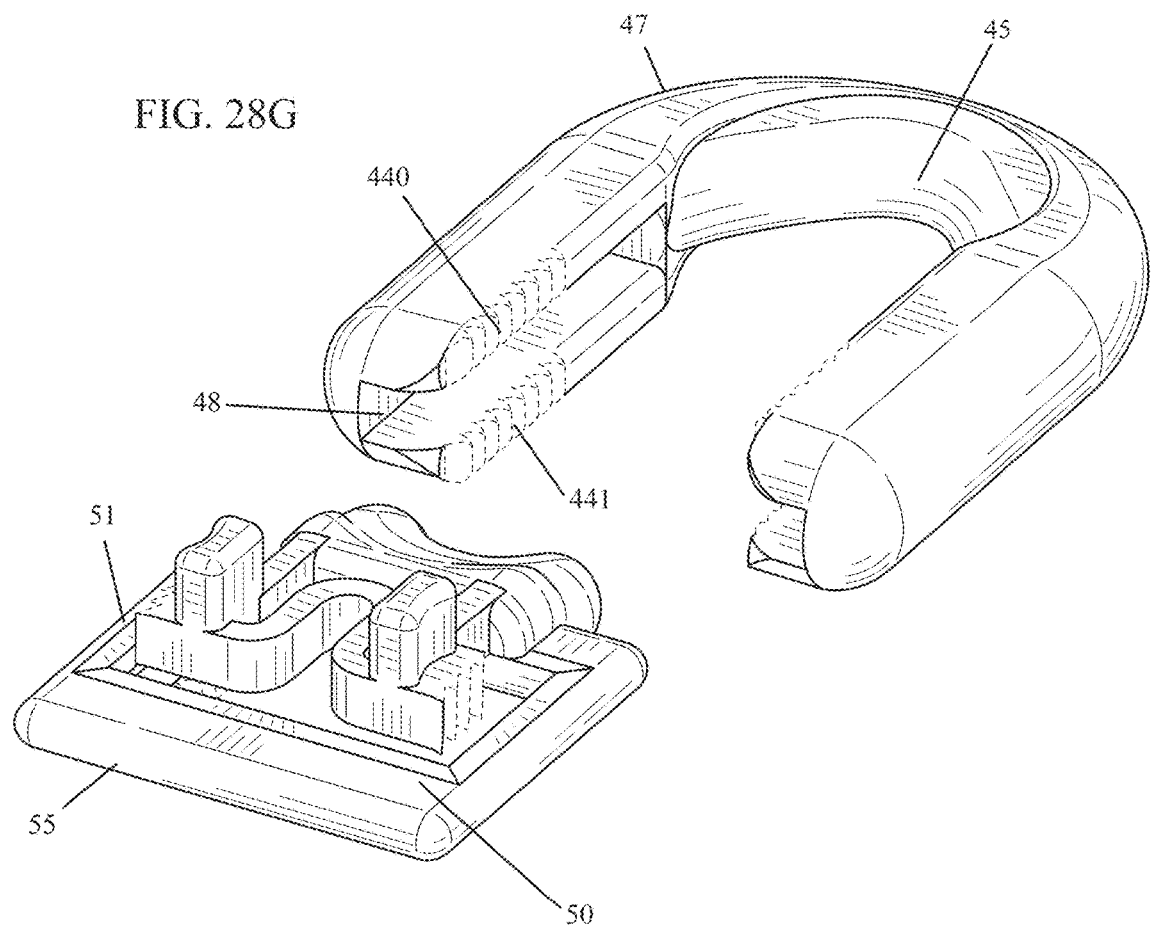

FIG. 28G is an exploded perspective view of FIG. 28A, omitting the tarp knob to show detail.

Figure 28H:
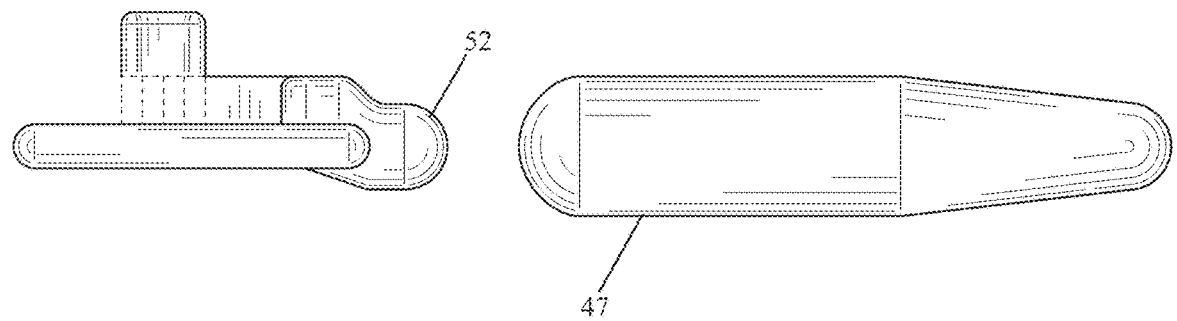

FIG. 28H is a first side view of FIG. 28G where the second side view is a mirror image.

Figure 28I:
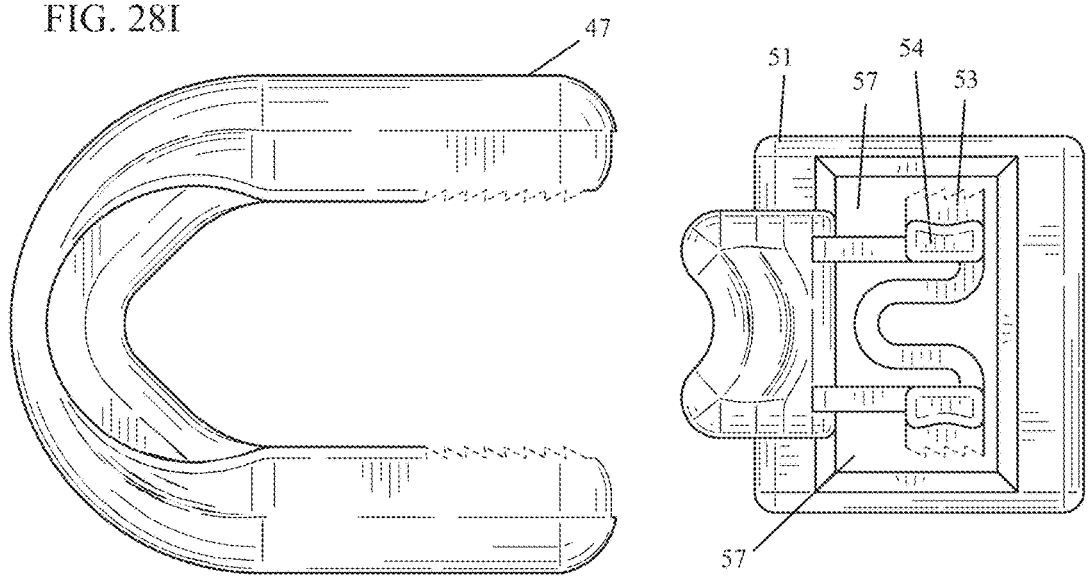

FIG. 28I is a top view of FIG. 28G.

Figure 28J:
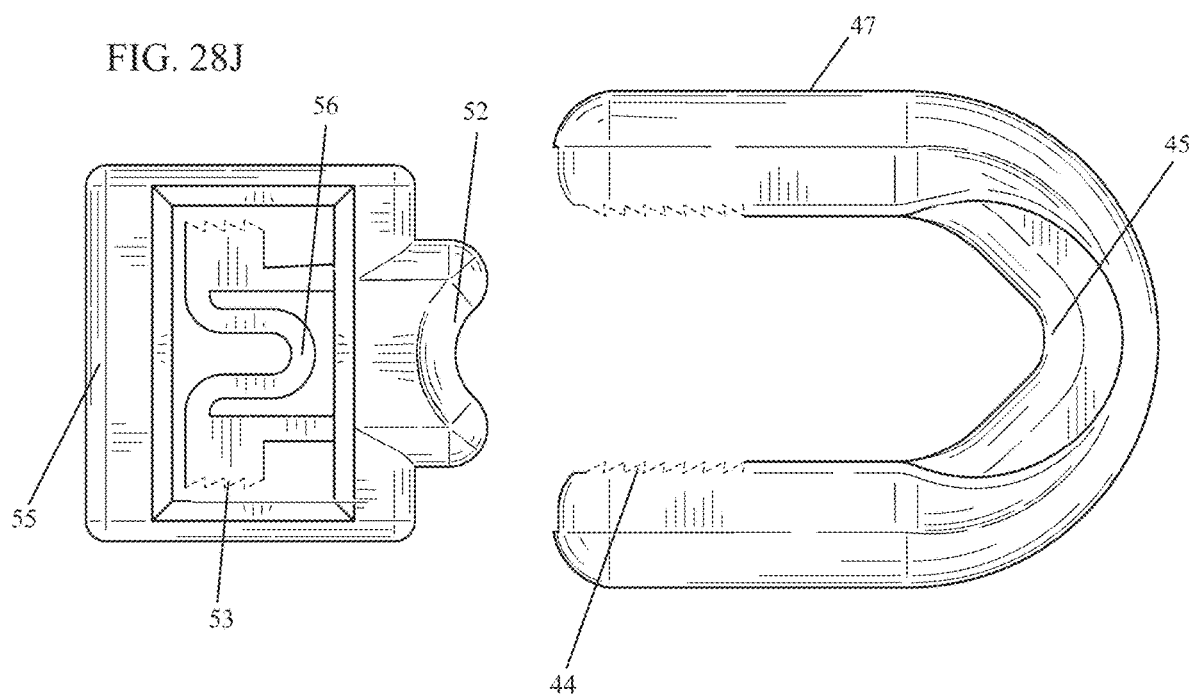

FIG. 28J is a bottom view of FIG. 28G.

DETAILED DESCRIPTION OF THE INVENTION

A system of hooks, loops, and knob devices that attach to cargo straps, tie-down straps, lashing straps, webbing strips, rope and cord mid-span or anywhere along their length without slipping, sliding or tying knots is illustrated in the attached drawings. Hooking components in the system allow joining of these straps, strips, rope or cord to other straps, strips, rope, cord or back to themselves. The ability to secure a load at any select location on the length of the tie-down allows maximum load security from spillage or damage. The system prevents slipping, sliding or having to tie knots to secure a load. One of the system devices serves as an anchoring point for the purpose of grabbing a tarp when it is engaged with any of the other system devices or when it is fastened to the hook of an existing tie-down strap, vehicle, or other attachment point.

With reference to FIGS. 1A-1G, an exemplary system including a hook, tarp anchor, and a tarp compressing device is shown attached to a strap but in isolation from any load or tarp covering. The hooking member 10 of this example configuration is shown weaving in and out of a strap 2. Features of the hooking member 10 cooperate with the locking base 30 of the knob anchor 20 to provide a receiving point for the compressing device 40 to wrap over a panel of tarping material (not shown) and which may then be compressed and held in place as the moveable mechanism 50 slides into the interior of the anchor receiver 40. The individual components of this example are shown in exploded configuration in FIG. 1H. In this illustration, the anchor receiving hole 13 of the mid-span hook 10 is visible when separated from tarp lock base 30. In the illustrated example, the tarp lock base 30 is configured with a raised surface in a tear-drop shape. This configuration holds the base 30 and therefore the knob in a static position relative to the strap 2 secured in the hook 10. The center of the base 30 in this example includes female threading 33 to receive a male-threaded bolt 24 protruding from the lower portion 23 of the tarp knob 20. Examples of threaded fasteners protruding from the locking base are shown in, e.g., FIGS. 5E-5G and 5M.

Figure 1A:
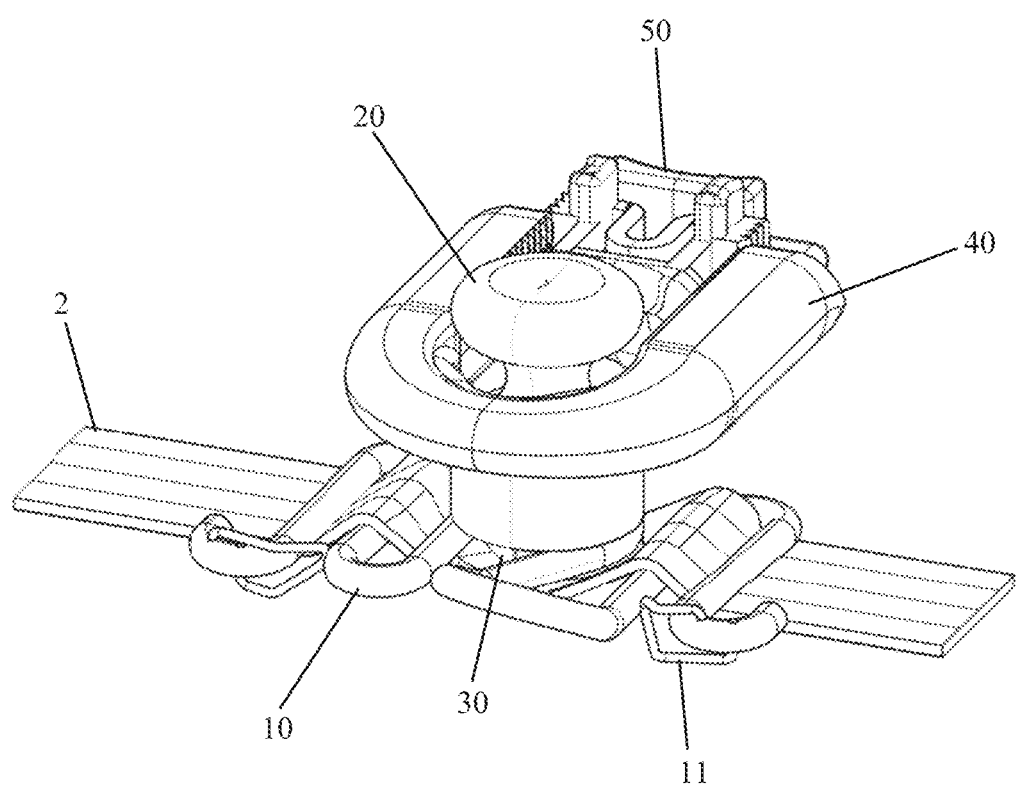
FIG. 1A is a front perspective view of one embodiment of the present invention with the compressing device clamping around a tarp grabbing knob and cutaway view of a strap held in place by a strap receiving device (the tarp is omitted to show detail).
Figure 1B:
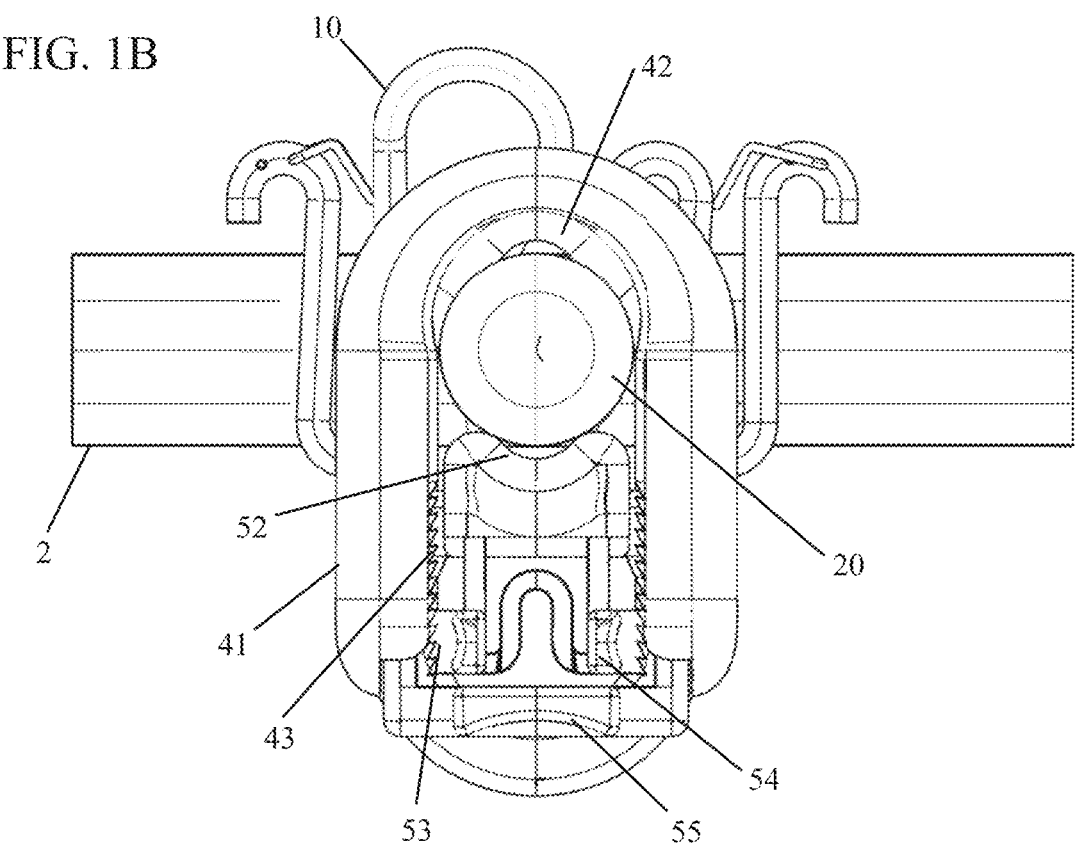
FIG. 1B is a top view of FIG. 1A.
Figure 1C:
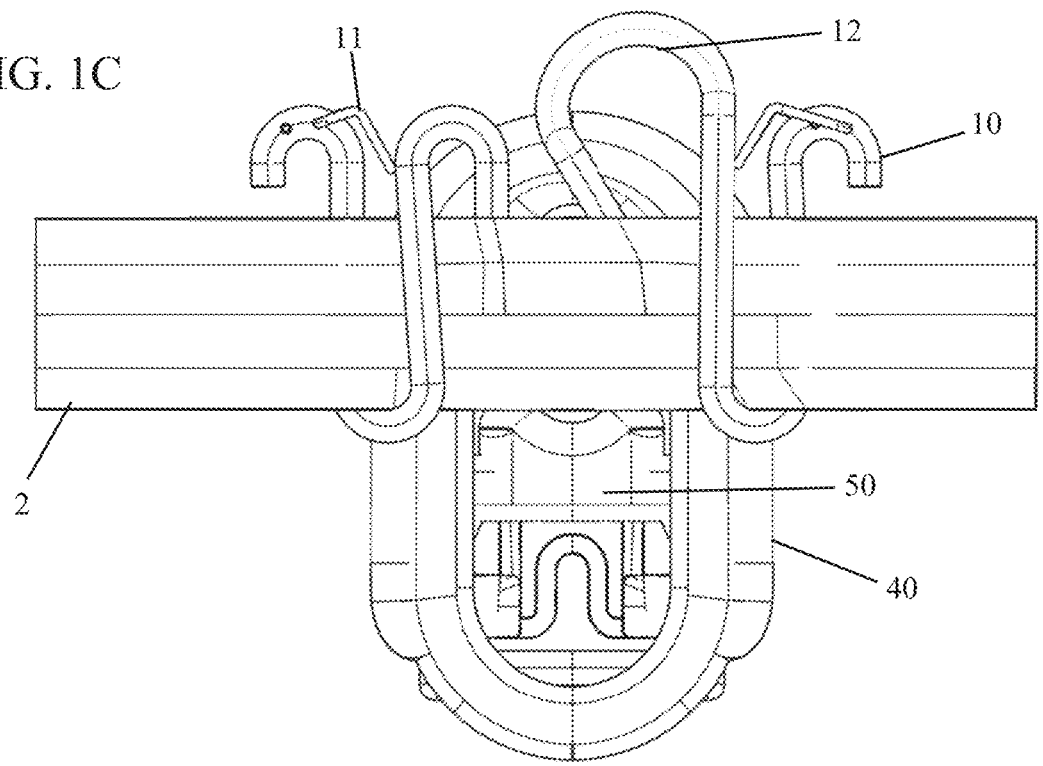
FIG. 1C is a bottom view of FIG. 1A.
Figure 1D:
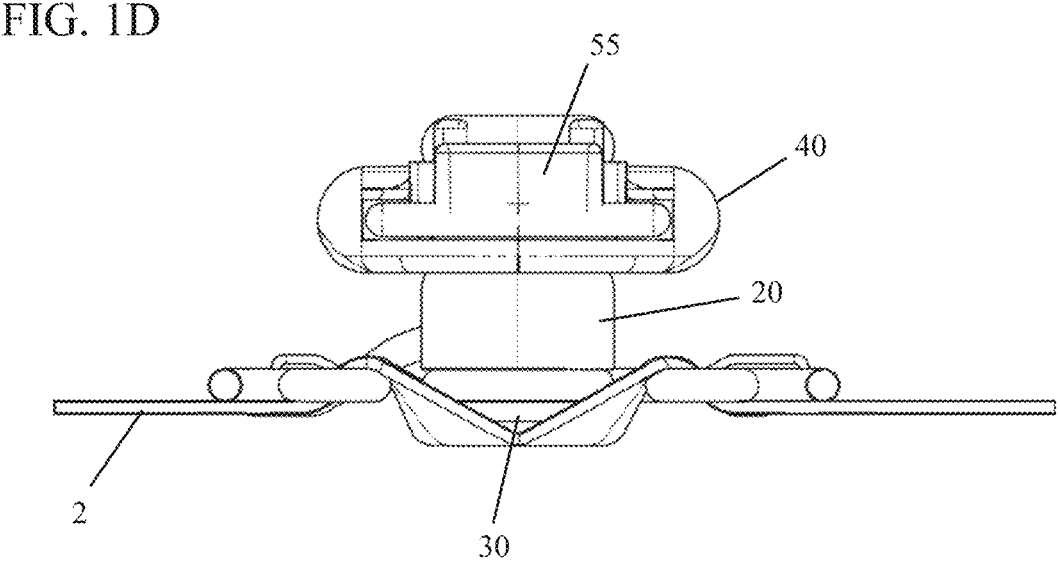
FIG. 1D is a back view of FIG. 1A.
Figure 1E:
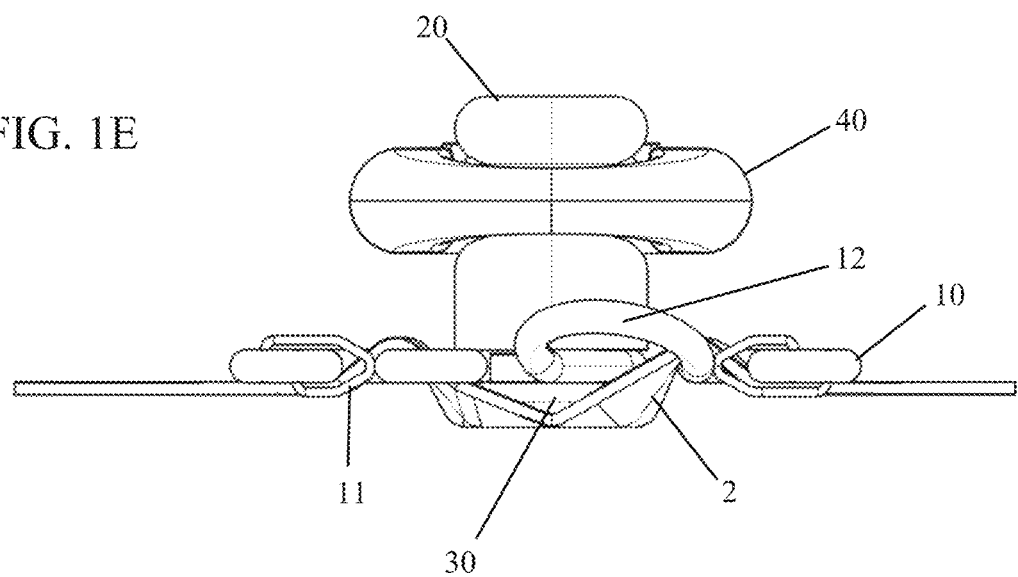
FIG. 1E is a front view of FIG. 1A.
Figure 1F:
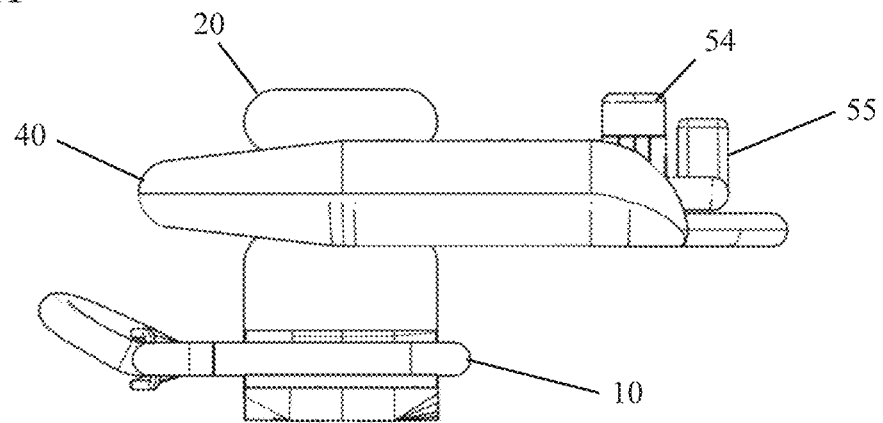
FIG. 1F is a first side view of FIG. 1A.
Figure 1G:
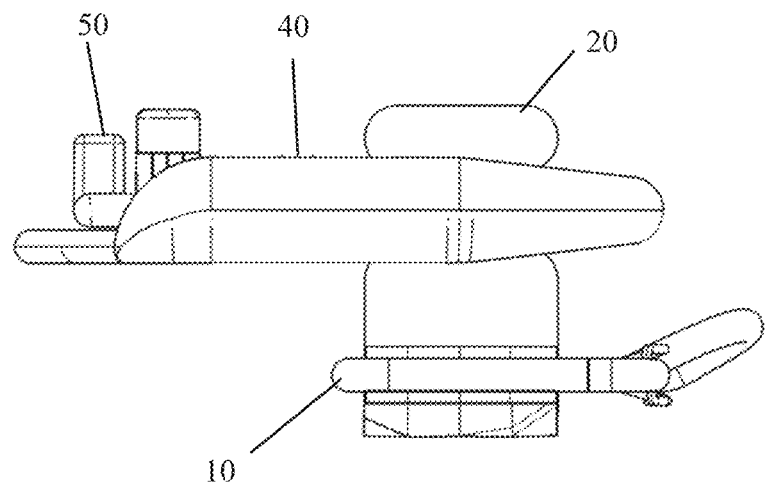
FIG. 1G is a second side view of FIG. 1A.
Figure 2A:
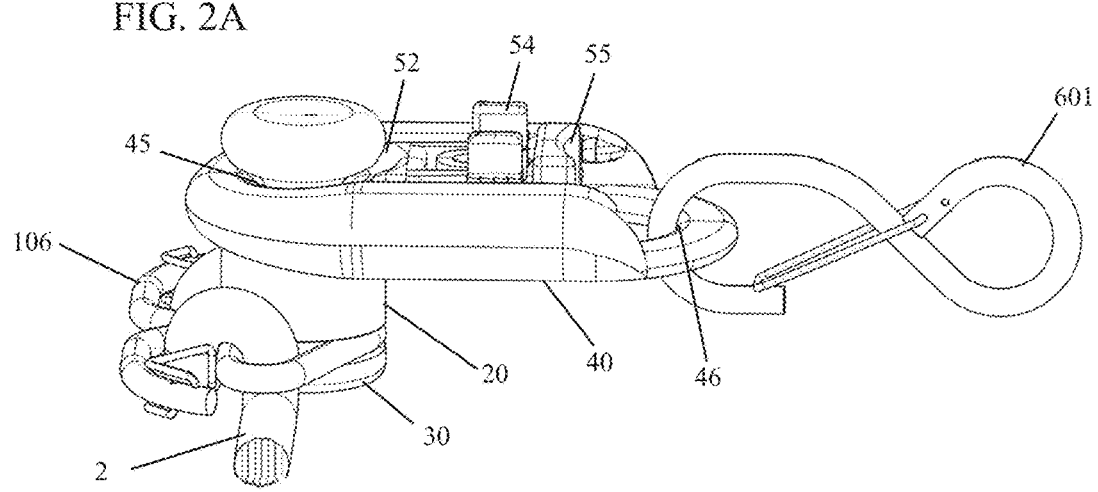
FIG. 2A is a side perspective view of an example configuration of the system of the present invention.
Figure 2B:
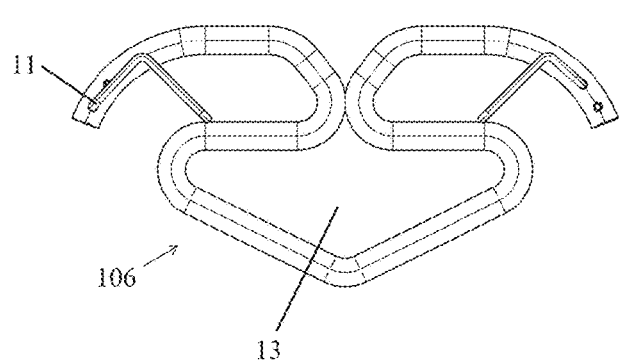
FIG. 2B is a top view of the exemplary hooking member utilized in the system embodiment illustrated in FIG. 2A.
Figure 2C:
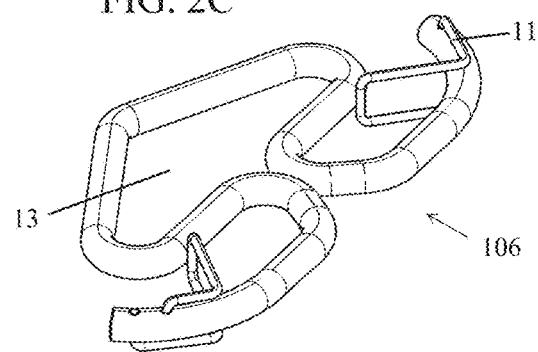
FIG. 2C is a side perspective view of the exemplary hooking member utilized in the system embodiment illustrated in FIG. 2A.
Figure 2D:
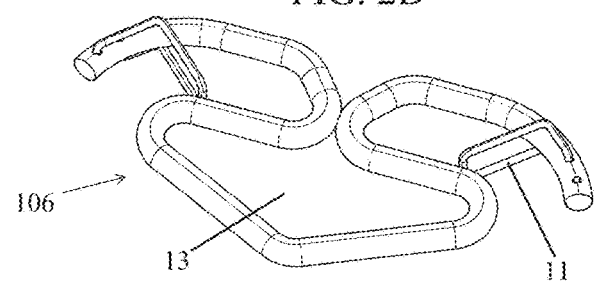
FIG. 2D is a top perspective view of the exemplary hooking member utilized in the system embodiment illustrated in FIG. 2A.
Figure 2E:
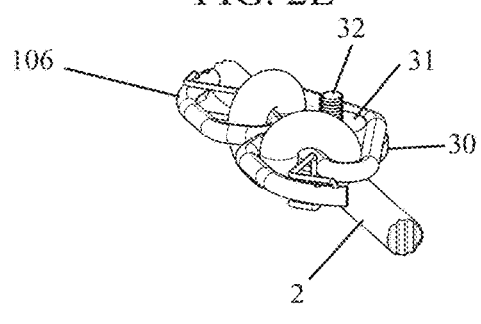
FIG. 2E is a side perspective view of the embodiment illustrated in FIG. 2A in an early stage of assembly where a locking base is inserted into the interior space of the exemplary hooking member.
Figure 2F:
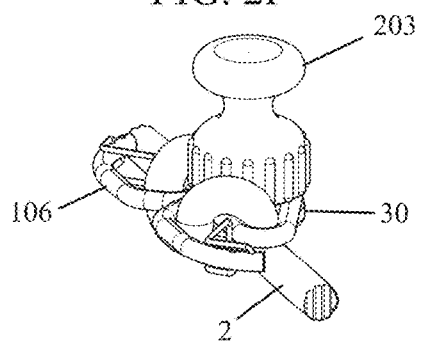
FIG. 2F is a side perspective view of the embodiment illustrated in FIG. 2A in another stage of assembly where an exemplary knob anchor is attached to the locking base joined with the hooking member according to this example configuration.
Figure 2G:
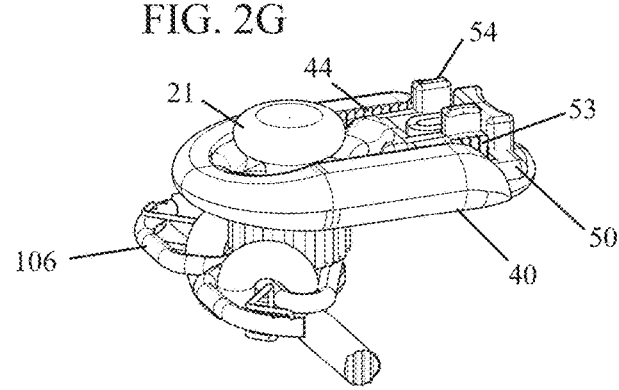
FIG. 2G is a side perspective view of the embodiment illustrated in FIG. 2A in a later stage of assembly but without a tarp inserted in order to show detail. In this example configuration, the compressing device has begun to be clamped over the tarp anchor attached to the locking base, and thus the hooking member receiving a rope according to this example configuration.
Figure 2H:
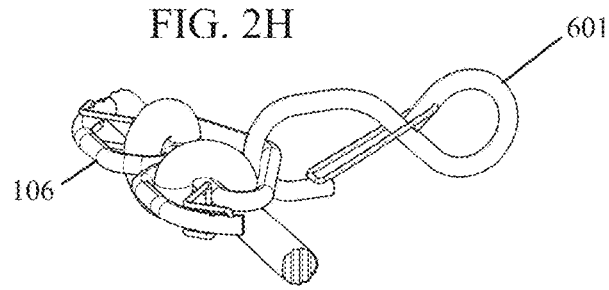
FIG. 2H is a side perspective view of the exemplary hooking member illustrated in FIG. 2A but having no tarp anchor or compressing device but instead operating to serve as a connection point for an additional hook to be implemented in the strap hooking and tarp anchoring system intended to be used in tandem to cover a load.
Figure 2I:
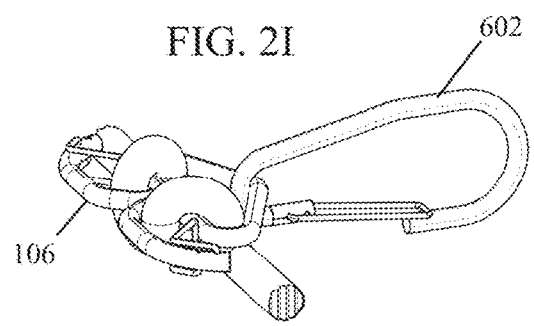
FIG. 2I is a side perspective view of the exemplary hooking member illustrated in FIG. 2A but having no tarp anchor or compressing device but instead operating to serve as a connection point for an additional hook to be implemented in the strap hooking and tarp anchoring system intended to be used in tandem to cover a load.

An additional embodiment is illustrated in FIG. 2A where the system is attached to a cord or rope 2 having a circular diameter and the rear of the tarp compressing device 40 is illustrated in engagement with an additional fastening accessory 60 (specifically 601). Turning to FIGS. 2B-2D, an exemplary hooking member 106 is ready for attachment to an elongated, interwoven material. As shown in FIG. 2E, after the rope is secured to the hooking member 106 a locking base 30 for the knob anchor 20 is configured to insert into the interior space 13 of the hooking member 106. The knob anchor 20, such as the exemplary spline knob 203 (further detailed in FIGS. 6A-6E) shown in FIG. 2F is removably attached to the locking base 30. In the preferred system, a panel material such as a tarp 3 will overlay the upper knob 21 of the anchor and be wrapped and held in place by the compressing device 40 in a manner illustrated in FIG. 2G (tarp not shown for clarity here). Intended implementation of the system calls for multiple points of attachment over a load by using system configurations like those shown in FIGS. 1A and 2A. Therefore, after the compressing device 40 is secured to the knob anchor 20, additional fastening accessories 60 (specific example is 601) may be applied to looped features in the compressing device 40 in a manner such as that shown in FIG. 2A. The raised thumb press 55 creates a wall to protect the teeth 53 from the fastening accessory 601. To assist in further spanning over a cargo load 4, additional hooking members 20 may also be applied where no tarp lock 30 is implemented, such as in a manner shown in FIGS. 2H and 2I where an additional fastening accessory 60 (illustrations show 601 and 602) is applied directly to a loop of the hooking member 10 thus creating a junction for additional strap connecting points.

Figure 3B:
FIG. 3B is a rear perspective view of a further example configuration of the system of the present invention installed and having a tarp portion shown to illustrate context.
Figure 3C:
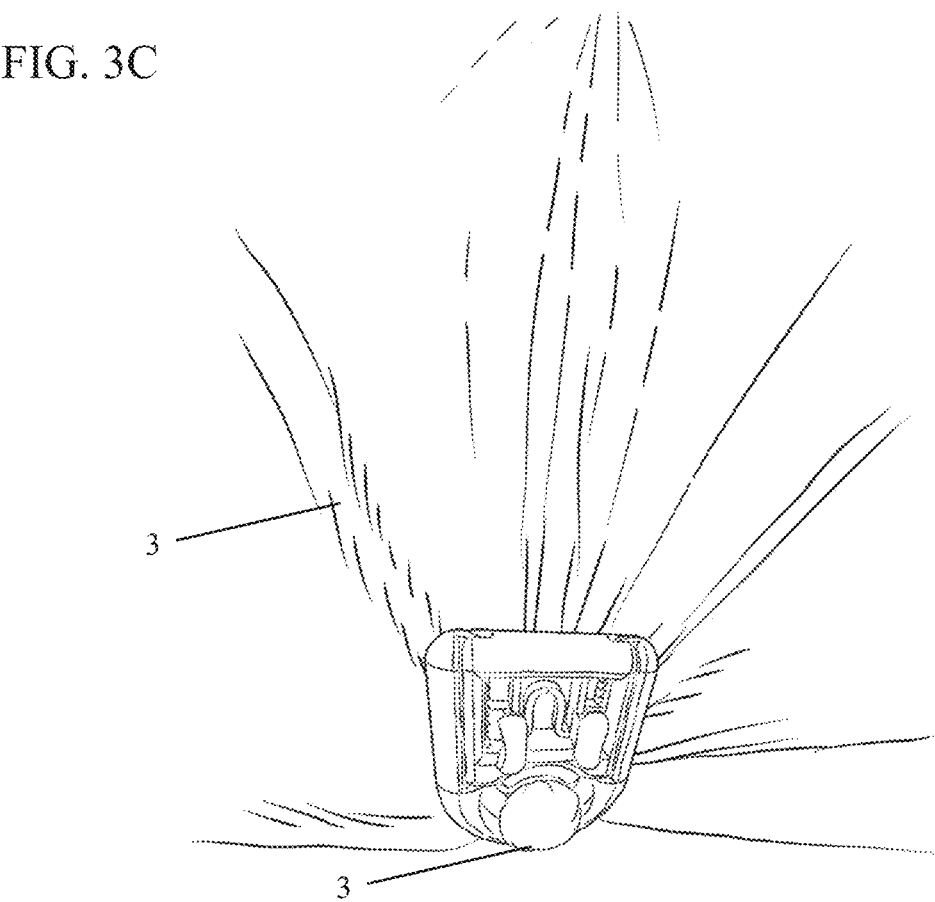
FIG. 3C is a top perspective view of a further example configuration of the system of the present invention installed and showing a portion of a tarp to illustrate context.
Figure 3D:
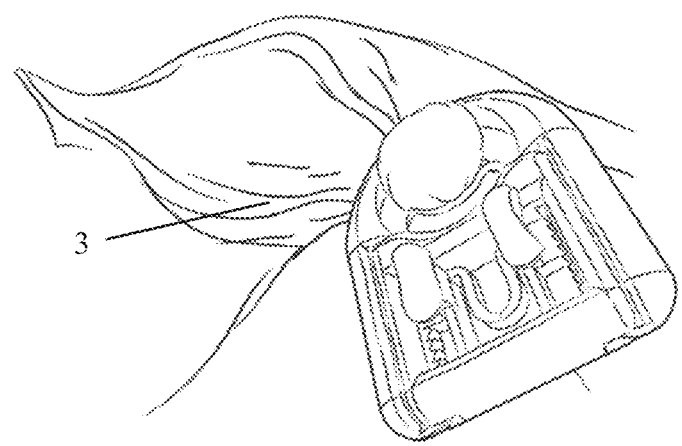
FIG. 3D is a rear perspective view of a further example configuration of the system of the present invention installed and having a gathered tarp shown to illustrate context.
Figure 3E:
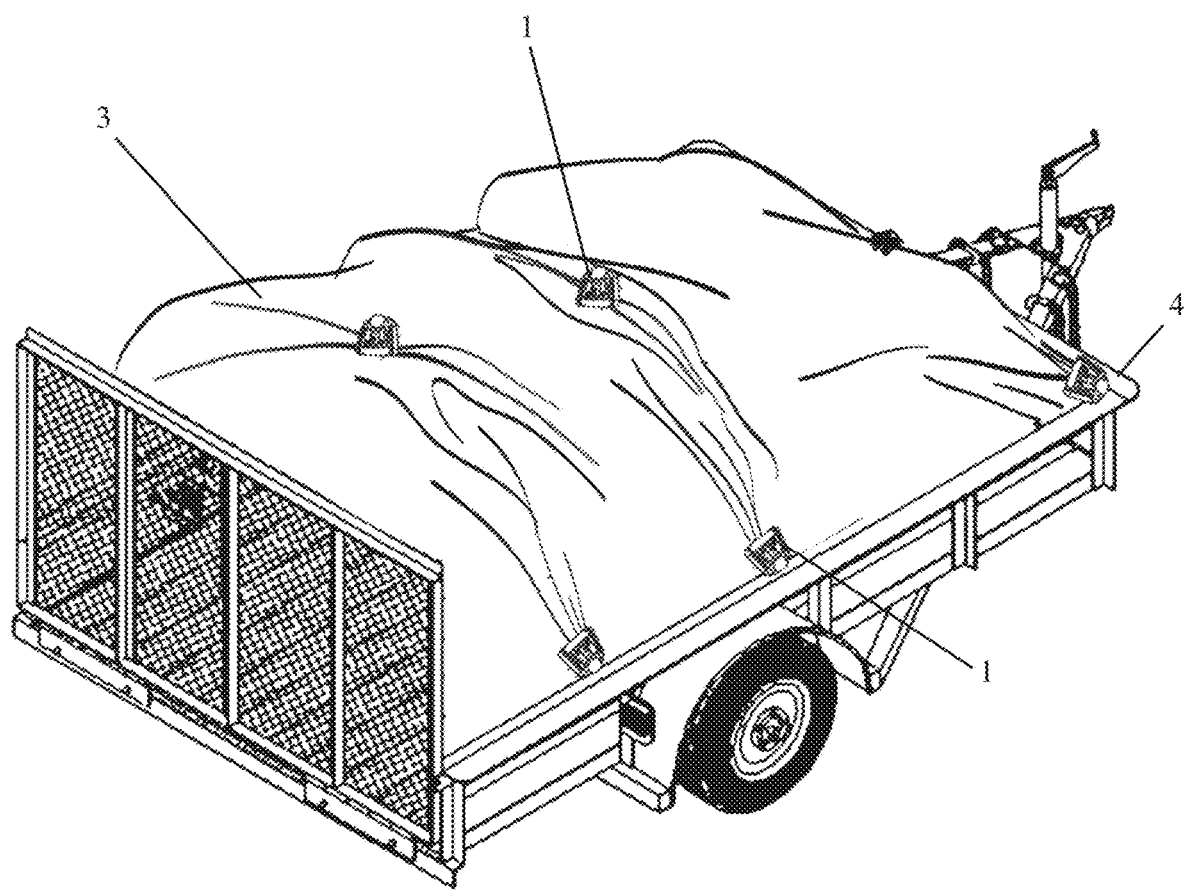
FIG. 3E is a rear perspective view of a tarp-covered load tied down with the assistance of the system of the present invention.

To grab and hold a tarp 3 in place, the compressing device 40 must be attached over the tarp anchor 20 which is overlaid with a portion of the flexible tarp panel. A few example tarp locking configurations are illustrated in FIGS. 3A-3E. Turning to FIG. 3A, another exemplary hooking member 10 has been joined with a strap 2. Additional details for a hooking member such as that illustrated in FIG. 3A may be viewed in FIGS. 22A-22I. In this sample implementation, the tarp knob 20 has been secured and is obscured by the gathered tarp 3 section. The tarp knob is being pinched by a compressing device 40 with an alternative u-shaped anchor receiver 47 similar to the one shown in isolation in FIGS. 26G-26I. A better understanding of the minimum characteristics of the tarp compressing mechanism over the tarp are noticeable from the view shown in FIG. 3B where some aspects such as the tarp 3 are shown in phantom. Alternative placement locations of the device illustrated in FIG. 3A are shown in FIGS. 3C and 3D. In these examples, the tarp compressor has been applied to the tarp 3 such that any strap 2 is not shown. In certain situations, the devices may be coupled in a floating manner. One example combination of using multiple systems in one load is illustrated in FIG. 3E. This illustration shows a trailer load 4 covered with a sheeting material 3 and several tarp lock systems 1 installed along the edges of the trailer and on top of the cargo.

Reliable securement of the tarp 3 requires a strong compressing device 40 with semi-rigid walls to withstand the elements and strain of hauling while also offering non-abrasive, cooperating structures to cradle the thin fabric of the tarp 3 wrapped over the knob 20. Various design implementations are disclosed within the drawings. The preferred embodiment of the tarp compressing device is illustrated in FIGS. 4A-4F. This embodiment offers an annular frame 41 of substantially rigid construction, the locking device having an enlarged front bumper, a tarp lock receiver abutment section 45, a set of teeth 44 to cooperate and lock with teeth 53 on the sliding lock 50, a channel 48 on the interior wall 43, and a narrower rear section 46. The interior wall of the forward portion of the frame provides a receiving abutment. The receiving abutment 45 is constructed of a substantially rigid inset with a semi-circular platform reaching forward from the opposing two tracks of teeth 44. The ideal construction will be a unitary, molded structure and may be of solid or hollow material. The rear portion of the slide latch channel 48 has a tapered side wall 49 with a side rail offering a buffer zone to keep the tarp from entering the latching mechanism. The rear of the oval frame marked in FIG. 4A as the rear hooking area 46 has an annular wall of smaller diameter than the front bumper area to allow for the latch to slide into the locking mechanisms. With continuing reference to FIGS. 4A-4F, a completely dissembled, or separated, unkeyed embodiment of the present invention is demonstrated from various angles. The components of springs 56 and respective teeth 53 of the sliding mechanism of the locking latch are shown best illustrated in the top view of FIG. 4B. The shoulder of the tarp receiver abutment section 45 is best viewed in FIGS. 4C-4D. FIGS. 4C-4D also clearly show the channel 48 which the slide latch frame 51 will travel along and be seated in during while the sliding latch 50 is installed within the receiver 40. While the relative space and variation of the size of the opening 42 offered between the front shoulder 45 and the locking device forward shoulder 52 can be appreciated in FIGS. 4E-4F. Additional embodiments of the tarp compressing device are illustrated in later figures.

Figure 4A:
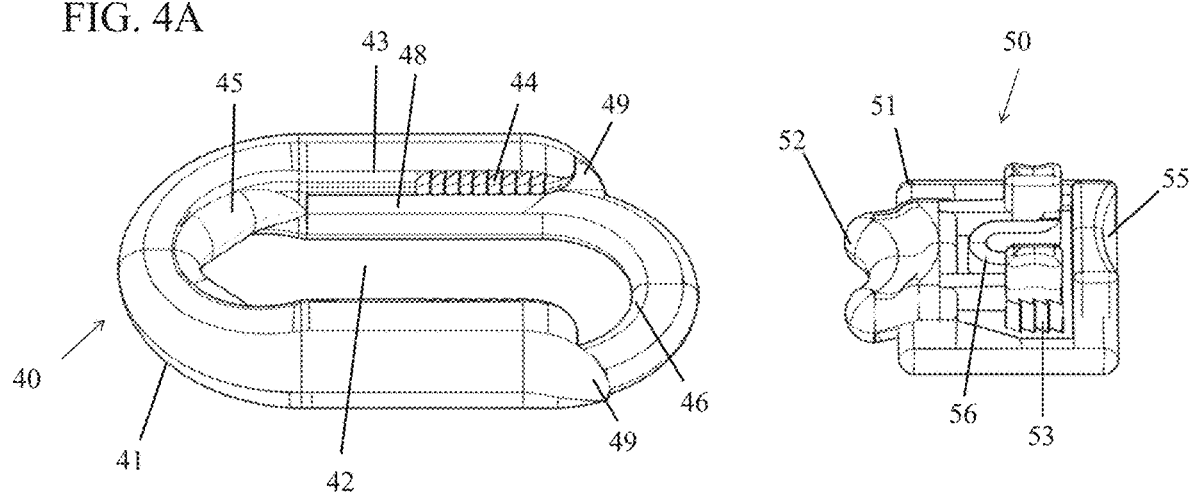
FIG. 4A is a top perspective view of one embodiment of the compressing device of the present invention, disengaged to show detail.
Figure 4B:
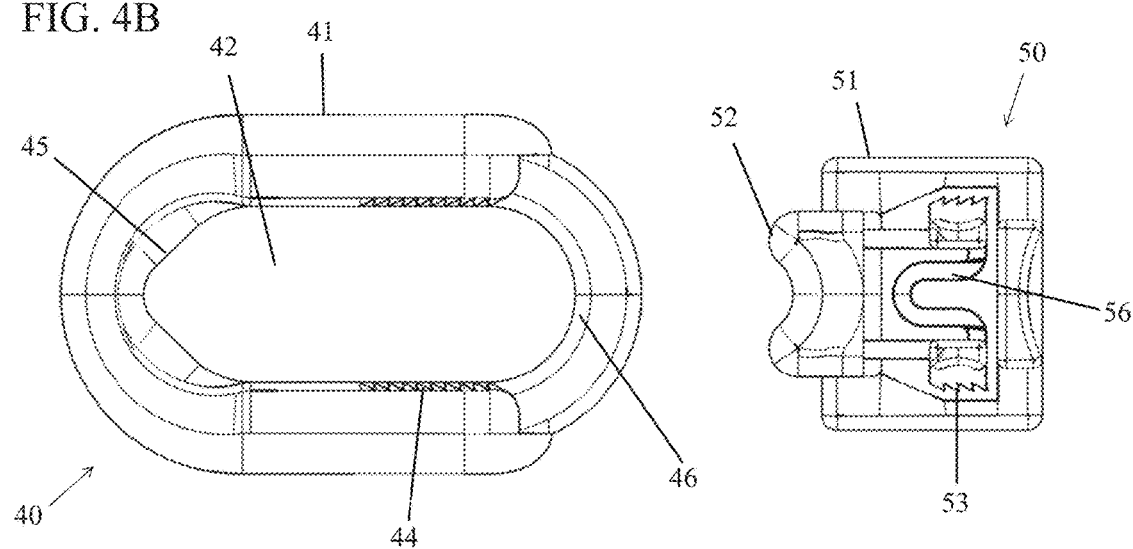
FIG. 4B is a top view of FIG. 4A.
Figure 4C:
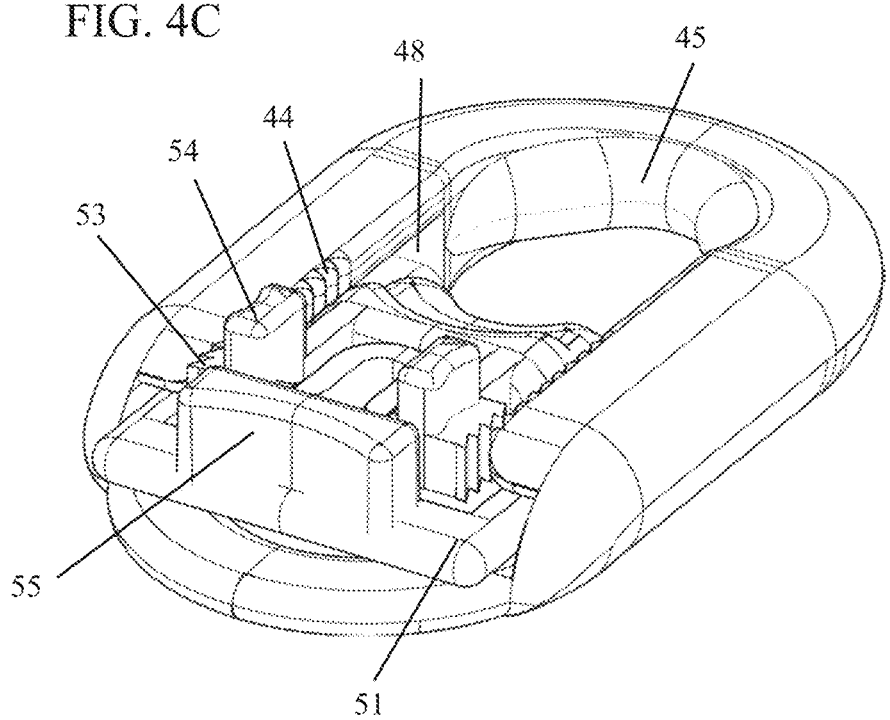
FIG. 4C is a top perspective view of the compressing device shown in FIG. 4A, engaged as further described herein and illustrating the mechanisms used for sliding, ratcheting, and grabbing a tarp.
Figure 4D:
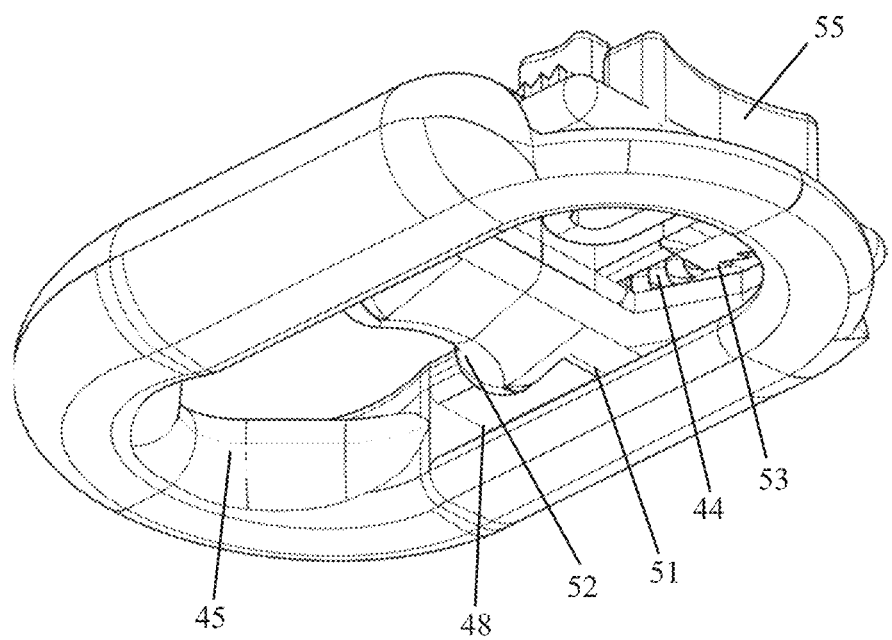
FIG. 4D is a bottom perspective view of FIG. 4C.
Figure 4E:
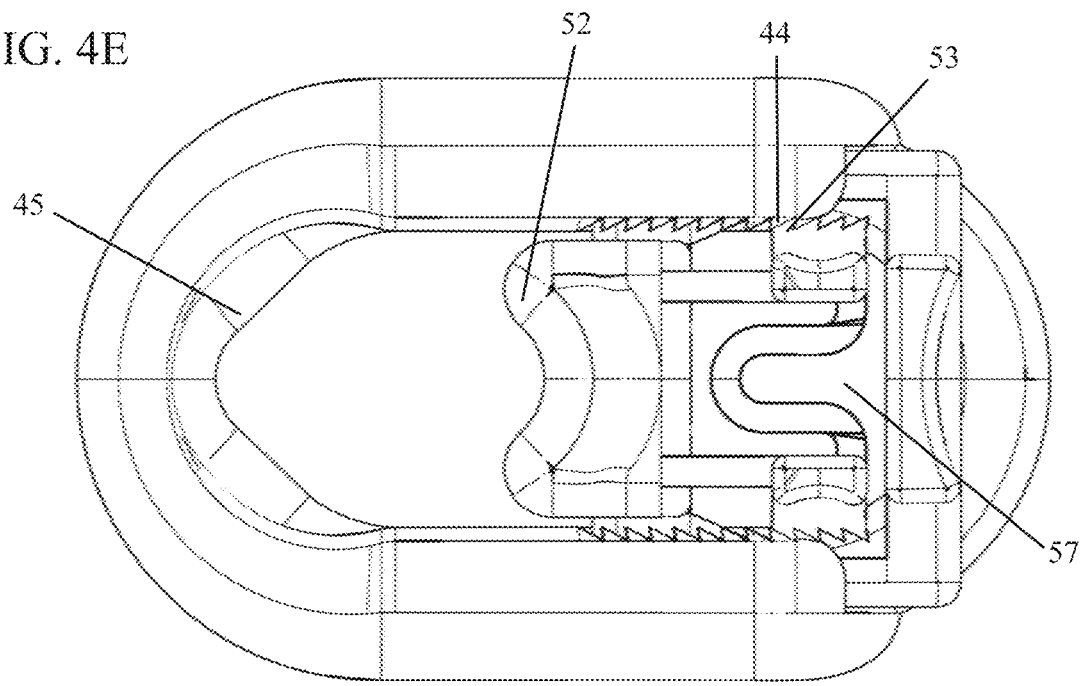
FIG. 4E is a top view of FIG. 4C.
Figure 4F:
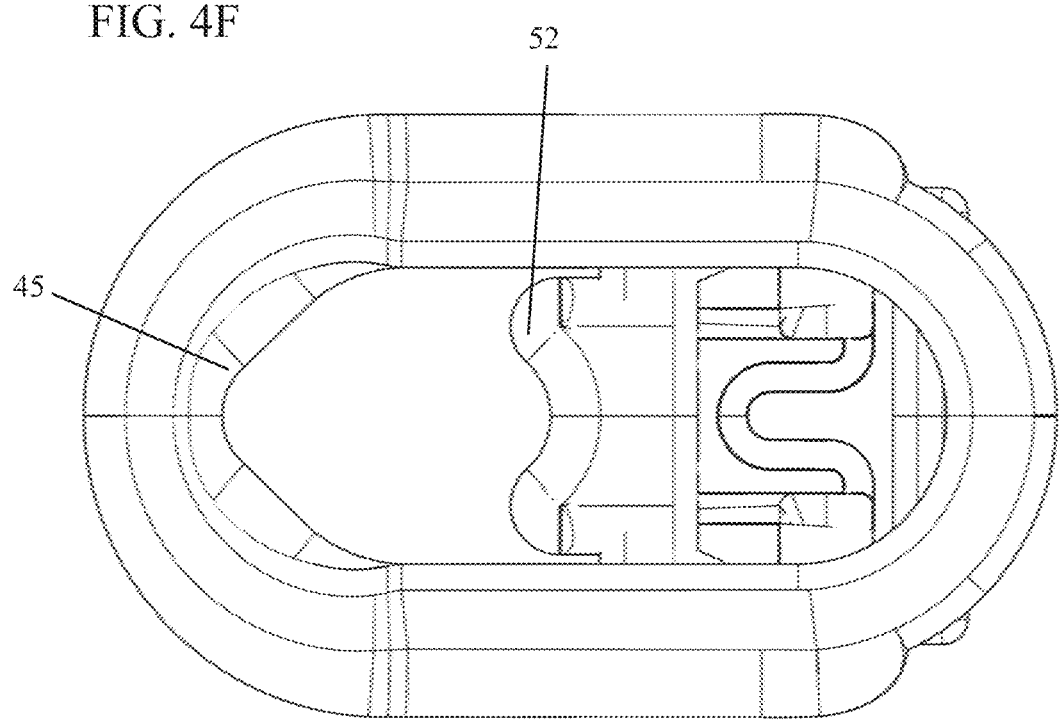
FIG. 4F is a bottom view of FIG. 4C.
Figure 5A:
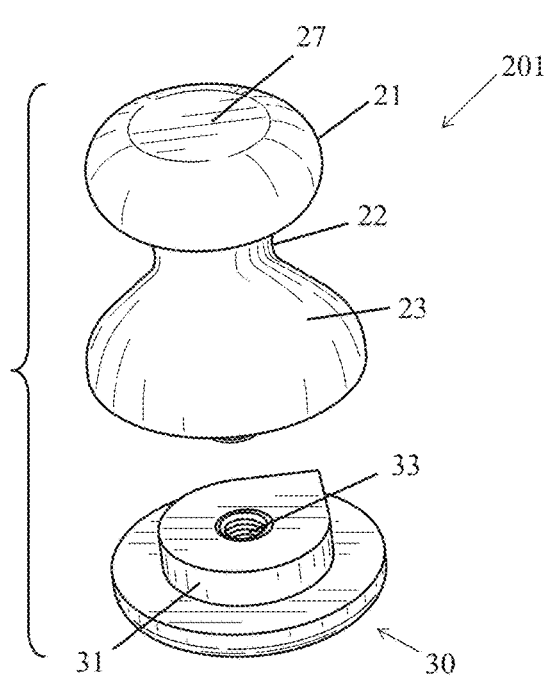
FIG. 5A is a top perspective view of examples of a knob and locking base utilized within the system of the present invention. In this example, a coupling for the pair includes threads in a central bore in the locking base where the male threads are disposed at the bottom of the knob.
Figure 5B:
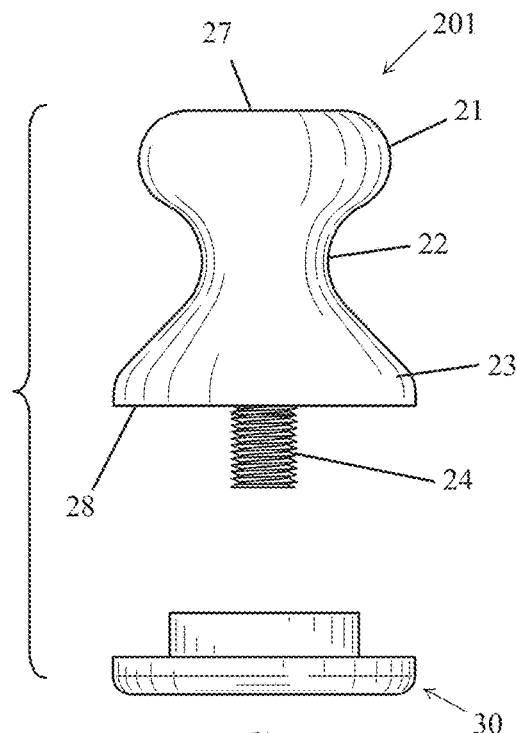
FIG. 5B is a back view of 5A.
Figure 5C:
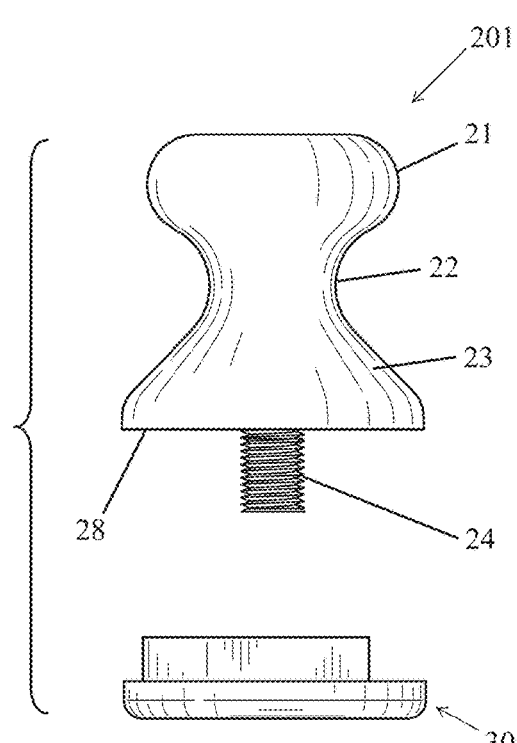
FIG. 5C is a first side view of FIG. 5A where the second side view is a mirror image.
Figure 5D:
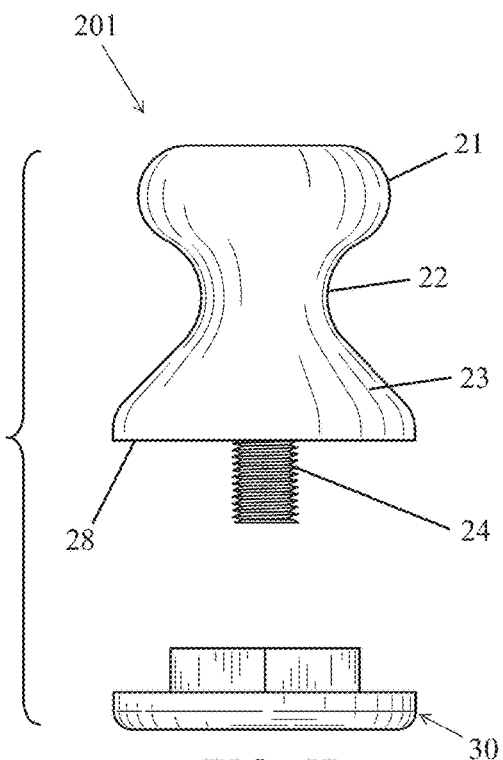
FIG. 5D is a front view of 5A.
Figure 5H:
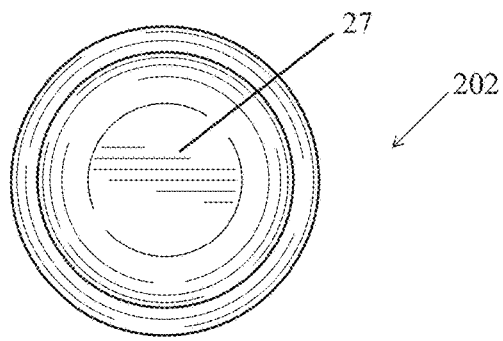
FIG. 5H is a top view of FIG. 5A or FIG. 5E.
Figure 5I:
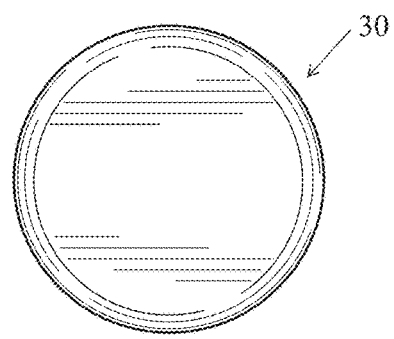
FIG. 5I is a bottom view of FIG. 5A or FIG. 5E.
Figure 5J:
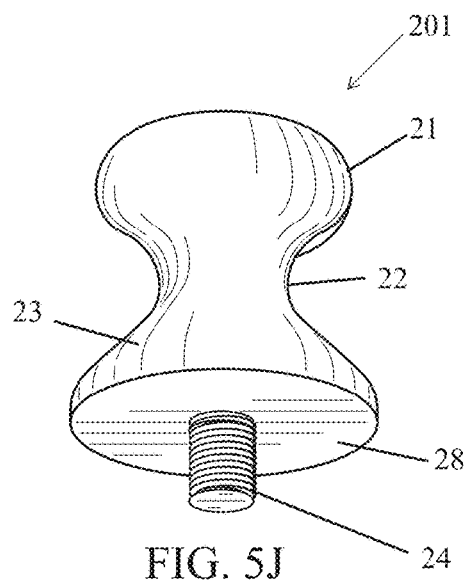
FIG. 5J is a bottom perspective view of the style of knob anchor shown in FIG. 5A but without a paired locking base.
Figure 5K:
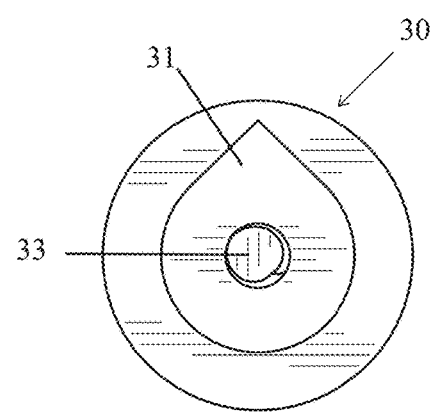
FIG. 5K is a top view of the style of locking base shown in FIG. 5A but without the paired knob anchor.
Figure 5L:
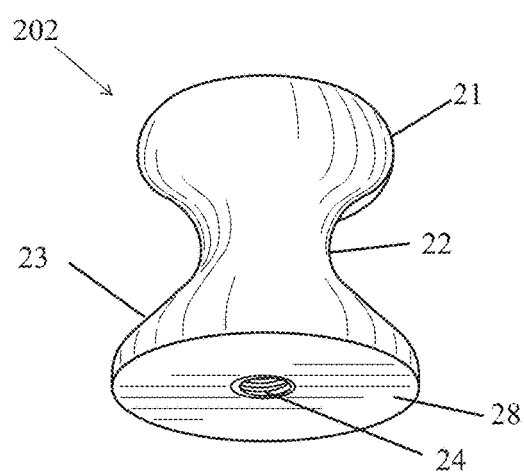
FIG. 5L is a bottom perspective view of the style of knob anchor shown in FIG. 5E but without a paired locking base.
Figure 5M:
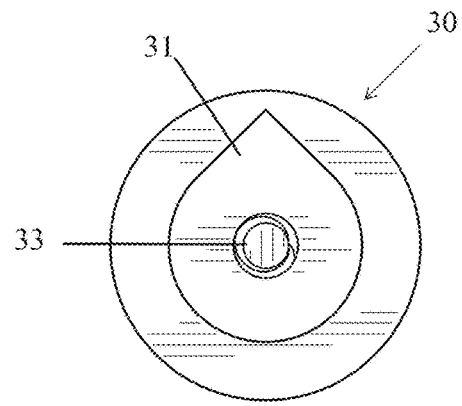
FIG. 5M is a top view of the style of locking base shown in FIG. 5E but without the paired knob anchor.
Figure 6A:
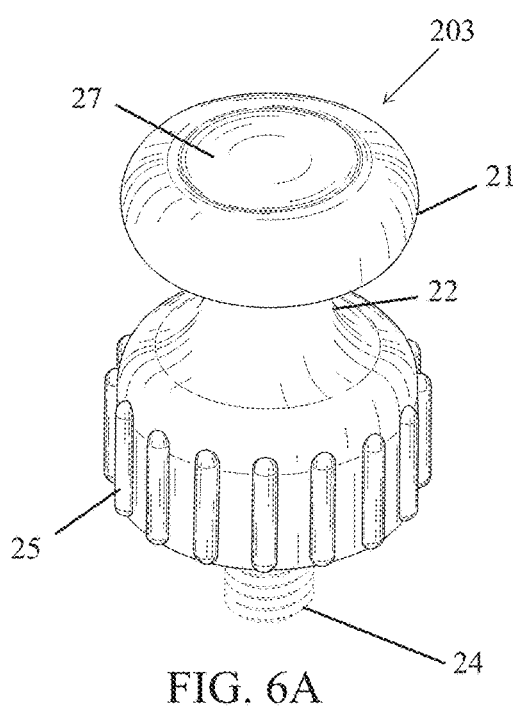
FIG. 6A is a top perspective view of another example of a knob utilized within the system of the present invention, this knob having gripping features on the exterior. While a male coupling is attached to this knob, other coupling mechanisms may be employed.
Figure 6B:
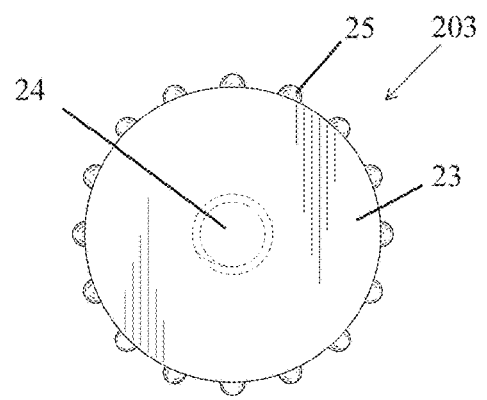
FIG. 6B is a bottom view of FIG. 6A.
Figure 6C:
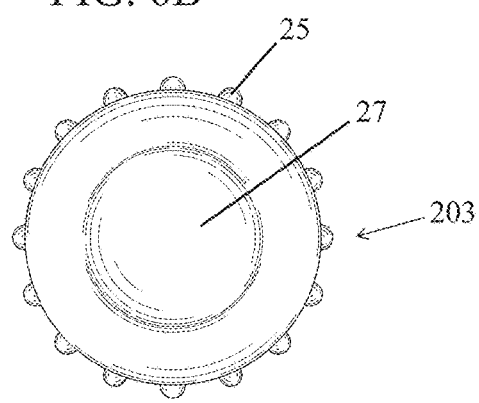
FIG. 6C is a top view of FIG. 6A.
Figure 6D:
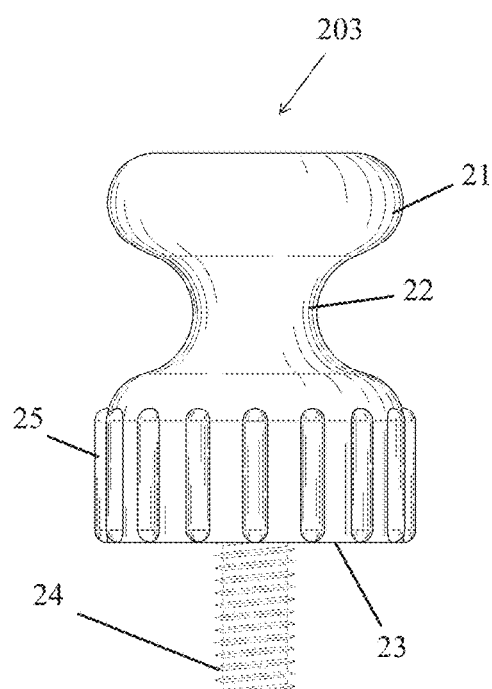
FIG. 6D is a first side view of FIG. 6A where in the second side view is a mirror image.
Figure 6E:
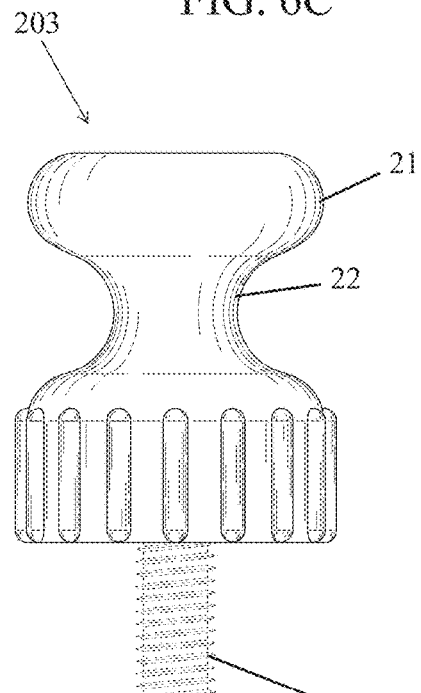
FIG. 6E is a front view of FIG. 6A where the rear view is a mirror image.
Figure 7A:
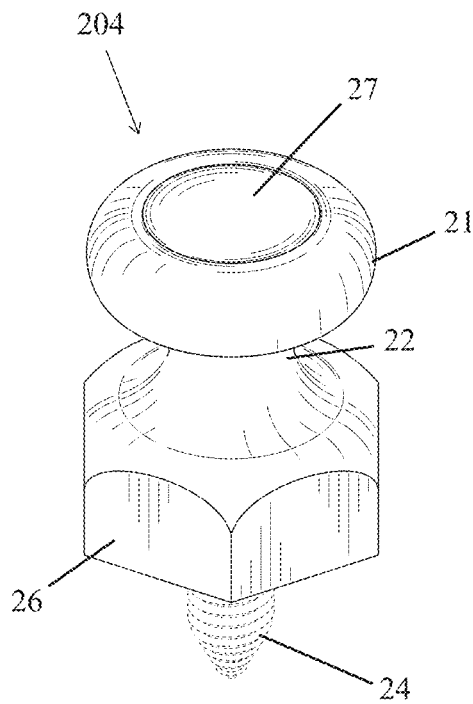
FIG. 7A is a top perspective view of another example of a knob utilized within the system of the present invention, this knob having inset, flat faces around the periphery of the lower portion of the knob. While a male coupling having a point is attached to this knob, other coupling mechanisms may be employed.
Figure 7B:
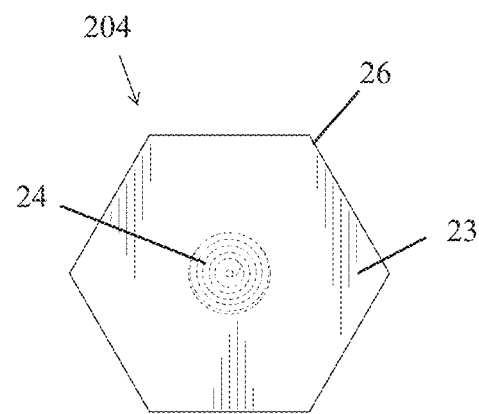
FIG. 7B is a bottom view of FIG. 7A.
Figure 7C:
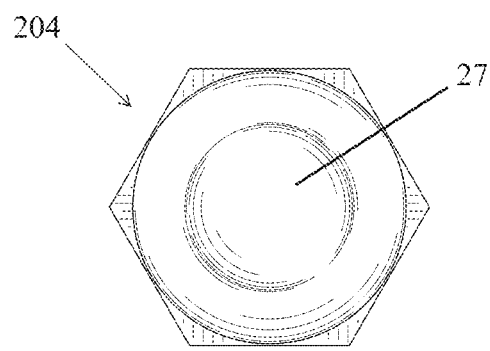
FIG. 7C is a top view of FIG. 7A.
Figure 7D:
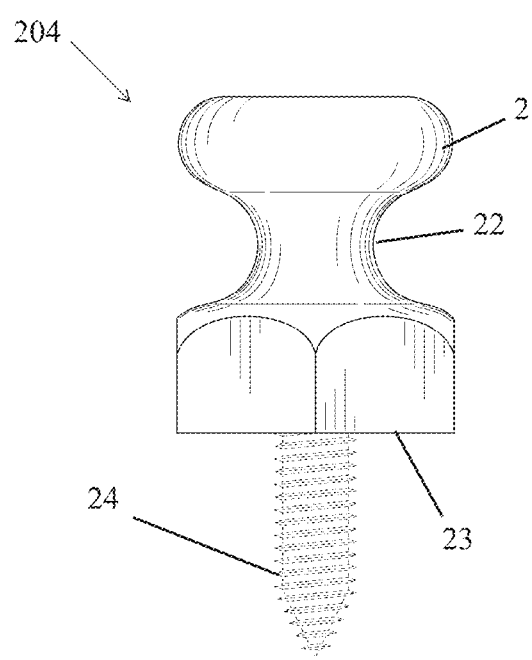
FIG. 7D is a first side view, second side view, front view, and rear view of FIG. 7A.
Figure 7E:
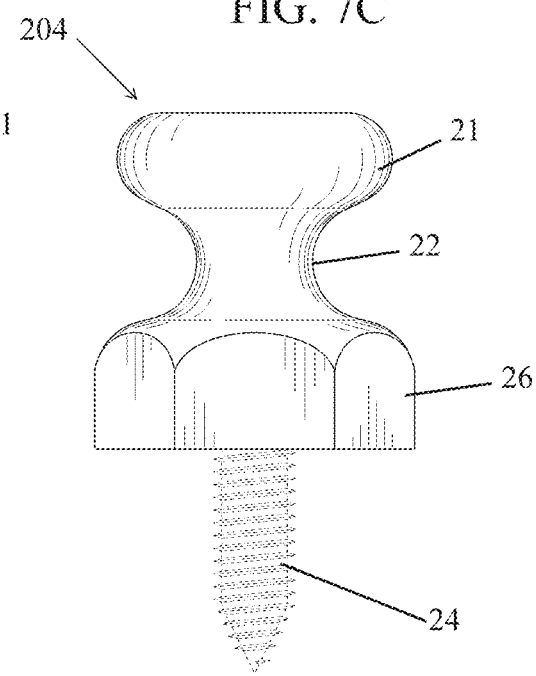
FIG. 7E is an alternative angled side view, second side view, front view, and rear view of FIG. 7A.
Figure 11A:
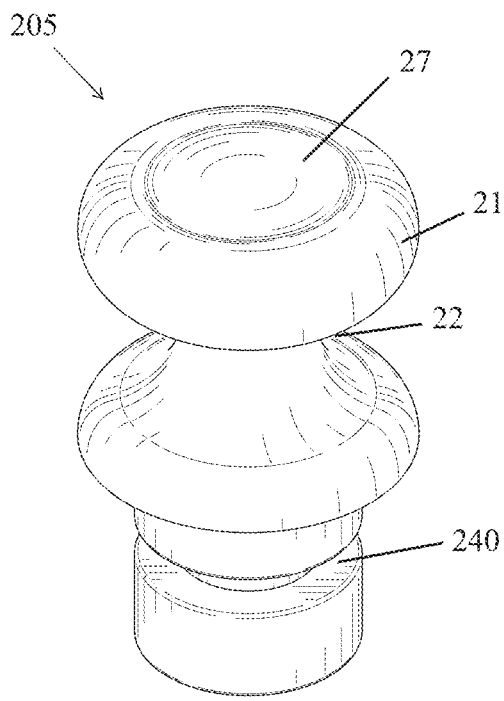
FIG. 11A is a top perspective view of an additional embodiment of a knob having a peg bottom, particularly useful in conjunction with the locking base illustrated in FIGS. 12A-12I.
Figure 11B:
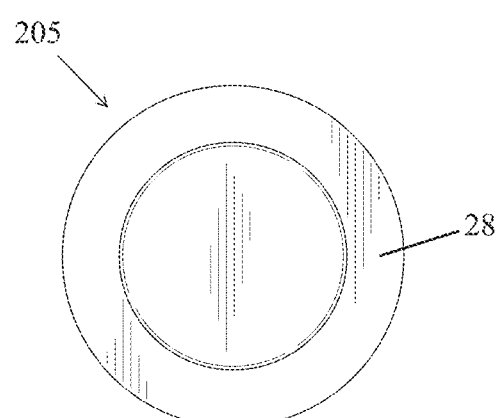
FIG. 11B is a bottom view of FIG. 11A.
Figure 11C:
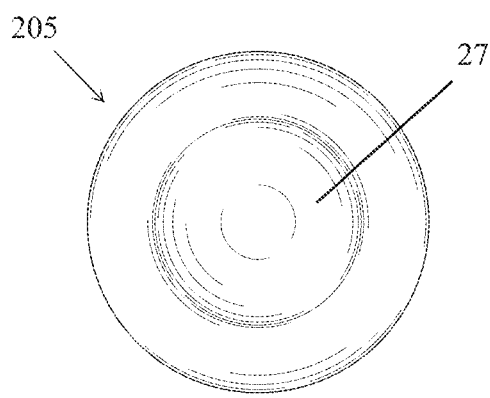
FIG. 11C is a top view of FIG. 11A.
Figure 11D:
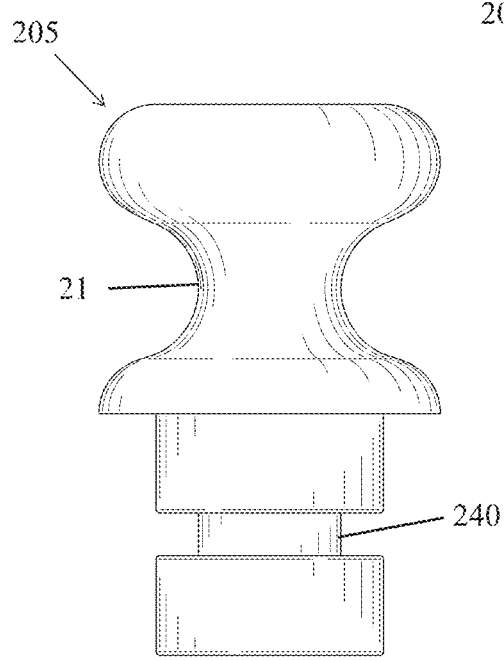
FIG. 11D is a front or back view of FIG. 11A.
Figure 11E:
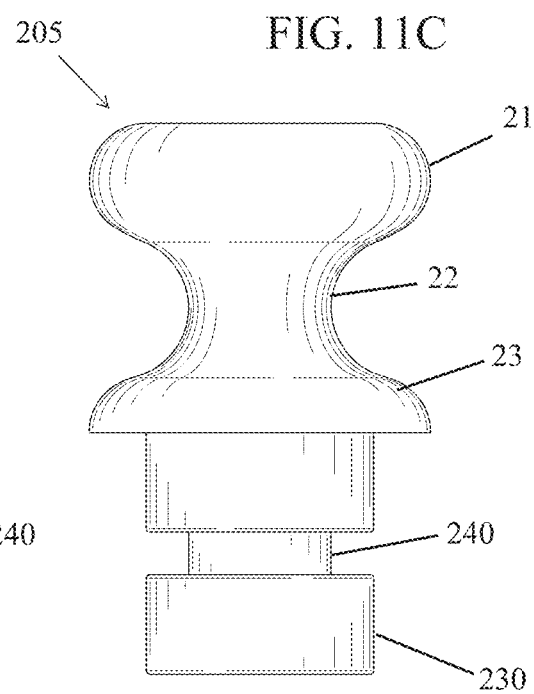
FIG. 11E is a first side view or second side view of FIG. 11A.
Figure 13A:
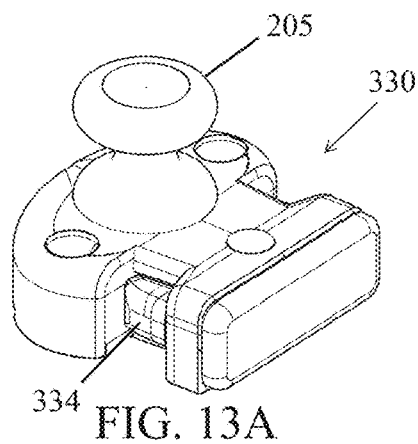
FIG. 13A is a top perspective view of the exemplary quick release locking base shown in FIG. 12A with a tarp anchor from FIG. 11A inserted into the locking base (the tarp is excluded for clarity). The protruding knob in this configuration could serve as an additional connection point for a hooking device for a load.
Figure 13B:
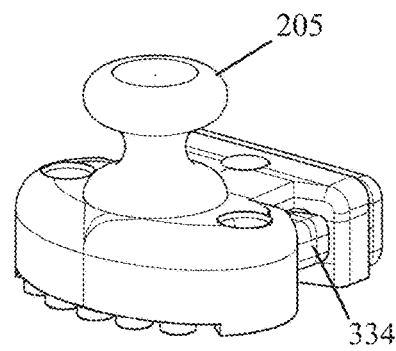
FIG. 13B is an additional perspective view of FIG. 13A.
Figure 13C:
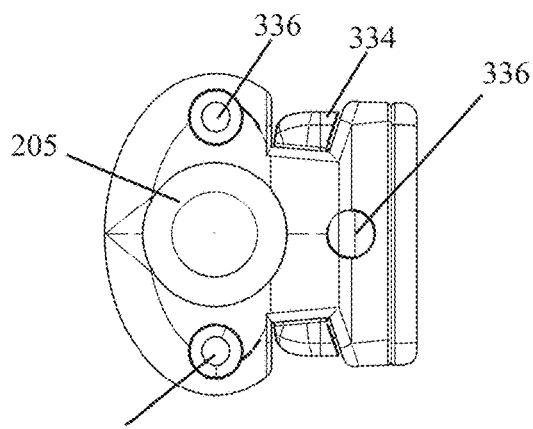
FIG. 13C is a top view of FIG. 13A.
Figure 13D:
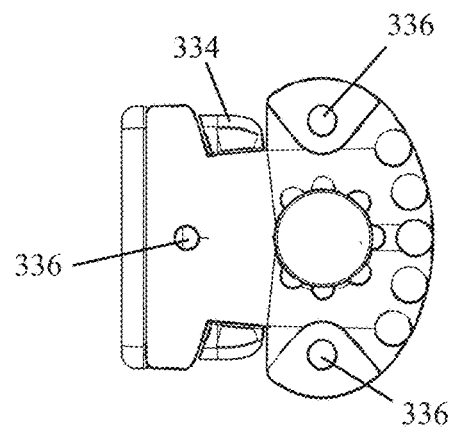
FIG. 13D is a bottom view of FIG. 13A.
Figure 13E:
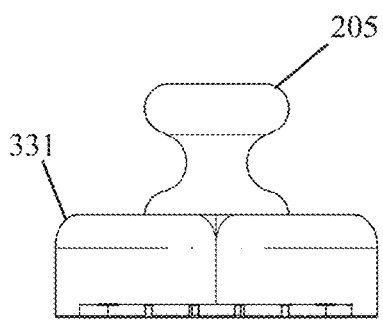
FIG. 13E is a front view of FIG. 13A.
Figure 13F:
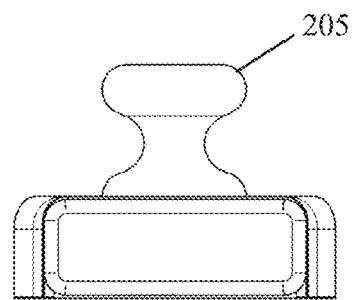
FIG. 13F is a rear view of FIG. 13A.
Figure 13G:
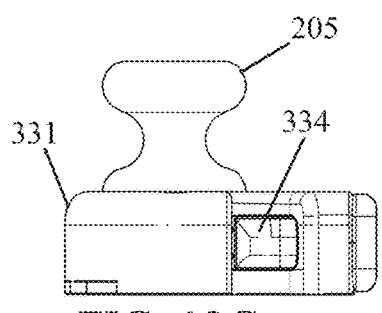
FIG. 13G is a first side view FIG. 13A where the second side view is a mirror image of the first side.
Figure 13H:
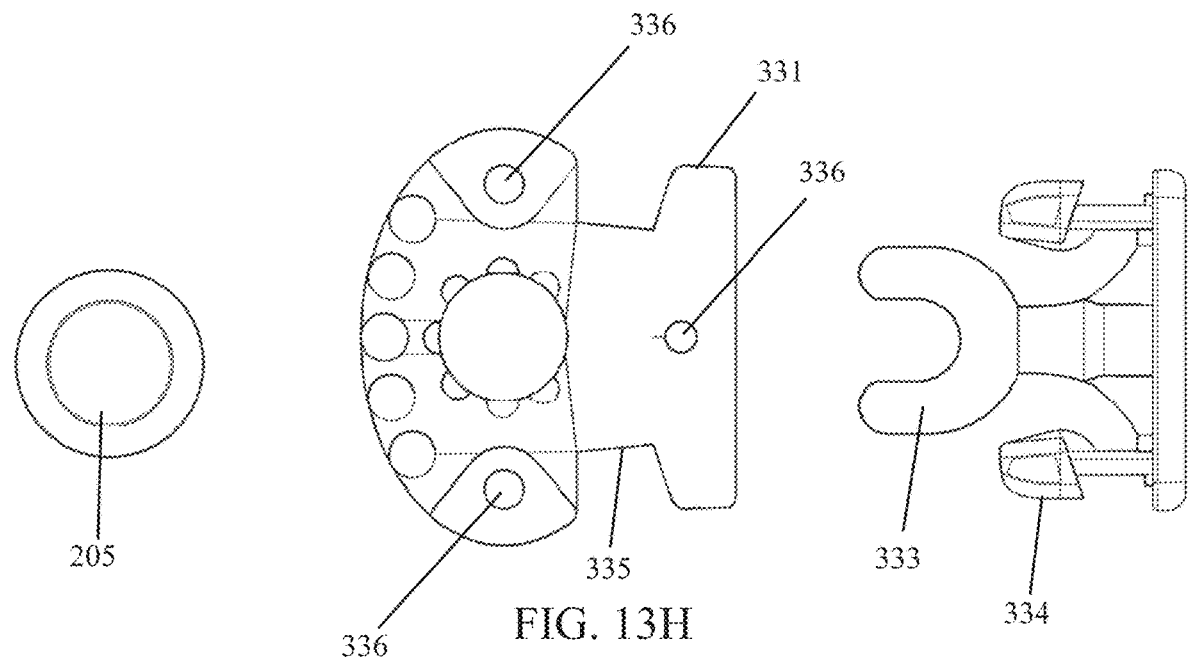
FIG. 13H is a bottom view of the components shown in FIG. 13A, where the components are shown separated from one another.
Figure 13I:
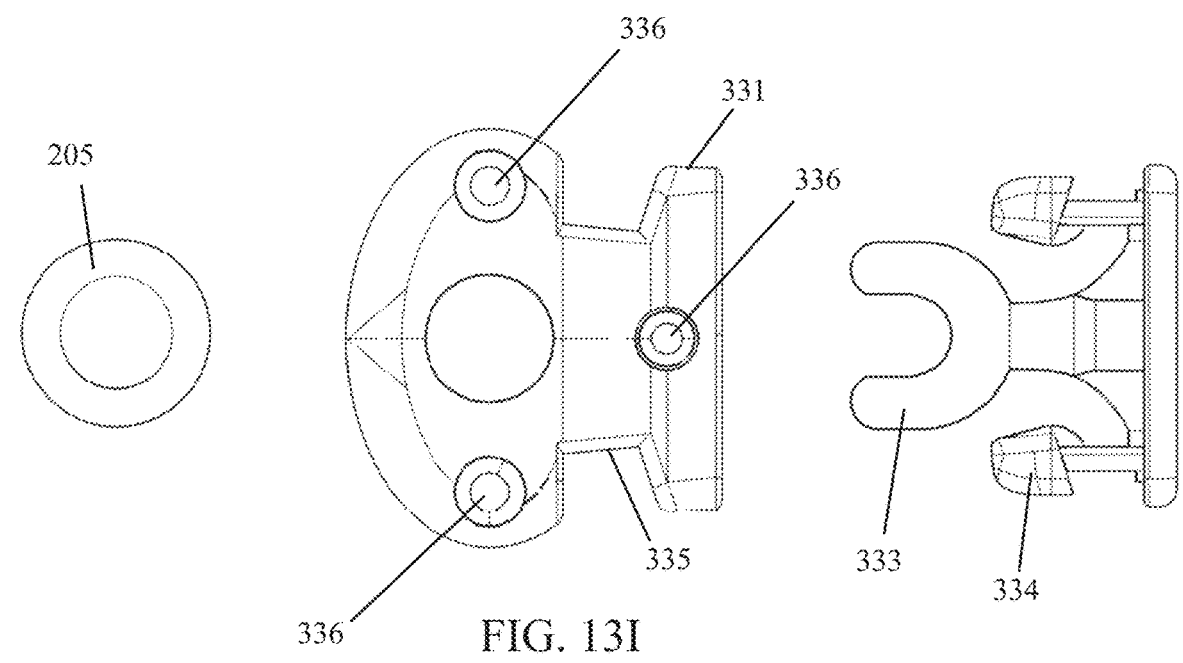
FIG. 13I is a top view of the components shown in FIG. 13A, where the components are shown separated from one another.

FIGS. 4A-4B illustrate an exemplary slidable locking latch mechanism 50 separated from the main body of the compressing device 40. The latch 50 in this example embodiment includes a stepped tooth section 53 which is formed to cooperate and interface with the stepped tooth structures 44 of the inside wall 43 of the annular frame 41 of the anchor receiver 40. The latch 50 provides a shoulder section 52 formed to snuggly abut the neck 22 of the knob 20, wrapped in the tarp panel, when the latch 50 is pressed forward binding the neck of the knob between the shoulder 45 of the compressing device and the latch shoulder 52. In the preferred embodiment, a set of projections 54 serve as lock releases. In the illustrated version, a user squeezes the projections of the finger riser 54 with a finger and thumb to pull the teeth 53 of the latch inwardly by a flex spring action 56, disrupting the mating interaction of the teeth 53 with the receiver teeth 44. The latch 50 will then slide within the channel 48 toward the rear of the receiver 40 and widen the opening 42 between the shoulders of the latch and the receiver. The actuation of the latch, whether for opening or closing, may be completed with one hand. The widening of the opening will allow the tarp knob 20 to fall away from or be separated from the knob receiver portions 40 of the compressing device. This embodiment is illustrated as being two separate pieces joined by complementary channels and teeth. The latch 50 may optionally be provided with a stop to keep the latch from fully exiting the main frame of the compressing device 40. In this preferred embodiment the thumb and finger press riser 55 function as a push on the latch 50 for the user during installation to the receiver 40. The riser 55 may also offer protection to the locking mechanism 53. In the preferred embodiment, the latch 50 will be constructed in a skeletal structure having sufficient rigidity to withstand unintentional disengagement but with minimal extraneous materials to improve molding capabilities and reduce weight and costs of material. Thus, as shown in FIGS. 4A-4B and in various later compressing device illustrations, many cutouts 57 or voids are utilized for the construction of this latching mechanism. At its essence, the latch 50 must have a frame 51, a lock mechanism 53, a shoulder 52, and a release 54 (could be integral with the lock mechanism) so that it may wrap, hold, and then release the tarp knob.

Turning now to the tarp anchoring device 20 also called a knob or tarp knob, with reference to FIGS. 5A-7E, the anchoring apparatus of the illustrated embodiments generally comprise a knob structure with a bulbous upper knob 21, a narrow neck portion 22, a lower portion 23 and a coupling mechanism 24. In the preferred implementation of the system, the anchoring apparatuses 20, also called tarp anchors or knobs, are mounted to openings 13 of a hooking member 10. The preferred diameter of the upper knob 21 will range between 1.25 inches and 1.5 inches but may be modified to suit larger or smaller applications in which case the complementary mechanisms may also need to be resized.

With reference to FIGS. 5A-5M, a knob 20 (specifically example knob 201) is illustrated in various exploded views separated from the optional locking base 30. The base 30 further comprises a raised center collar/collet 31 manufactured in many different configurations. In the illustrated embodiment, the raised portion is formed in a tear drop shape to prevent rotation within the hooking device. This version of the locking base 30 is depicted clearly in FIGS. 5A-5G and FIGS. 5I, 5K and 5M. When the base 30 includes female threads, they run through a point near the center as demonstrated in FIG. 5K. In such cases, the knob 20 comprises male threads at its center projecting out from the bottom, see e.g., FIG. 5J. The length of the male threads may be as long as the base 30 is thick. FIGS. 5A-5M illustrate two embodiments of this particular knob design where the primary difference is whether the coupling 24 occurring on the lower portion 23 of the knob 20 is offered with female or male threading, the distinction correlating to the location of the female bore in either the bottom 28 of the knob or the female threading 33 of the lock 30.

In the preferred embodiment, the intermediate surfaces between the parts of the knob are spherically tapered. The depth of the neck 22 and the curvature of the spherical taper will vary by embodiment. The diameter and curvature of the neck will be varied for applications with thicker or thinner sheeting materials, woven filaments, or hooks. Additionally, the distance between the upper knob 21 and lower knob portion 23 will necessarily have variation for contemplated applications. Example contrasts in these features will be appreciated based on the visual comparison of, e.g., FIGS. 5B, 6D, 7D, 7E, 8C and FIG. 11D.

In view of FIGS. 1A-5M it will be appreciated that the preferred knob 20 cooperates with an optional locking base 30 and also joins with the tarp lock 40. In general, the various knobs 20 comprise the upper bulb 21, narrowing neck 22, and lower knob 23. The bottom 28 of the lower knob portion 23 typically presents coupling apparatuses 24. In variations of the knob 20, such as those shown in FIGS. 8A-8E, the coupling 24 may also occur on the knob top 27.

Examples of variations that may occur in the lower portion 23 of the knob 20 are illustrated in FIGS. 6A-6E and FIGS. 7A-7E. As can be appreciated in FIGS. 6A-6E, a hand grip feature may offer enhanced functionality and in particular the grips are offered by a series of protruding splines 25 in the lower knob 23. Many gripping aid variations would serve a similar functionality. FIGS. 7A-7E illustrate an example of a lower knob portion 23 offering nut faces 26 for mechanical actuation. The total diameter of the nut 26 of the lower knob portion 23 as well as the number of flat faces on that lower knob portion 23 may be varied for various implementations. Of course, nearly infinite nut shapes with similar functionality are contemplated. The knob 20 illustrated with a nut 26 in FIGS. 7A-7E are also illustrated with a threaded screw. Knobs with this coupling 24 option can be configured to cooperate with a piece of wood by having a wood screw inserted to a static location such as on a vehicle sideboard or wood pile.

FIGS. 8A-8E offer a double knob configuration where the lower knob 23 configuration actually mimics the shape of the upper knob 21 configuration, sandwiching the neck portion 22 between the opposing knobs. In the double knob configuration, coupling 24 options are still provided in the bottom 28 of the knob and this knob 206 demonstrates that center bores may also find functionality in the knob top 27. The upper knob 21 may be traversed by female threading 24 as shown in FIG. 8B to receive screws or additional tarp anchors. In alternative embodiments not shown, male threading could be utilized in place of the female threading. The knob top 27 may be covered with a protective cap that cooperates with the upper knob 21. These features may be employed in various knob embodiments.

Turning to FIG. 9, the knobs may be joined with the hook members before or after placement on the straps as illustrated, depending on the embodiment employed or the demands of the load. A locking base 30 secures the knobs 20 to the hook member 10. This figure shows a typical hook that comes preinstalled on ratcheting tie-down straps.

FIG. 10A-10B show yet another embodiment of a knob 20, specifically another example of a mountable-base knob 207 which does not need a separate locking base but rather uses a plate with screw mounting holes 24 for more semi-permanent placement. The flat portion of the locking base 30 could be configured to adjoin with a suction cup or magnets to provide an alternative surface interface for the mountable knob locking base. The flat base portion could also be formed to cooperate with a clamping or bracketing mechanism attachable to variable surfaces. It is further anticipated that a knob with a plate base could have other mounting options. Instead of mounting holes the plate could include elongated openings on opposing sides of the plate which could receive tethering material like Velcro® brand hook and loop straps to weave through the elongated openings. The ability to mount the knob with strapping would be beneficial for uneven or odd shaped mounting surfaces, like tree trunks and branches, logs, pipes, posts, poles and railings, scaffolding and equipment. This knob embodiment will be joined with the compressing device 40 according to the system in a manner such as that illustrated in FIG. 10B.

Figure 14A:
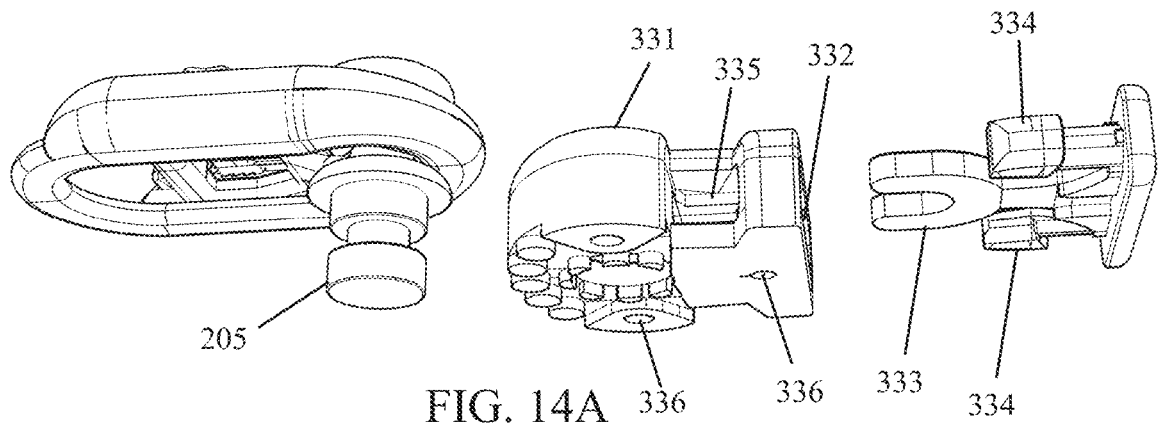
FIG. 14A is a bottom perspective view of the components shown in FIG. 13A joining with a compressing device according to the system of the present invention. During use, the peg end of the tarp knob would insert into the housing and be held in place by the insert while the tarp knob serves as the grabbing point for a tarp and the compressing device offers additional hooking points.
Figure 14B:
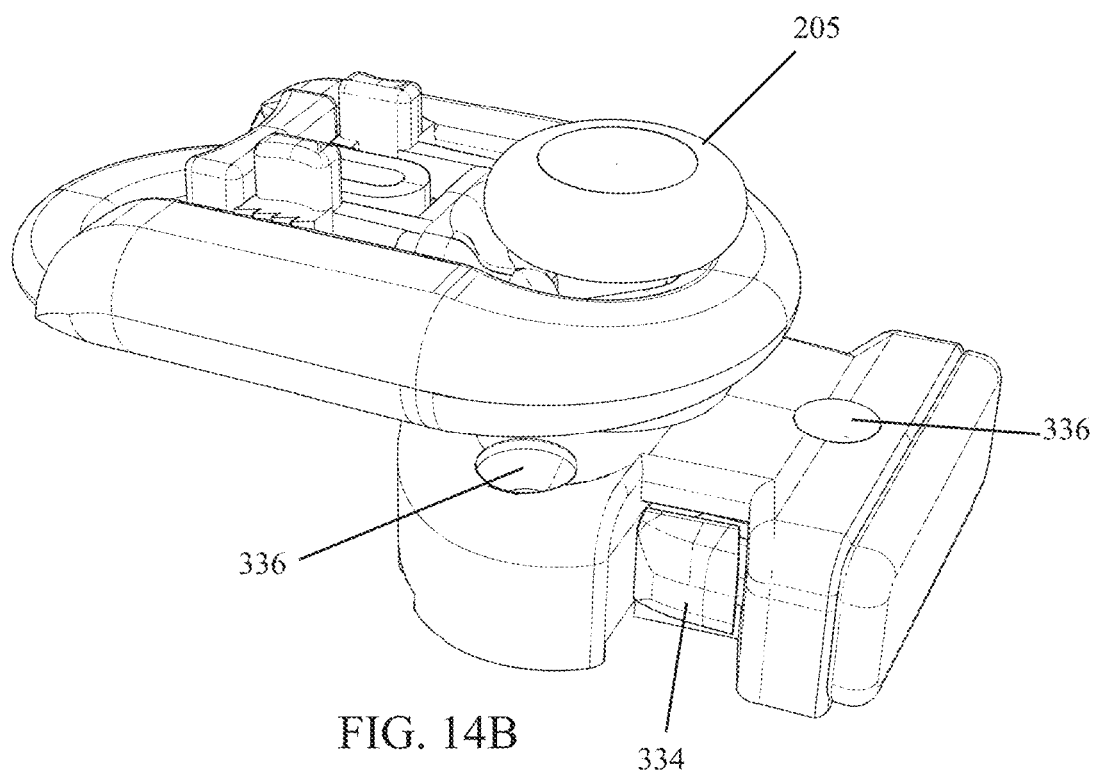
FIG. 14B illustrates the components of FIG. 14A after they are joined according to the system of the present invention (the tarp is omitted to show detail).

Another special knob 205, shown in FIGS. 11A-11E, is provided to cooperate with the presently preferred embodiment of the locking base of the system shown in FIGS. 12A-12I. The combination is illustrated in FIGS. 13A-13I and FIGS. 14A-14B. The use of the quick release base 330 together with the peg knob 205 in the implementation of the tarp grabbing functionality offered by the compressing device 40 is illustrated in FIGS. 14A-14B. The quick release offers the user the flexibility to access a tarped load with the simple action of separating the knob 205 out of the locking base 330. The user does not need to undo the compressing device but instead squeezes the protrusions 334 to actuate the movement of the insert 333 away from the groove 240 of the peg 230 to free the knob 205 from the housing 331. This action may be completed with only one hand. The tarp 3 remains held in position grabbed between the knob neck 22 and the abutting receiver shoulder 45 and the latch shoulder 52. The knob and attached portions may be placed back in the same location when the peg 230 is placed back into the peg receiving bore 337 of the housing 331. The quick release fastener 338 seats in the quick release receiving channel 332 until the insert 333 interfaces with the groove 240 and is held in place when the protrusions 334 snap into the receiving structures 335. When the groove 240 of the knob 205 base peg 230 is captured in the housing 331, the tarp 4 will once again be secured over the load. As compared with the illustrated quick release actuator 334, an alternative quick release actuation may be implemented with a plunger-like release located at the top 27 of the knob 205. Some embodiments of the quick release locking mechanism could utilize a knob substituting, tarp fastening structure, such as the existing grommet system.

With reference to FIGS. 11A-11E, the quick release knob comprises a bulbous upper knob 21, a narrow neck portion 22, and a lower portion 23 atop a lower peg portion 230 which includes a coupling groove 24. The knob tailored for this embodiment includes a grooved lower peg portion 230 which is employed to join with a quick release locking base 330 (see, e.g., FIG. 13A). In this embodiment, the coupling is provided in the lower peg portion 230 as a groove 240. In some peg embodiments, the height of the peg 230 may be varied to offer wider functionality. The height of the groove 240 may also be varied. As one example, the height of the groove 240 in the illustrated peg 230 is 3/16 inch and in other embodiments the gap 24 is 5/16 inch. The cooperation between the base 330 and knob embodiment 205 is shown in FIGS. 13A-13I and FIGS. 14A-14B.

With reference to FIGS. 12A-12I, the quick release locking base 330 is shown in isolation without a tarp lock in place. The quick release locking base 330 is provided with a housing 331, a receiving channel 332 for insert, the quick release insert 333, and the respective quick release protrusions 334 and protrusion receiving structures 335. The quick release base 330 is provided through holes 336 to permit the housing 331 to be mounted in a semi-permanent configuration to a cargo vehicle. The housing 331 thus has the ability to affix the entire tarp anchoring system at a fixed location. Additional holes in the housing 331 may receive hooking members or fastening accessories described herein.

As will be appreciated by a review of FIGS. 13A-13I, the quick release protrusions 334 may be squeezed between the thumb and finger of the user and cause the insert to release from the receiver and free the grooves of the knob 20 so that the knob and therefore the system may be disassembled for unloading the cargo. The rigid interface between the release and the insert and between the Y-shaped apparatus and the groove of the knob safely secure the system and any cargo rope, straps or tarps used with the system.

The hooking devices 10 of the present invention will be varied so long as they offer the minimum features to meet the objectives of the system. Some exemplary hooking devices are illustrated throughout the various figures. With reference to FIGS. 15A-24G, the hooks of the present invention are generally formed of a bent rod. In most examples, the hooks of the present invention utilize hook members of a unitary longitudinally extending member assuming a self-sustaining shape. Rod, or rod-like members, often refer to stiff or semi-rigid material constructed of metal wire bent or curved to form the shape described but include plastic, rubber, or metal members originally molded, stamped, cast, or otherwise formed to the shape described. The preferred form of the rod is a relatively stiff wire, usually resilient to bending stresses but strong enough not to collapse or deform unduly under moderate tensile stresses exerted by a tie-down on the rod. The hook members will usually be made of steel but may be made of another metal or plastic. For strap hooking members, the hooks work as a counter pivot and hold the strap flat or flush with the load and can operate to increase tension mid-span. The preferred rod material is in the range of 1/4 to 5/8 inch round rod material.

Figure 15G:
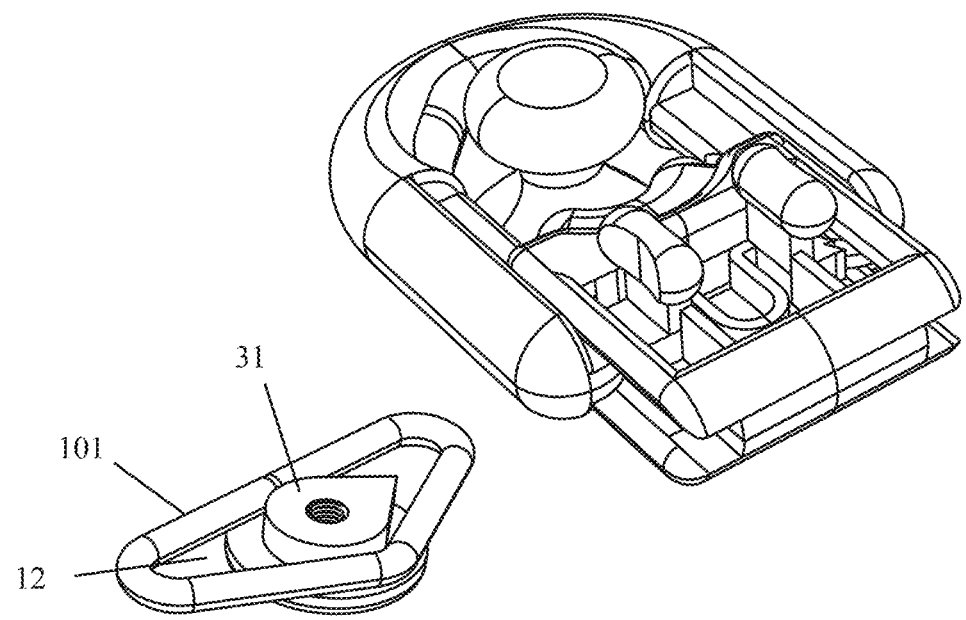
FIG. 15G is a top perspective view of the hooking member of FIG. 15A illustrated in one example, early-stage configuration for use within the system of the present invention.
Figure 15H:
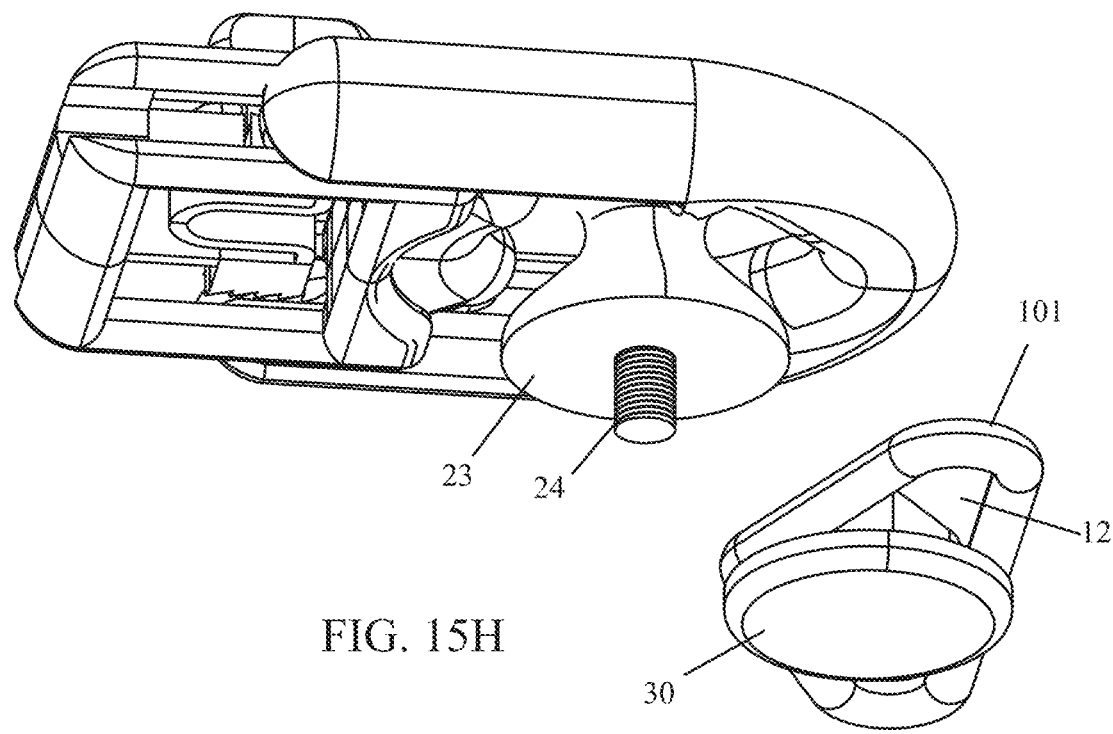
FIG. 15H is a bottom perspective view of the hooking member of FIG. 15A illustrated in one example, early-stage configuration for use within the system of the present invention.

The most basic hooking member 101 option is shown in FIGS. 15A-15F. This triangle hooking member 101 comprises a hooking point 12 (see, e.g., FIG. 15G) and an anchor receiving hole 13. The triangle member may have a break in the rod member as shown in FIG. 15A-15E or could be a solid piece as shown in FIG. 15F. The triangle member is illustrated in one example use within the system within FIGS. 15G-15H. The system is partially disassembled showing the hooking member 101 being joined to the compressing device via the threading between the tarp knob and knob base. During use, the triangle hooking member will also receive a rope that will be held in place by the knob base, the rope traveling from the first corner of the hook down under the knob base and up through the second corner.

Figure 16A:
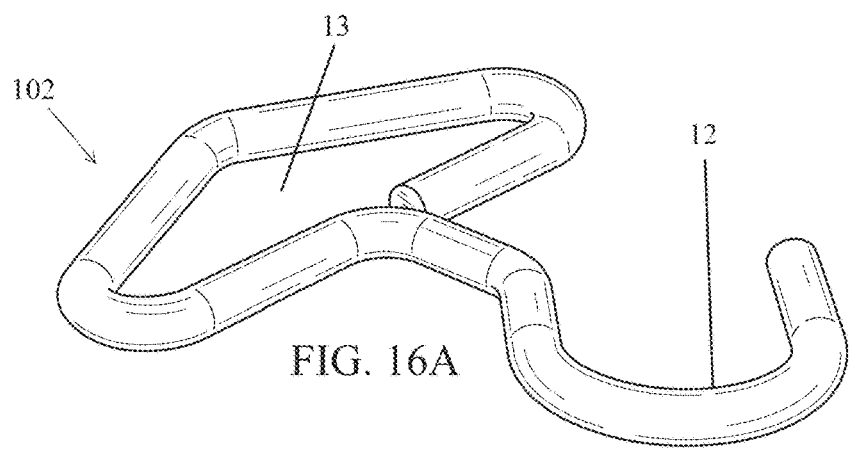
FIG. 16A is a top perspective view of another hooking member.
Figure 16B:
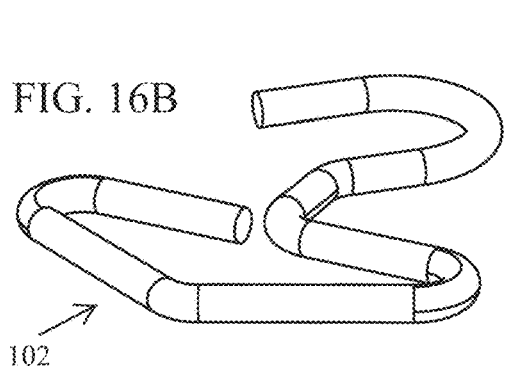
FIG. 16B is another perspective view of FIG. 16A.
Figure 16C:
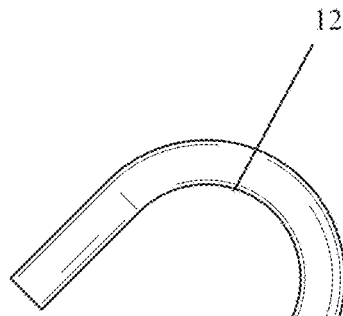
FIG. 16C is a top view of FIG. 16A where the bottom view is a mirror image.
Figure 16D:
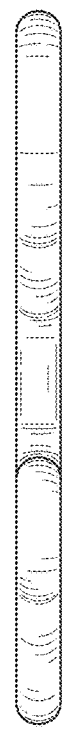
FIG. 16D is a first side view of FIG. 16A.
Figure 16E:
FIG. 16E is a second side view of FIG. 16A.
Figure 16F:
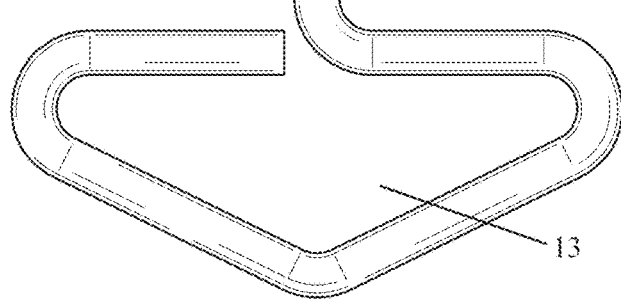
FIG. 16F is a front view of FIG. 16A.
Figure 16G:
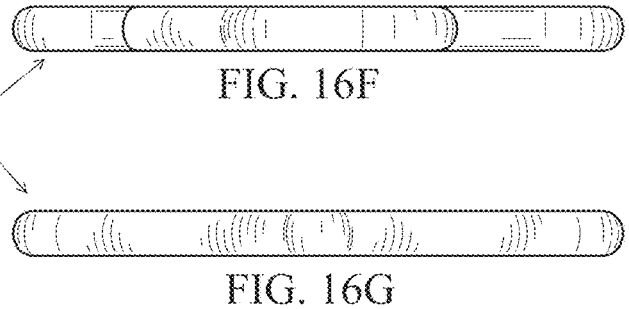
FIG. 16G is a rear view of FIG. 16A.
Figure 16H:
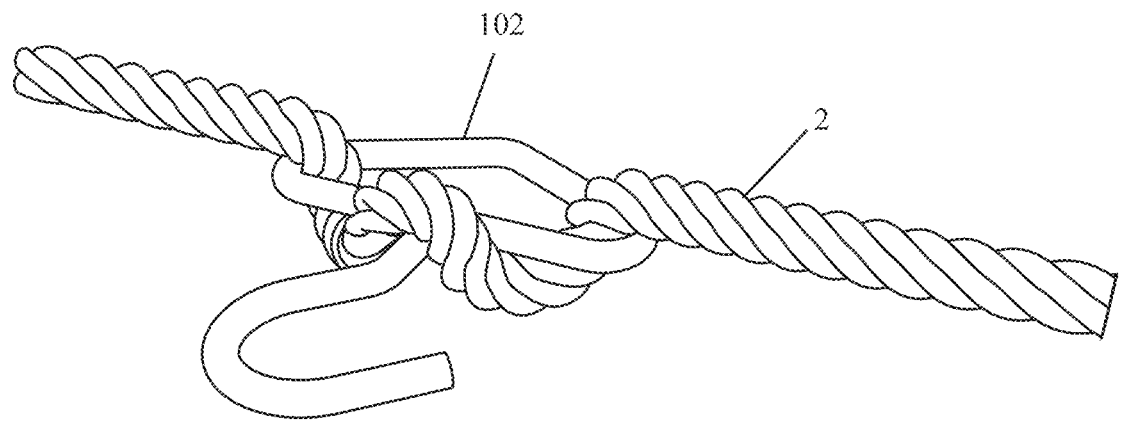
FIG. 16H is a perspective view of the hooking member of FIG. 16A illustrated in one example use within the system of the present invention.
Figure 16I:
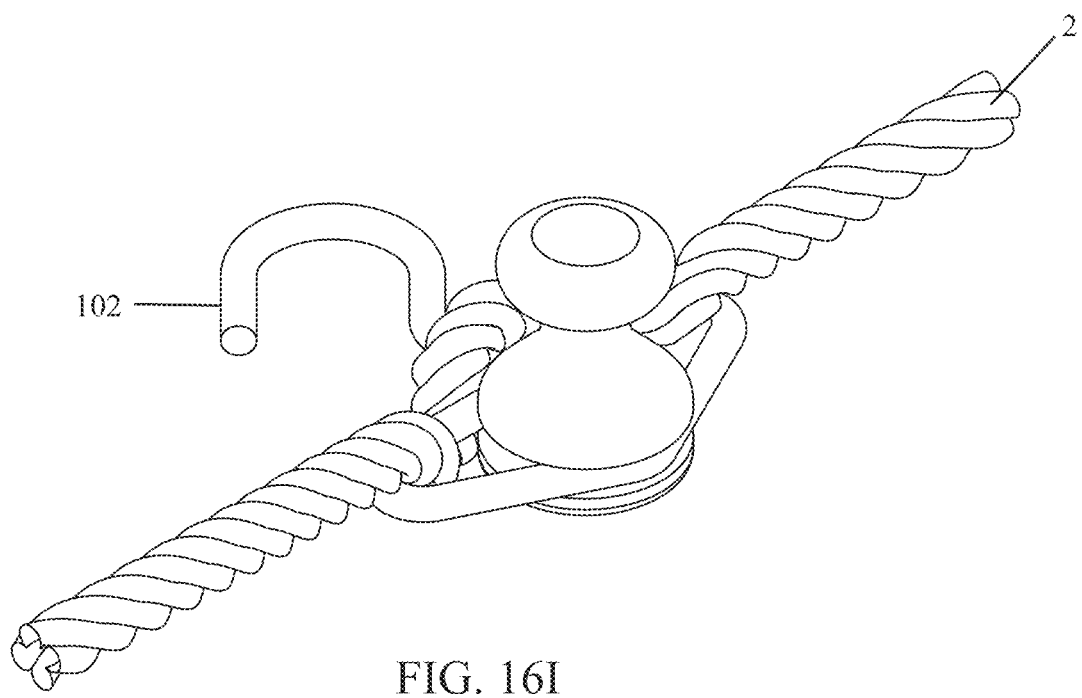
FIG. 16I is a top perspective view of the hooking member of FIG. 16A illustrated in another example use within the system of the present invention.
Figure 16J:
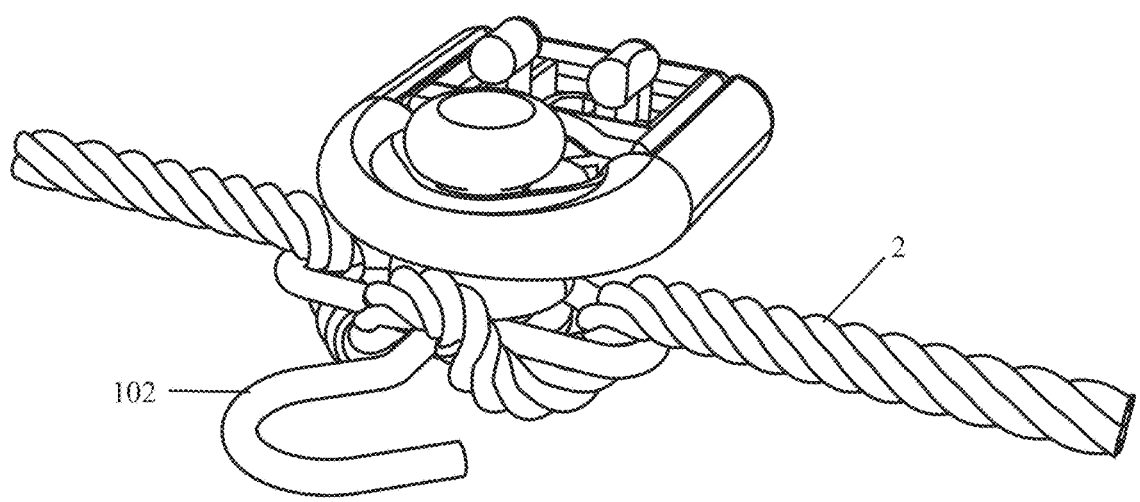
FIG. 16J is a top perspective view of the hooking member of FIG. 16A illustrated in another example use within the system of the present invention (the tarp is omitted to show detail).
Figure 16K:
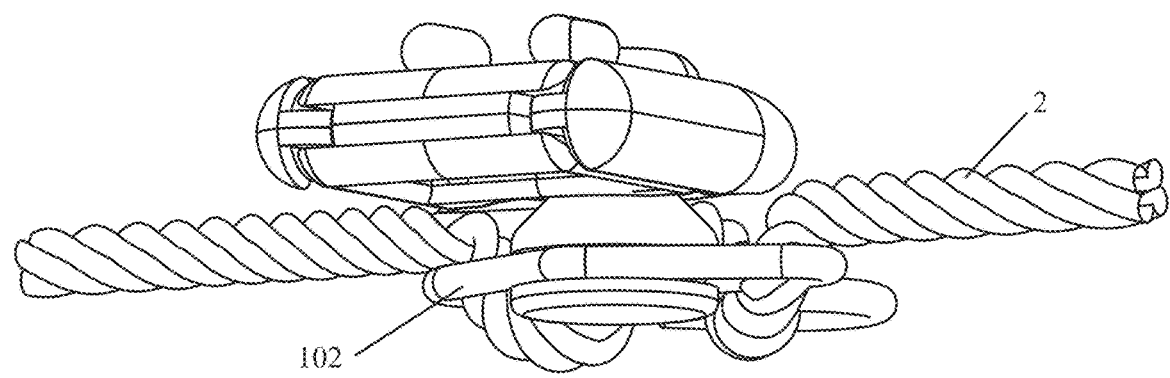
FIG. 16K is a bottom perspective view of FIG. 16J.
Figure 16L:
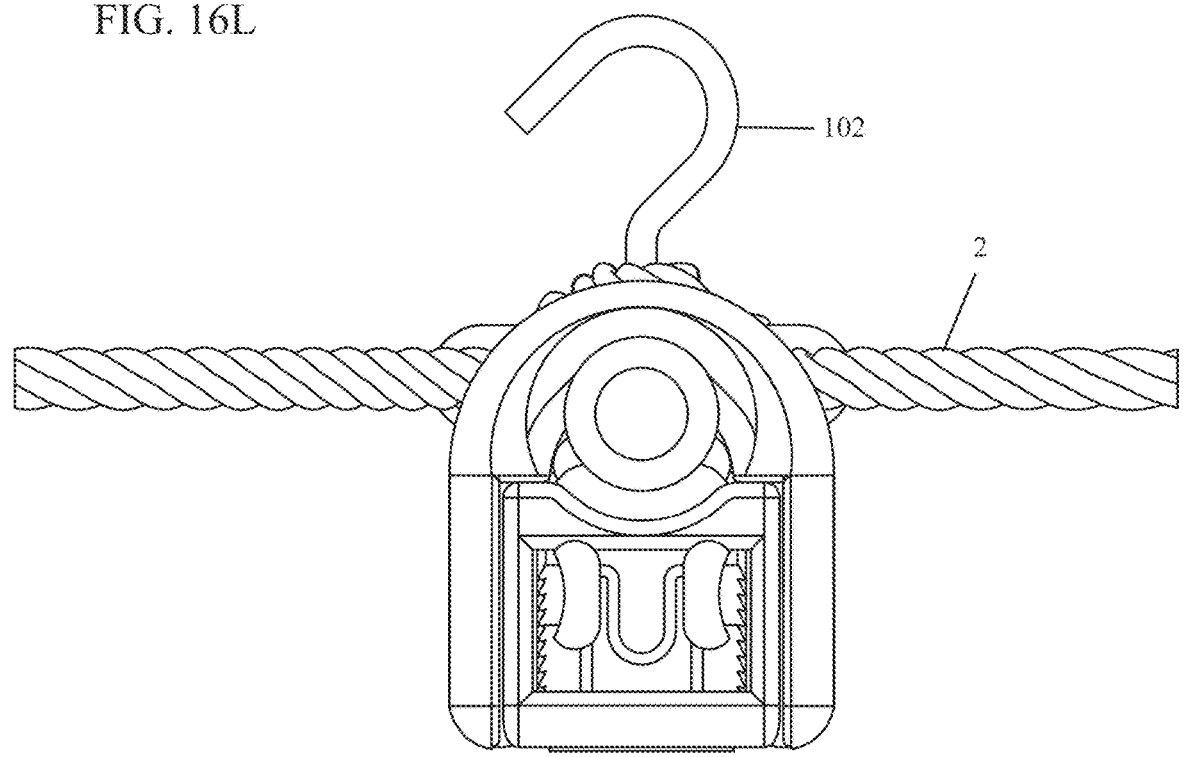
FIG. 16L is a top view of FIG. 16J.
Figure 16M:
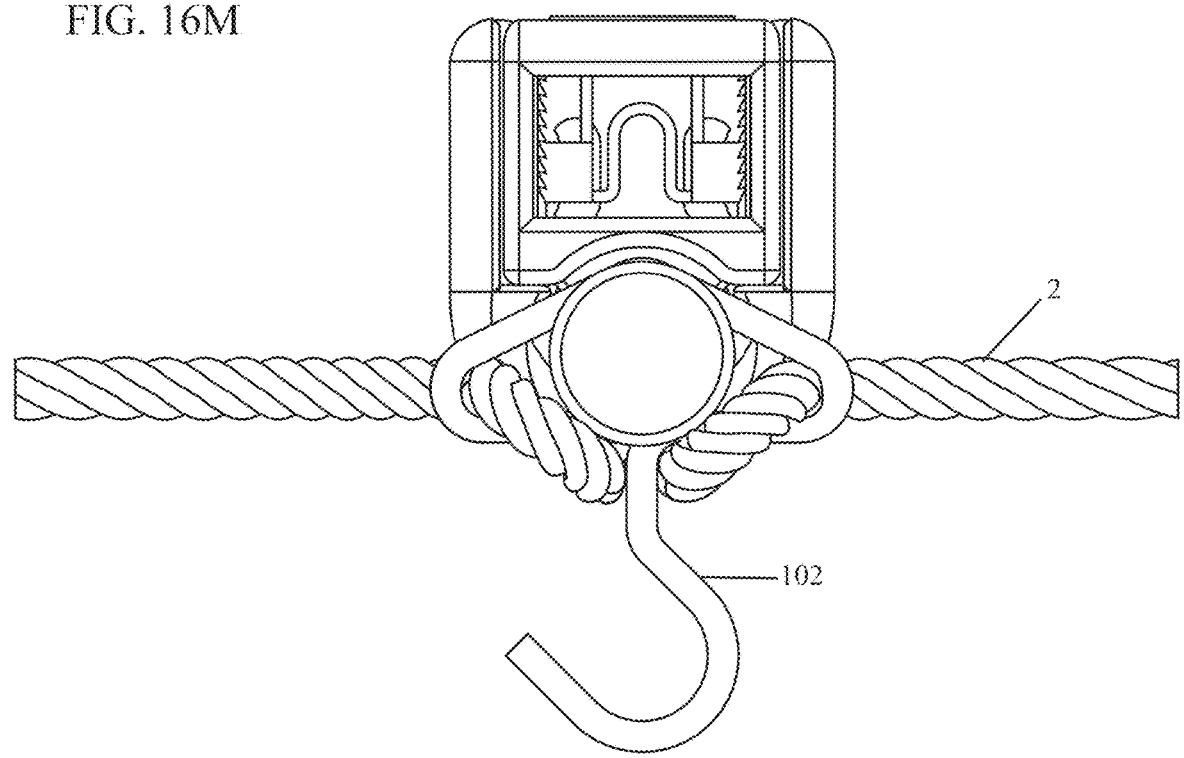
FIG. 16M is a bottom view of FIG. 16J.
Figure 17A:
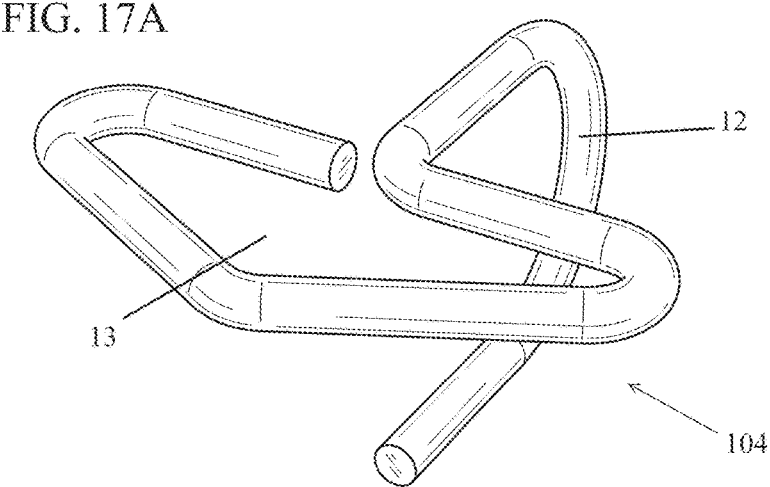
FIG. 17A is a top perspective view of yet another hooking member.
Figure 17B:
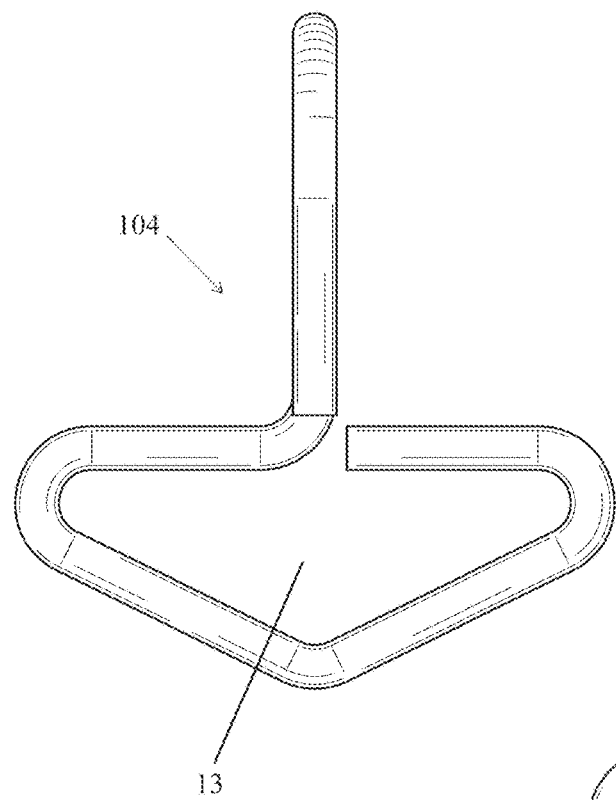
FIG. 17B is a bottom view of FIG. 17A.
Figure 17C:
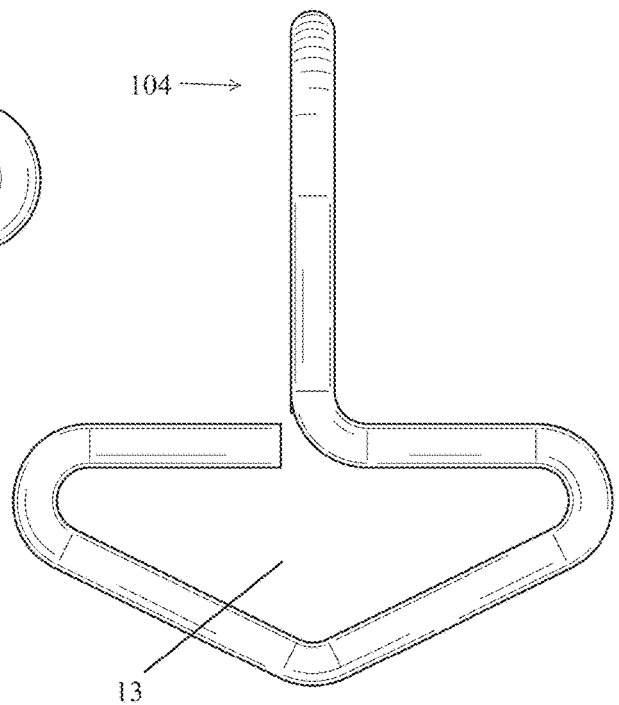
FIG. 17C is a top view of FIG. 17A.
Figure 17D:
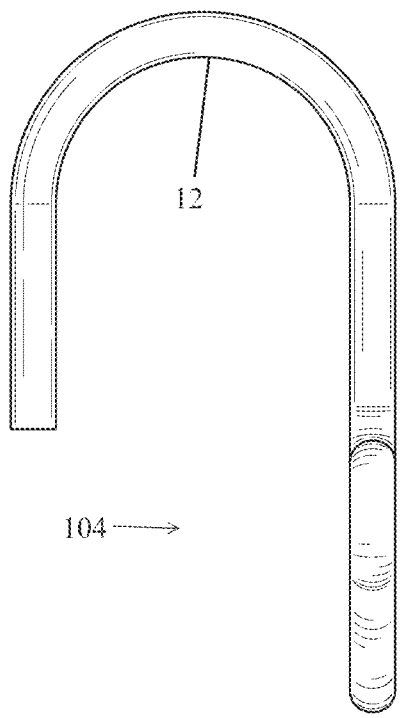
FIG. 17D is a first side view of FIG. 17A where the second side is the mirror image.
Figure 17E:
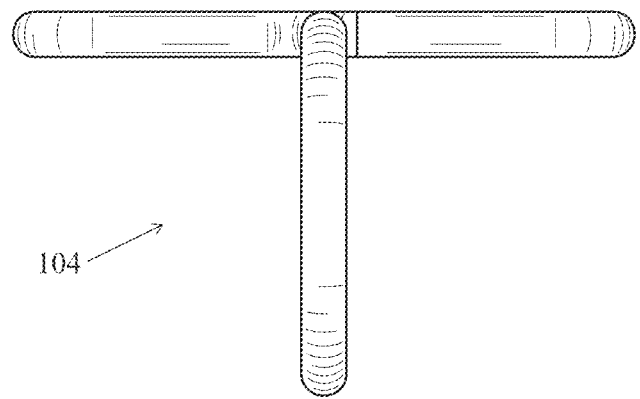
FIG. 17E is a front view of FIG. 17A.
Figure 17F:
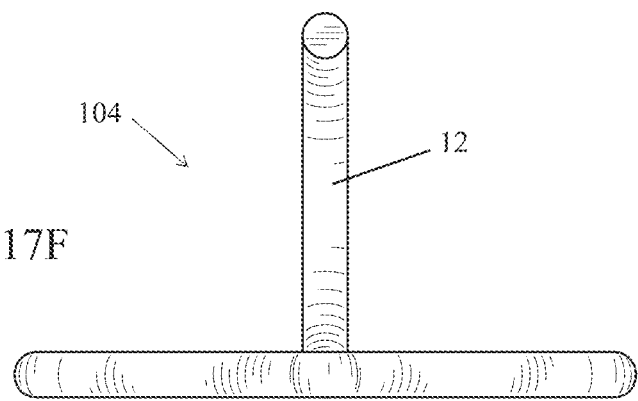
FIG. 17F is a back view of FIG. 17A.

The next hooking member example is described as a triangle with co-planar large hook 102 (coat hanger type hook) and is illustrated in FIGS. 16A-16G. Some example uses for this hooking member 102 are shown in FIGS. 16H-16M. FIGS. 16H-16I illustrate an alternative hooking member acting as a strapping guide having a rope joined according to the methods of the present invention in FIG. 16H where the rope, prior to being pulled taught and after being fed through the triangle is then looped over the hook so that the hook operates as a cleat. A knob and lock are shown in place in FIG. 16I. FIGS. 16J-16M are perspective views of the hooking member intertwined with the rope shown in FIGS. 16H-16I further joined with a tarp compressing device according to the methods of the present invention.

Now, with reference to FIGS. 17A-17F, a variation on another triangle hooking member is shown with as a triangle with perpendicular small nose hook 104. As with the other triangle plus hook embodiments, prior to being pulled taught and after being fed through the triangle, the rope is looped over the hook so that the hook base operates as a cleat.

Figure 18A:
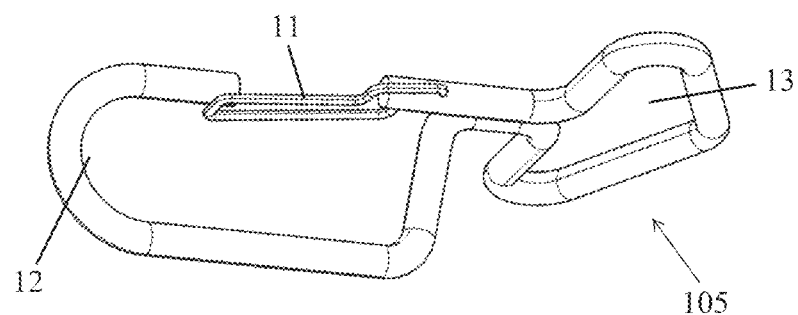
FIG. 18A is a perspective view of a hooking member having a clasp.
Figure 18B:
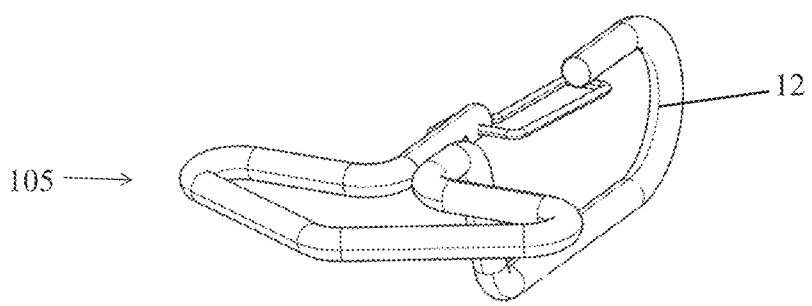
FIG. 18B is another perspective view of the hooking member shown in FIG. 18A.
Figure 18C:
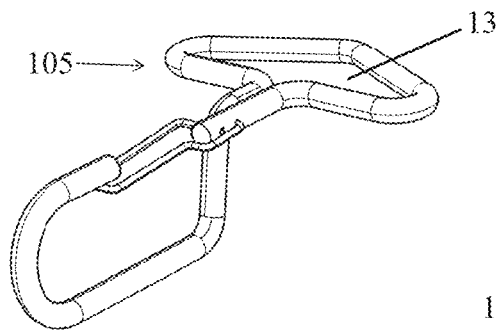
FIG. 18C is a front perspective view of the hooking member shown in FIG. 18A.
Figure 18D:
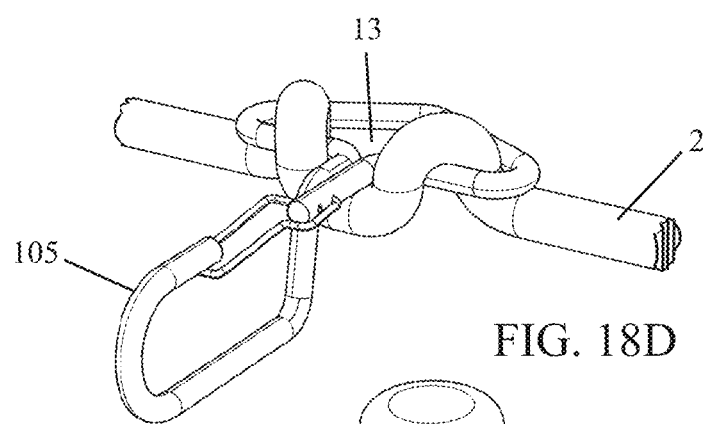
FIG. 18D is a front perspective view of the hooking member of FIG. 18A utilized according to one aspect of the system.
Figure 18E:
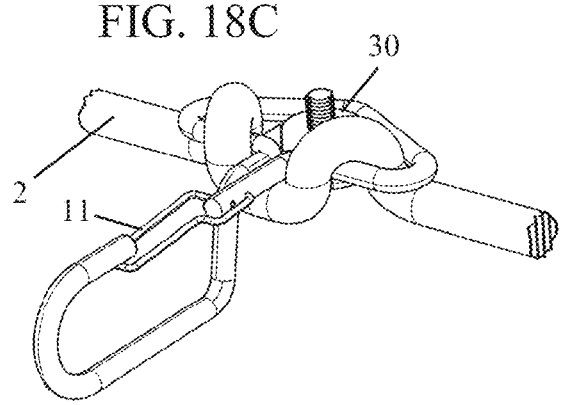
FIG. 18E is a front perspective view an early stage of assembly where a locking base is inserted into the interior space of the exemplary hooking member.
Figure 18F:
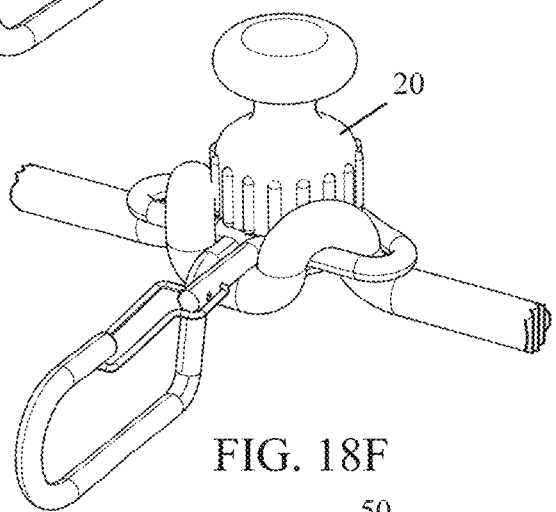
FIG. 18F is a front perspective view of the hooking member of FIG. 18A in another stage of assembly where an exemplary knob anchor is attached to the locking base joined with the hooking member according to one example configuration.
Figure 18G:
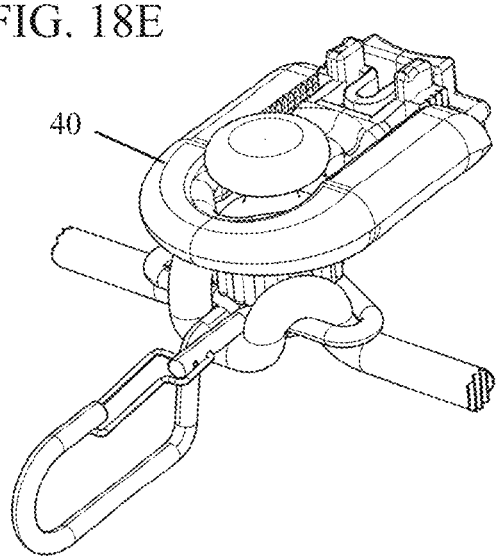
FIG. 18G is a front perspective view of the hooking member of FIG. 18A in another stage of assembly but without a tarp inserted in order to show detail. In this example configuration, the compressing device has not yet been completely clamped to the tarp anchor.
Figure 18H:
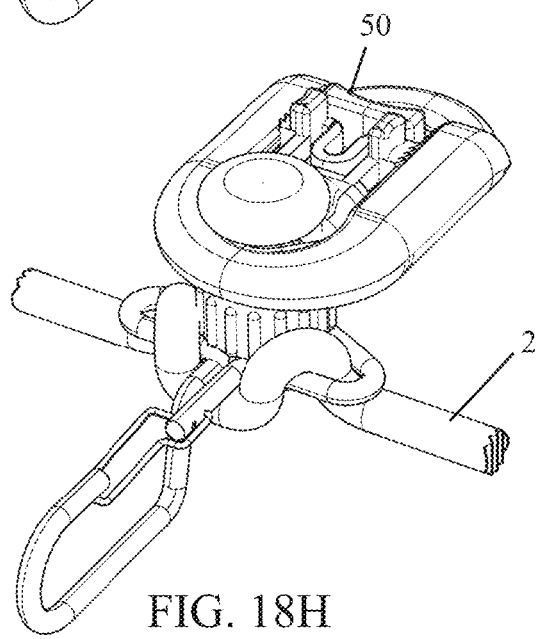

Turning to FIGS. 18A-18C, yet another hook variation begins with a triangle and comprises a spring-biased clipping mechanism 11 to close a drop-down perpendicular, small nose hook, called a clasped nose hooking member 105. Some sample uses for this hooking member 105 are shown in FIGS. 18D-18H. The hooking member 105 is utilized solo with a tie-down 2 in FIG. 18D. FIGS. 18E-18H show various stages of assembly, from a locking base 30 inserted into the interior space 13, to a knob anchor 20 (in this case the spline knob 203) attached to the locking base 30, to the compressing device 40 beginning to clasp, and then finally the sliding latch 50 clamping the knob anchor 20 within the compressing device and the system onto the tie-down 2.

Figure 19A:
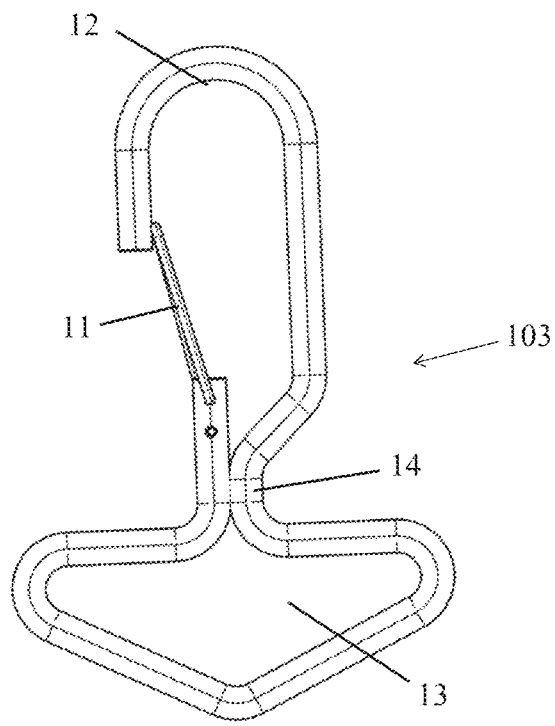
Figure 19B:
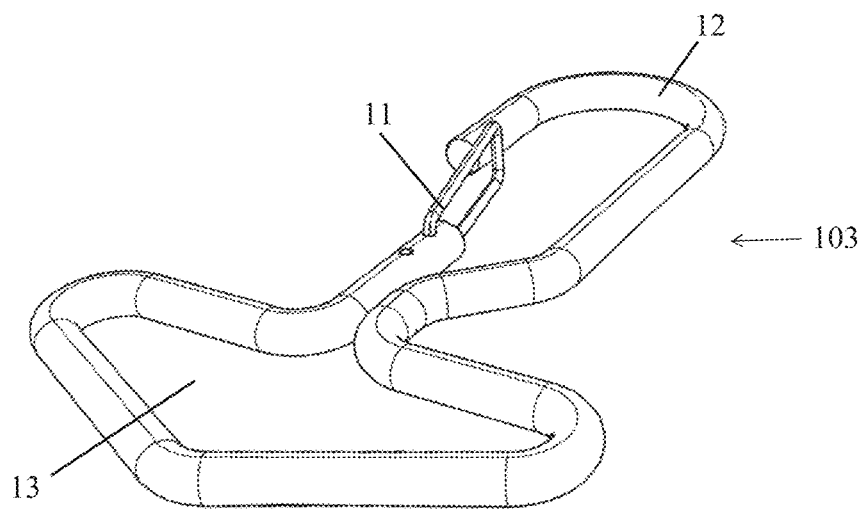

Turning to FIGS. 19A-19B, the variation of hook 102 comprises a spring-biased clipping mechanism 11 to close the co-planar large hook. This hooking member embodiment may be referred to as a clasped large hooking member 103. The use of this hooking member 103 within the system would be similar to the use illustrated in the examples shown in FIGS. 18D-18H. The spring clasp mechanism 11 of this and other hooking members will enhance the safety of the system and prevent the hooking points 12 from coming dislodged. The constriction point 14 may be formed of a swivel (not shown) in various hooking members 10. When a swivel is implemented, the device may turn 360 degrees and offer additional functionality and hooking options for system and particularly when a rope is in use.

Figure 20A:
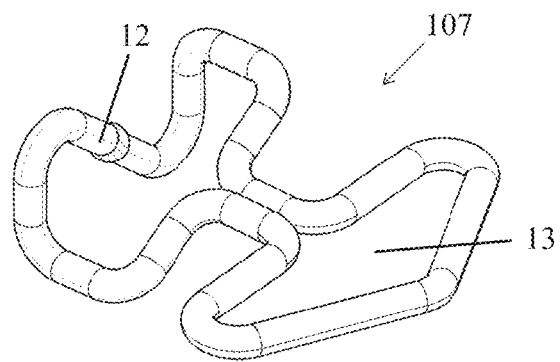
Figure 20B:
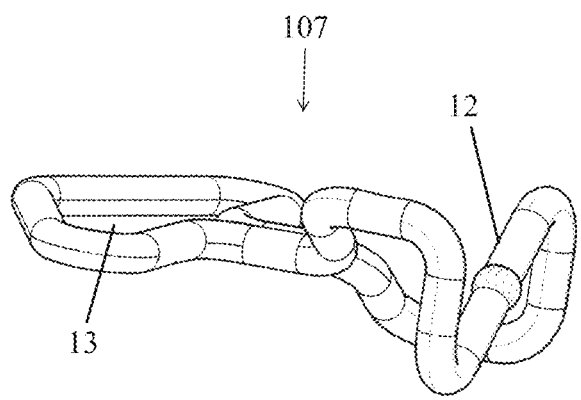

The next hooking member embodiment is shown in FIGS. 20A-20B. This tiered hooking mechanism has an angled connector off of the triangle base and is referred to as an angle-tiered hooking member 107. FIGS. 21A-21C illustrate a hooking member that is similar to the angle-tiered hooking member 107 but this embodiment has a vertical connector and is referred to as a vertical-tiered hooking member 108. Both of these embodiments lend themselves to the use of annular screw locks or similar components. Some example uses for the vertical-tiered hooking member 108 are shown in FIGS. 21D-21I and analogous uses could be made of the angle-tiered hooking member 107. In either case, these hooking members may be connected in tandem or stacked to cover a load according to the strap hooking and tarp anchoring system. In FIG. 21D, no tarp anchor or compressing device is used but instead the hooking member 108 serves as a connection point for an additional hook 602. In FIG. 21E, yet another hook 601 is connected to the hooking member 108. In FIG. 21F, a base lock 30 is inserted into the interior space 13 of the hooking member and an additional hook 602 is also connected to a hooking portion 12 of the hooking member 108. An exemplary knob anchor 20 is attached to the locking base 30 joined with the hooking member 108 during the stage of assembly illustrated in FIG. 21G. In this view, an alternative additional hook 601 is joined with a hooking portion 12 in the hooking member 108 according to another example system configuration. The later stage of assembly shown in FIG. 21H illustrates the compressing device 40 receiving the knob 20 and the sliding latch 50 beginning to close. Once the sliding latch is closed as shown in FIG. 21I, an additional hook is joined with a loop in the rear of the compressing device 40. The system is attached to the tie-down 2 according to this example configuration and creates a strap grabbing device that receives a tarp.

The hooking member 10 introduced in FIG. 3A is more fully illustrated in FIGS. 22A-22I. As fully appreciated from FIGS. 22A-22F this hooking member 110 may be described as planar and undulating with an asymmetrical loop and parallel end portions. In FIG. 22G, the hooking member 110 is shown inserted into a strap tie-down 2 and this illustrates its binding functionality as the strap threads through the strap channels of the hooking member. The hooking member performs a twist and lock functionality on the strap section, either mid-span or at the end. By overlapping threading in the channels, this, and similar versions of this hooking member may be employed to repair damaged straps or extend the length of the strap in order to optimize the load cover. FIGS. 22H and 22I provide details on the attachment of a base lock 30 and knob 20 to the hooking member 110 while it is connected to a strap 2. FIGS. 22H-22I illustrate perspective views of the tarp knob and knob base threadably joined around a loop portion of the strap guiding hooking member 110 according to the methods of the present invention.

The next hooking member 109 is illustrated in FIGS. 23A-23G. As fully appreciated from FIGS. 23A-23F this hooking member 109 may be described as planar and undulating with end portions converging toward center. In FIG. 23G, the hooking member 109 is shown inserted into a strap tie-down 2 and this illustrates its binding functionality. The hooking member 109 would be joined with the other components in a manner similar to that shown in FIGS. 22H and 22I.

The next hooking member 111 is illustrated in FIGS. 24A-24G. As fully appreciated from FIGS. 24A-24F this hooking member 111 may be described as planar and undulating with large loops offsetting one another from center and end portions converging toward center. In FIG. 24G the hooking member 111 is shown inserted into a strap tie-down 2 and this illustrates its binding functionality. The hooking member 111 would be joined with the other components in a manner similar to that shown in FIGS. 22H and 22I; however, the two loops are of nearly identical size and could each play a role as either an interior space 13 to receive the knob 20 or as a hooking point 12 for additional hooking spans to join with the hooking member 111.

This disclosure has provided some specific shapes for the hooking member 10, but the styles may vary and still have functionality similar to those illustrated in the accompanying drawings. In some embodiments, the various aspects, including the hooking points, knob receiving spaces, cleats, ends, and curves of the rod are in approximately the same plane. In some embodiments, members cooperate or occur in multiple planes, such as intersecting planes or perpendicular planes such as those shown in FIGS. 17A-18H and FIGS. 20A-21I. It is further anticipated that the hooking member could be sloped upward slightly from the otherwise single plane hook as shown in FIGS. 1A-1H. The preceding hooking member 10 examples are just a small selection of some hook designs and subsets or modifications of hook designs.

Turning to the additional embodiments for the compressing device, first with reference to FIGS. 25A-25C, the knob is illustrated during use where the compressing device 40 is secures the wrapped sheet material (not shown) via a moveable mechanism 50 that is keyed and opened via the turning of that key. FIG. 25D provides an illustration of one implementation of the example, keyed compressing device mounted on hooking member 110.

In combination, complementary sliding mechanisms of the compressing device interrelate and secure the compressing device 40 around the knob 20 after the tarp overlays the knob 20. In several example embodiments, the two pieces perform this clamping functionality. In such an embodiment shown in FIGS. 26A-26L, the compressing device 40 is spring-loaded to naturally bias teeth together to act as locking mechanisms with selectable positions. The position is actuated by the user squeezing finger press risers 54 of the spring-actuated mechanisms 56 to compress or release the tension so that the teeth are once again moved into a locking position. The complementary shoulders trap the knob 20 around its narrow neck portion 22. The compressing device 40 cannot slide off the anchoring apparatus 20 because it is held between the bulbous upper knob 21 and the lower knob portion 23. As demonstrated, teeth may be employed to interlock and provide friction fit to hold the first piece together with the second piece of the compressing device 40.

FIGS. 27A-27H provide another exemplary tarp compressing device having a tarp knob receiver with a dedicated hooking loop. FIGS. 27A-27E show the main body of the compressing device 40 disengaged from the sliding latch 50 mechanism. The main body of the compressing device 40 is shown in isolation in FIG. 27F. FIGS. 27G-27H illustrate the exemplary tarp compressing device of FIG. 27A fully engaged with the sliding latch mechanism and showing two hooking points. Alternative compressing receiver embodiments have additional teeth important for the knobs to work with larger knobs used with the system.

FIGS. 28A-28J provide yet another exemplary tarp compressing device having a tarp knob receiver with a u-shaped main body. FIGS. 28A-28F show the main body of the compressing device 40 engaging with the sliding latch 50 mechanism. FIGS. 28G-28J illustrate this exemplary tarp compressing device of FIG. 28A disengaged from the sliding latch mechanism. With reference to FIG. 28G the sliding latch frame 51 travels through the channel 48 on each side of the u-shaped body 47. A first set 440 and a second set 441 of attaching mechanisms, in this case two sets of teeth 44 (see, e.g., FIGS. 28F-28G), allow the slide latch 50 to be used as shown or flipped upside down. The back edge of the slide latch 50 will act as a thumb push 55 provided in this embodiment serves as an additional cross support to latching mechanism.

As illustrated in FIG. 4A or 28G, the tarp compressing device may have a channel 48 within the anchor receiving portion 40 to coordinate with the frame 51 of the slide latch 50. Alternatively, the slide latch 50 could have a channel to receive the protruding interior wall of the anchor receiver 40 as demonstrated in FIGS. 25A, 26A, and 27G.

The shoulder area of the tarp compressing device may be constructed of a deformable, cushioning or pliable material such as rubber or rubber coating. The composition of the material optionally coating the shoulder areas may be adjusted to complement the material composition, including thickness, fragility, and slippery nature of the panel material.

When using the tarp knob 20, a user may connect to existing hardware such as an existing strap with a hook, it may connect to a strap anchoring device provided in the present invention, or it may connect to a rope anchoring device provided in the present invention. The functionality of the present system replaces the needs for many D-rings and multi-hooks.

Various illustrations show how the tarp knob is implemented with existing systems or with introduced components. For an existing strap with a hook, the webbing or strap material usually attaches to a closed loop in the hook. The tarp knob 20 of the present invention also attaches to the closed loop portion of an existing hook of any cargo strap, tie-down strap, lashing strap or similar material. The locking base 30 is inserted into the closed loop of the hook. It is necessary to ensure the insertion of the knob base up into the underside of the closed loop that is facing down against the load to be covered. The knob is then screwed into the knob base causing the knob and base to sandwich the closed loop portion of the hook. At this point, when properly installed the knob should be up, pointing away from the load.

When implementing the connection to the strap anchoring device of the current invention, the tarp knob 20 can be used with a first embodiment of the device configuration in order to secure the knob onto a straight length of strapping as shown, e.g., in FIG. 1A. Alternatively, the tarp knob 20 can be connected with other components to be floating on a tarp. Some implementations of aspects of the system will not require the tarp knob, such as shown, e.g., in FIGS. 21D and 21E. Various components in the system will accommodate the strap and rope anchoring devices in this system as well as the many different hooks and cargo anchoring products that are presently on the market today.

When using the mid-span attachment for the tarp knob, the user follows the following steps:
  Finding the desired tarp knob anchoring location on the tie-down;
  With slack in the tie-down to which the device will attach, weaving or otherwise binding the hook to the tie-down;
  Inserting the locking base through an aperture in a hooking component;
  Using the coupling features of the locking base to attach the tarp knob to the hooking component until the base and knob are tightly sandwiching the hooking component;
  Removing the slack from the tie-down;
  Overlaying a tarp over the knob;
  Clamping the compression device over the wrapped knob.

The above technique works for both of the strap anchoring devices that are with and without the hooking loop. The twists in the various hooks allow locking and biting into the strap.

When seeking to secure a load for transport, there may be a need to use rope rather than strapping. As used herein, the word 'rope' includes lines, cable, filament, flexible wire, twine, and any non-flat, filamentary flexible article. The primary difference between a rope and a strap are their shapes. Ropes generally have a circular cross-section while straps have a flattened rectangular shape in cross section. The circular rope is more difficult to maneuver through fastening devices; thus, a specialized design of the present invention provides continued access to the novel and non-obvious features claimed herein.

Many embodiments of the rope anchoring device of the present invention are shown in the figures and provide an inline tarp knob attachment. The present invention anchors to the rope or cord without tying knots and the device will not slip or slide when using the properly matched size rope/cord and device.

The tarp knob and compressing device will accommodate the attachment of various thicknesses of plastic sheeting, cloth, awning, duck, fly, sailcloth, shade, canvas, tarp, tenting and tarpaulin, PVC coated and similar coated cloth and fabric materials of all kinds. To include thin flexible rubberized sheeting and all other types of similar items, products and materials, generally "Tarps". The preferred manufacturing methods will use wire bending of steel rod or similar process, it may then be hardened, coated with plastic, vinyl, rubber or similar substance. Components of the system may be manufactured of wood, plastic or metal and originally molded, stamped, cast, or otherwise formed to the various shapes described. Various portions of the knob may be formed of wood, metal, dense plastic/rubber, composite, stone, or a combination of these and other such suitable materials. The latch of the compressing device may be formed of a spring over-molded with the actuating risers.

This strap hooking and tarp anchoring system provides non-slip, non-sliding attachment points for connecting cargo strap hooks, tie-down strap hooks, other types of hooks, straps, webbing strips, ropes and cords while allowing those connections to be made without having to tie nots in the straps, webbing strips, ropes or cords while anchoring or connecting another of the same. The tarp anchoring aspects of the present system are provided by the "Tarp anchoring knob" being attached at any location of a strap or rope, mid-span or anywhere along their lengths including their ends. The "Tarp Knob Anchoring Device" of the present system allows the ability to cover loads, items and materials with an easy on and off procedure. With this system, tarps are anchored over the securing straps and rope, thus allowing the securing straps and rope to be strategically placed across a load not limited to just a few anchoring points but rather unlimited anchoring points. With the tarp anchored over the securing straps or ropes with the tarp knob anchoring devices secure connection, the wind or other elements will not destabilize the tarp from the load or other covered items or materials.

Because the devices of this system anchor onto a tie-down mid-span or anywhere along its line, this system provides flexibility with a wide variety of options for securing, and covering cargo loads of all types for transporting. The system further provides flexibility with a wide variety of options in the use of tarps for purposes other than securing cargo loads for transportation. Such additional tarp uses include construction work zones, camping, river floating, moving or otherwise covering and protecting property from inclement weather conditions and/or sun exposure. The present invention may be implemented in various applications for camping, gardening, storage, and various other applications both outdoors and indoors, where a need arises for securing parts of the flexible panel so that it may be adequately supported to serve a certain function.

It is further intended that any other embodiments of the present invention which result from any changes in application or method of use or operation, method of manufacture, shape, size, or material which are not specified within the detailed written description or illustrations contained herein yet are considered apparent or obvious to one skilled in the art are within the scope of the present invention.

Having described particular forms of the invention, it will be apparent that various changes and modifications made in the invention would come within the scope of the annexed claims.

I claim:

1. A tie-down and covering system for cargo secured by an interwoven material comprising:
    at least one mid-span hook member,
    an anchoring apparatus,
    a compressing device further comprising an anchor receiver constructed of semi-rigid, durable material, a slidable latch with a locking mechanism having a shoulder, and a lock-and-key security feature,
    wherein the at least one mid-span hook member cooperates with the interwoven material to locate the anchoring apparatus along the interwoven material,
    whereafter a sheeting material placed over the cargo and over the anchoring apparatus is compressed between the shoulder and the anchor receiver to secure the sheeting material within the compressing device.

2. The tie-down and covering system of claim 1, wherein the anchoring apparatus further comprises:
    a knob, and
    a locking base removably connectable to a bottom portion of the knob.

3. The tie-down and covering system of claim 2, the locking base further comprising:
    a housing having receiving structures to receive a quick release insert,
    the quick release insert having protrusions to cooperate with the receiving structures.

4. The tie-down and covering system of claim 3, the housing further comprising through-holes to permit the housing to be mounted in a semi-permanent configuration to a cargo vehicle.

5. The tie-down and covering system of claim 1, wherein the anchor receiver is configured to receive additional attachment mechanisms.

6. The tie-down and covering system of claim 1, wherein the anchoring apparatus is shaped with a bulbous upper knob, a narrow neck portion, and a lower portion, and the anchoring apparatus removably connects to a locking base at the lower portion.

7. The tie-down and covering system of claim 6, wherein the locking base secures the anchoring apparatus to the at least one mid-span hook member.

8. The tie-down and covering system of claim 6, wherein the sheeting material wraps the bulbous upper knob, and the compressing device secures the sheeting material to the anchoring apparatus via the interaction of the bulbous upper knob, the narrow neck portion, and the lower portion with the slidable latch of the compressing device.

9. The tie-down and covering system of claim 1, wherein the at least one mid-span hook member is configured to receive additional attachment mechanisms.

10. The tie-down and covering system of claim 1, wherein the at least one mid-span hook member further comprises a spring actuated clasp.

11. The tie-down and covering system of claim 1, the at least one mid-span hook member being formed to receive a rope.

12. The tie-down and covering system of claim 1, the at least one mid-span hook member being formed to receive a strap.

13. The tie-down and covering system of claim 1, the at least one mid-span hook member being formed to receive a cord.

14. The tie-down and covering system of claim 1, the at least one mid-span hook member being formed to receive a cable.

15. A method employing the tie-down and covering system of claim 1 wherein multiple iterations of the tie-down and covering system are applied over the cargo.

* * * * *